US009203701B2

(12) United States Patent
Koponen et al.

(10) Patent No.: US 9,203,701 B2
(45) Date of Patent: *Dec. 1, 2015

(54) NETWORK VIRTUALIZATION APPARATUS AND METHOD WITH SCHEDULING CAPABILITIES

(71) Applicant: Nicira, Inc., Palo Alto, CA (US)

(72) Inventors: Teemu Koponen, San Francisco, CA (US); Pankaj Thakkar, Santa Clara, CA (US)

(73) Assignee: NICIRA, INC., Palo Alto, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 13/661,010

(22) Filed: Oct. 25, 2012

(65) Prior Publication Data

US 2013/0114466 A1    May 9, 2013

Related U.S. Application Data

(63) Continuation-in-part of application No. 13/589,077, filed on Aug. 17, 2012, and a continuation-in-part of application No. 13/589,078, filed on Aug. 17, 2012.

(60) Provisional application No. 61/684,693, filed on Aug.

(Continued)

(51) Int. Cl.
    G06F 15/16 (2006.01)
    H04L 12/24 (2006.01)

(52) U.S. Cl.
    CPC ........ H04L 41/0893 (2013.01); H04L 41/0813 (2013.01); H04L 41/0889 (2013.01); H04L 41/0663 (2013.01)

(58) Field of Classification Search
    CPC ................................ H04L 12/26; H04L 12/28

USPC .......................................................... 709/223
See application file for complete search history.

(56) References Cited

U.S. PATENT DOCUMENTS 5,504,921 A    4/1996 Dev et al.
5,550,816 A    8/1996 Hardwick et al.
(Continued)

FOREIGN PATENT DOCUMENTS

AU    2012328697    4/2014
AU    2012328699    4/2014
(Continued)

OTHER PUBLICATIONS

Portions of Prosecution History U.S. Appl. No. 13/589,077, Jul. 21, 2014, Koponen, Teemu, et al.
(Continued)

Primary Examiner — Shripal Khajuria
(74) Attorney, Agent, or Firm — Adeli LLP

(57) ABSTRACT

Some embodiments provide a controller for managing several managed switching elements that forward data in a network. The controller includes an interface for receiving input logical control plane data in terms of input events data. The controller includes an input scheduler for (1) categorizing the input events data into different groups based on certain criteria and (2) scheduling supplying of the input event data into a converter based on the groups so that the converter processes a group of input events data together. The controller includes the converter for converting the input logical control plane data to output logical forwarding plane data. The controller includes a network information base (NIB) data structure module for storing the output logical forwarding plane data. The logical forwarding plane data is for subsequent translation into physical control plane data.

35 Claims, 39 Drawing Sheets

Related U.S. Application Data 17, 2012, provisional application No. 61/647,516, filed on May 16, 2012, provisional application No. 61/635,226, filed on Apr. 18, 2012, provisional application No. 61/635,056, filed on Apr. 18, 2012, provisional application No. 61/610,135, filed on Mar. 13, 2012, provisional application No. 61/599,941, filed on Feb. 17, 2012, provisional application No. 61/595,027, filed on Feb. 4, 2012, provisional application No. 61/577,085, filed on Dec. 18, 2011, provisional application No. 61/551,427, filed on Oct. 25, 2011, provisional application No. 61/551,425, filed on Oct. 25, 2011.

(56) References Cited

U.S. PATENT DOCUMENTS

| | | |
|---|---|---|
| 5,729,685 A | 3/1998 | Chatwani et al. |
| 5,751,967 A | 5/1998 | Raab et al. |
| 6,055,243 A | 4/2000 | Vincent et al. |
| 6,104,699 A | 8/2000 | Holender et al. |
| 6,366,582 B1 | 4/2002 | Nishikado et al. |
| 6,366,657 B1 | 4/2002 | Yagel et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,894,983 B1 | 5/2005 | Lederman et al. |
| 6,941,487 B1 | 9/2005 | Balakrishnan et al. |
| 6,963,585 B1 | 11/2005 | Le Pennec et al. |
| 7,042,912 B2 | 5/2006 | Ashwood Smith et al. |
| 7,046,630 B2 | 5/2006 | Abe et al. |
| 7,096,228 B2 | 8/2006 | Theimer et al. |
| 7,120,728 B2 | 10/2006 | Krakirian et al. |
| 7,197,572 B2 | 3/2007 | Matters et al. |
| 7,209,439 B2 | 4/2007 | Rawlins et al. |
| 7,263,290 B2 | 8/2007 | Fortin et al. |
| 7,283,473 B2 | 10/2007 | Arndt et al. |
| 7,342,916 B2 | 3/2008 | Das et al. |
| 7,450,598 B2 | 11/2008 | Chen et al. |
| 7,460,482 B2 | 12/2008 | Pike |
| 7,478,173 B1 | 1/2009 | Delco |
| 7,483,370 B1 | 1/2009 | Dayal et al. |
| 7,512,744 B2 | 3/2009 | Banga et al. |
| 7,555,002 B2 | 6/2009 | Arndt et al. |
| 7,606,260 B2 | 10/2009 | Oguchi et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,010,696 B2 | 8/2011 | Sankaran et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,089,871 B2 | 1/2012 | Iloglu et al. |
| 8,131,852 B1 | 3/2012 | Miller et al. |
| 8,144,630 B1 | 3/2012 | Orr |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,230,050 B1 | 7/2012 | Brandwine et al. |
| 8,265,075 B2 | 9/2012 | Pandey |
| 8,312,129 B1 | 11/2012 | Miller et al. |
| 8,320,388 B2 | 11/2012 | Louati et al. |
| 8,339,959 B1 | 12/2012 | Moisand et al. |
| 8,339,994 B2 | 12/2012 | Gnanasekaran et al. |
| 8,351,418 B2 | 1/2013 | Zhao et al. |
| 8,456,984 B2 | 6/2013 | Ranganathan et al. |
| 8,504,718 B2 | 8/2013 | Wang et al. |
| 8,578,003 B2 | 11/2013 | Brandwine et al. |
| 8,612,627 B1 | 12/2013 | Brandwine et al. |
| 8,621,058 B2 | 12/2013 | Eswaran et al. |
| 8,644,188 B1 | 2/2014 | Brandwine et al. |
| 8,705,513 B2 | 4/2014 | Van Der Merwe et al. |
| 8,762,501 B2 | 6/2014 | Kempf et al. |
| 2002/0093952 A1 | 7/2002 | Gonda |
| 2002/0161867 A1 | 10/2002 | Cochran et al. |
| 2002/0194369 A1* | 12/2002 | Rawlins et al. ............... 709/238 |
| 2003/0041170 A1 | 2/2003 | Suzuki |
| 2003/0069972 A1 | 4/2003 | Yoshimura et al. |
| 2003/0204768 A1 | 10/2003 | Fee |
| 2004/0047286 A1 | 3/2004 | Larsen et al. |
| 2004/0054680 A1 | 3/2004 | Kelley et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0021683 A1 | 1/2005 | Newton et al. |
| 2005/0027881 A1 | 2/2005 | Figueira et al. |
| 2005/0083953 A1 | 4/2005 | May |
| 2005/0132044 A1 | 6/2005 | Guingo et al. |
| 2006/0026225 A1 | 2/2006 | Canali et al. |
| 2006/0028999 A1 | 2/2006 | Iakobashvili et al. |
| 2006/0092976 A1 | 5/2006 | Lakshman et al. |
| 2006/0182033 A1 | 8/2006 | Chen et al. |
| 2006/0182037 A1 | 8/2006 | Chen et al. |
| 2006/0193266 A1 | 8/2006 | Siddha et al. |
| 2006/0221961 A1 | 10/2006 | Basso et al. |
| 2007/0220358 A1 | 9/2007 | Goodill et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0040467 A1 | 2/2008 | Mendiratta et al. |
| 2008/0049614 A1 | 2/2008 | Briscoe et al. |
| 2008/0049621 A1 | 2/2008 | McGuire et al. |
| 2008/0071900 A1 | 3/2008 | Hecker et al. |
| 2008/0189769 A1 | 8/2008 | Casado et al. |
| 2008/0212963 A1 | 9/2008 | Fortin et al. |
| 2008/0225853 A1 | 9/2008 | Melman et al. |
| 2008/0240122 A1 | 10/2008 | Richardson et al. |
| 2008/0291910 A1 | 11/2008 | Tadimeti et al. |
| 2008/0301303 A1 | 12/2008 | Matsuoka |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0113031 A1 | 4/2009 | Ruan et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0046530 A1 | 2/2010 | Hautakorpi et al. |
| 2010/0046531 A1* | 2/2010 | Louati et al. ............... 370/401 |
| 2010/0061231 A1 | 3/2010 | Harmatos et al. |
| 2010/0115101 A1 | 5/2010 | Lain et al. |
| 2010/0125667 A1 | 5/2010 | Soundararajan |
| 2010/0131636 A1 | 5/2010 | Suri et al. |
| 2010/0153554 A1 | 6/2010 | Anschutz et al. |
| 2010/0165877 A1 | 7/2010 | Shukla et al. |
| 2010/0169467 A1 | 7/2010 | Shukla et al. |
| 2010/0205479 A1 | 8/2010 | Akutsu et al. |

(56) References Cited

U.S. PATENT DOCUMENTS

| | | |
|---|---|---|
| 2010/0214949 A1 | 8/2010 | Smith et al. |
| 2010/0257263 A1 | 10/2010 | Casado et al. |
| 2010/0275199 A1 | 10/2010 | Smith et al. |
| 2010/0290485 A1 | 11/2010 | Martini et al. |
| 2010/0322255 A1 | 12/2010 | Hao et al. |
| 2011/0016215 A1 | 1/2011 | Wang |
| 2011/0026521 A1 | 2/2011 | Gamage |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0261825 A1 | 10/2011 | Ichino |
| 2011/0296052 A1 | 12/2011 | Guo et al. |
| 2011/0299534 A1 | 12/2011 | Koganti et al. |
| 2011/0310899 A1 | 12/2011 | Alkhatib et al. |
| 2012/0014386 A1 | 1/2012 | Xiong et al. |
| 2012/0147894 A1 | 6/2012 | Mulligan et al. |
| 2012/0236734 A1 | 9/2012 | Sampath et al. |
| 2012/0239790 A1 | 9/2012 | Doane et al. |
| 2013/0024579 A1 | 1/2013 | Zhang et al. |
| 2013/0058346 A1 | 3/2013 | Sridharan et al. |
| 2013/0103817 A1 | 4/2013 | Koponen et al. |
| 2013/0103818 A1 | 4/2013 | Koponen et al. |
| 2013/0117428 A1 | 5/2013 | Koponen et al. |
| 2013/0117429 A1 | 5/2013 | Koponen et al. |
| 2013/0163427 A1 | 6/2013 | Beliveau et al. |
| 2013/0163475 A1 | 6/2013 | Beliveau et al. |
| 2013/0208623 A1 | 8/2013 | Koponen et al. |
| 2013/0211549 A1 | 8/2013 | Thakkar et al. |
| 2013/0212148 A1 | 8/2013 | Koponen et al. |
| 2013/0212235 A1 | 8/2013 | Fulton et al. |
| 2013/0212243 A1 | 8/2013 | Thakkar et al. |
| 2013/0212244 A1 | 8/2013 | Koponen et al. |
| 2013/0212245 A1 | 8/2013 | Koponen et al. |
| 2013/0212246 A1 | 8/2013 | Koponen et al. |
| 2013/0219037 A1 | 8/2013 | Thakkar et al. |
| 2013/0219078 A1 | 8/2013 | Padmanabhan et al. |
| 2013/0227097 A1 | 8/2013 | Yasuda et al. |
| 2013/0332602 A1 | 12/2013 | Nakil et al. |
| 2013/0332619 A1 | 12/2013 | Xie et al. |
| 2014/0016501 A1 | 1/2014 | Kamath et al. |

FOREIGN PATENT DOCUMENTS

| | | |
|---|---|---|
| CA | 2849930 | 5/2013 |
| EP | 0737921 | 10/1996 |
| EP | 1653688 | 5/2006 |
| EP | 2748977 | 7/2014 |
| EP | 2748990 | 7/2014 |
| JP | 2003-069609 | 3/2003 |
| JP | 2003-124976 | 4/2003 |
| JP | 2003-318949 | 11/2003 |
| JP | 2006-229967 | 8/2006 |
| WO | WO 2005/112390 | 11/2005 |
| WO | WO 2008/095010 | 8/2008 |
| WO | WO 2012/093429 | 7/2012 |
| WO | WO 2013/184846 | 12/2013 |

OTHER PUBLICATIONS

International Preliminary Report on Patentability and Written Opinion for PCT/US2012/062004, May 8, 2014 (mailing date), Nicira, Inc.

International Preliminary Report on Patentability and Written Opinion for PCT/US2012/062005, May 8, 2014 (mailing date), Nicira, Inc.

International Preliminary Report on Patentability and Written Opinion for PCT/US2012/062007, May 8, 2014 (mailing date), Nicira, Inc.

Wang, Wei-Ming, et al., "Analysis and Implentation of an Open Programmable Router Based on Forwarding and Control Element Separation," Journal of Computer Science and Technology, Sep. 2008, pp. 769-779, vol. 23, No. 5.

WO 2013/063329 with International Search Report, May 2, 2013, Nicira, Inc.

WO 2013/063330 with International Search Report, May 2, 2013, Nicira, Inc.

WO 2013/063332 with International Search Report, May 2, 2013, Nicira, Inc.

Adya, Atul, et al., "Cooperative Task Management without Manual Stack Management," Jun. 2002, 14 pages, Proceedings of the Usenix Annual Technical Conference, Monterey, CA, USA.

Andersen, David, et al., "Resilient Overlay Networks," Oct. 2001, 15 pages, 18th ACM Symp. on Operating Systems Principles (SOSP), Banff, Canada, ACM.

Anderson, Thomas, et al., "Overcoming the Internet Impasse through Virtualization," Apr. 2005, pp. 34-41, IEEE Computer Society.

Anhalt, Fabienne, et al., "Analysis and evaluation of a XEN based virtual router," Sep. 2008, pp. 1-60, Unite de recherché INRA Phone-Alpes, Montbonnot Saint-Ismier, France.

Anwer, Muhammad Bilal, et al., "Building a Fast, Virtualized Data Plane with Programmable Hardware," Aug. 17, 2009, pp. 1-8, VISA'09, Barcelona, Spain, ACM.

Author Unknown, "Cisco Nexis 1000V Series Switches," Date Unknown but prior to Jul. 29, 2010, 2 pages, Cisco Systems, Inc., http://web.archive.org/web/20100729045626/http://www.cisco.com/en/US/Produ ts/ps9902/index.html.

Author Unknown, "Citrix Launches New XenServer Release as Market Share Growth Continues," Oct. 6, 2010, 3 pages, Citrix Systems, Inc. (http://www.citrix.com/English/ne/news/news.asp?newsID=2304355).

Author Unknown, "HP OpenView Enterprise Management Starter Solution," Jun. 2006, p. 1-4, Hewlett-Packard Development Company, HP.

Author Unknown, "HP OpenView Operations 8.0 for UNIX Developer's Toolkit," Month Unlknown, 2004, pp. 1-4, Hewlett-Packard Development Company, HP.

Author Unknown, "HP Web Jetadmin Integration into HP OpenView Network Node Manager," Feb. 2004, pp. 1-12, HP.

Author Unknown, "IEEE Standard for Local and metropolitan area networks—Virtual Bridged Local Area Networks, Amendment 5: Connectivity Fault Management," IEEE Std 802.1ag, Dec. 17, 2007, 260 pages, IEEE, New York, NY, USA.

Author Unknown, "Introduction to VMware Infrastructure: ESX Server 3.5, ESX Server 3i version 3.5, VirtualCenter 2.5," Revision Dec. 13, 2007, pp. 1-46, VMware, Inc., Palo Alto, California, USA.

Author Unknown, "Open vSwitch, An Open Virtual Switch," Date Unknown but prior to Dec. 30, 2010, 2 pages, http://www.openvswitch.org/, Open vSwitch.

Author Unknown, "OpenFlow Switch Specification, Version 0.9.0 (Wire Protocol 0x98)," Jul. 20, 2009, pp. 1-36, Open Networking Foundation.

Author Unknown, OpenFlow Switch Specification, Version 1.0.0 (Wire Protocol 0x01), Dec. 31, 2009, pp. 1-42, Open Networking Foundation.

Author Unknown, "Single Root I/O Virtualization and Sharing Specification, Revision 1.0," Sep. 11, 2007, pp. 1-84, PCI-SIG.

Author Unknown, "Virtual Machine Device Queues," White Paper, Month Unknown, 2007, pp. 1-4, Intel Corporation.

Author Unknown, "VMare for Linux Networking Support," Date Unknown but prior to Nov. 17, 1999, pp. 1-5, VMWare, Inc.

Ballani, Hitesh, et al., "Making Routers Last Longer with ViAggre," NSDI'09: 6th USENIX Symposium on Networked Systems Design and Implementation, Apr. 2009, pp. 453-466, USENIX Association.

Barham, Paul, et al., "Xen and the Art of Virtualization," Oct. 19-22, 2003, pp. 1-14, SOSP'03, Bolton Landing New York, USA.

Bavier, Andy, et. al., "In VINI Veritas: Realistic and Controlled Network Experimentation," SIGCOMM'06, Sep. 2006, pp. 1-14, Pisa, Italy.

Bhatia, Sapan, et al., "Trellis: A Platform for Building Flexible, Fast Virtual Networks on Commodity Hardware," ROADS'08, Dec. 9, 2008, pp. 1-6, Madrid, Spain, ACM.

(56) References Cited

OTHER PUBLICATIONS

Caesar, Matthew, et al., "Design and Implementation of a Routing Control Platform," NSDI '05: 2nd Symposium on Networked Systems Design & Implementation, Apr. 2005, pp. 15-28, Usenix Association.
Cai, Zheng, et al., "The Preliminary Design and Implementation of the Maestro Network Control Platform," Oct. 1, 2008, pp. 1-17, NSF.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," Seventh ACM SIGCOMM' HotNets Workshop, Nov. 2008, pp. 1-6, ACM.
Casado, Martin, et al., "SANE: A Protection Architecture for Enterprise Networks," In proceedings of Usenix Security, Aug. 2006, pp. 1-15.
Casado, Martin, et al., "Scaling Out: Network Virtualization Revisited," Month Unknown, 2010, pp. 1-8.
Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Cooper, Brian F., et al., "PNUTS: Yahoo!'s Hosted Data Serving Platform," VLDB'08, Aug. 24-30, 2008, pp. 1-12, ACM, Auckland, New Zealand.
Davoli, Renzo, "VDE: Virtual Distributed Ethernet," TRIDENTCOM'05, Feb. 23-25, 2005, pp. 1-8, IEEE Computer Society.
Dixon, Colin, et al., "An End to the Middle," Proceedings of the 12th conference on Hot topics in operating systems USENIX Association, May 2009, pp. 1-5, Berkeley, CA, USA.
Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, pp. 1-17, ACM New York, NY.
Enns, R., "NETCONF Configuration Protocol," Dec. 2006, pp. 1-96, IETF Trust (RFC 4741).
Farinacci, D., et al., "Generic Routing Encapsulation (GRE)," Mar. 2000, pp. 1-9, The Internet Society (RFC 2784).
Farrel, A., "A Path Computation Element (PCS)—Based Architecture," Aug. 2006, pp. 1-41, RFC 4655.
Fischer, Anna, "[PATCH][RFC] net/bridge: add basic VEPA support," Jun. 2009, pp. 1-5, GMANE Org.
Garfinkel, Tal, et al., "A Virtual Machine Introspection Based Architecture for Intrusion Detection," In Proc. Network and Distributed Systems Security Symposium, Feb. 2003, pp. 1-16.
Greenberg, Albert, et al., "A Clean Slate 4D Approach to Network Control and Management," ACM SIGCOMM Computer Communication Review, Oct. 2005, 12 pages, vol. 35, No. 5.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and The Rise of Commodity Network Hardware," ACM SIGCOMM Computer Communication Review, Apr. 2009, pp. 21-26, vol. 39, No. 2.
Gude, Natasha, et al., "NOX: Towards an Operating System for Networks," ACM SIGCOMM Computer communication Review, Jul. 2008, pp. 105-110, vol. 38, No. 3.
Guo, Chanxiong, et al., "BCube: A High Performance, Server-centric Network Architecture for Modular Data Centers," SIGCOMM'09, Aug. 17-21, 2009, pp. 1-12, ACM, Barcelona, Spain.
Hamilton, James, et al., "Datacenter Networks Are In My Way," Principals of Amazon Series, Oct. 28, 2010, pp. 1-14.
Hinrichs, Timothy L., et al., "Practical Declarative Network Management," WREN'09, Aug. 21, 2009, pp. 1-10, Barcelona, Spain.
Hunt, Patrick, et al., "ZooKeeper: Wait-free Coordination for Internet-Scale Systems," Proc. of Usenix Annual Technical Conference, Month Unknown, 2010, pp. 1-14.
Ioannidis, Sotiris, et al., "Implementing a Distributed Firewall," CCS'00, Month Unknown, 2000, pp. 1-10, ACM, Athens, Greece.
Joseph, Dilip, et al., "A Policy-aware Switching Layer for Date Centers," Jun. 24, 2008, 26 pages, Electrical Engineering and Computer Sciences, University of California, Berkeley, CA, USA.
Kamath, Daya, et. al., "Edge virtual Bridge Proposal, Version 0. Rev. 0.1," Apr. 23, 2010, pp. 1-72, IEEE.
Keller, Eric, et al., "The 'Platform as a Service' Model for Networking," Month Unknown, 2010, pp. 1-6.
Kim, Changhoon, et al., "Floodless in Seattle: A Scalable Ethernet Architecture for Large Enterprises," SIGCOMM'08, Aug. 17-22, 2008, pp. 3-14, ACM, Seattle, Washington, USA.
Kohler, Eddie, et al., "The Click Modular Router," ACM Trans. on Computer Systems, Aug. 2000, 34 pages, vol. 18, No. 3.
Koponen, Teemu, et al., "Onix: A Distributed Control Platform for Large-scale Production Networks," In Proc. OSDI, Oct. 2010, pp. 1-14.
Lakshminarayanan, Karthik, et al., "Routing as a Service," Month Unknown, 2004, pp. 1-15, Berkeley, California.
Luo, Jianying, et al., "Prototyping Fast, Simple, Secure Switches for Ethane," Month Unknown, 2007, pp. 1-6.
McKeown, Nick, et al., "OpenFlow: Enabling Innovation in Campus Networks," ACS SIGCOMM Computer communication Review, Apr. 2008, pp. 69-74, vol. 38, No. 2.
Mogul, Jeffrey C., et al., "API Design Challenges for Open Router Platforms on Proprietary Hardware," Oct. 2008, pp. 1-6.
Mysore, Radhka Niranjan, et al., "PortLand: A Scalable Fault-Tolerant Layer 2 Data Center Network Fabric," Proc. of SIGCOMM, Aug. 17-21, 2009, pp. 1-12.
Pelissier, Joe, "Network Interface Virtualization Review," Jan. 2009, pp. 1-38.
Pelissier, Joe, "VNTag 101," May 2008, pp. 1-87.
Pettit, Justin, et al., "Virtual Switching in an Era of Advanced Edges," Sep. 2010, 7 pages.
Pfaff, Ben., et al., "Extending Networking into the Virtualization Layer," Proc. of HotNets, Oct. 2009, pp. 1-6.
Rosen, E., et al., "Applicability Statement for BGP/MPLS IP Virtual Private Networks (VPNs)," The Internet Society, RFC 4365, Feb. 2006, pp. 1-32.
Sherwood, Rob, et al., "Can the Production Network Be the Testbed?," Month Unknown, 2010, pp. 1-14.
Sherwood, Rob, et al., "Carving Research Slices Out of Your Production Networks with OpenFlow," ACM SIGCOMM Computer Communications Review, Jan. 2010, pp. 129-130, vol. 40, No. 1.
Sherwood, Rob, et al., "FlowVisor: A Network Virtualization Layer," Oct. 14, 2009, pp. 1-14, OPENFLOW-TR-2009-1.
Spalink, Tammo, et al., "Building a Robust Software-Based Router Using Network Processors," Month Unknown, 2001, pp. 216-229, ACM, Banff, CA.
Tavakoli, Arsalan, et al., "Applying NOX to the Datacenter," Proc. HotNets, Month Unknown, 2009, 6 pages.
Touch, J., et al., "Transparent Interconnection of Lots of Links (TRILL): Problem and Applicability Statement," May 2009, pp. 1-17, IETF Trust, RFC 5556.
Turner, Jonathan S., "A Proposed Architecture for the GENI Backbone Platform," ANCS'06, Dec. 3-5, 2006, 10 pages, ACM, San Jose, California, USA.
Turner, Jon, et al., "Supercharging PlanetLab—High Performance, Multi-Application Overlay Network Platform," SIGCOMM-07, Aug. 27-31, 2007, 12 pages, ACM, Koyoto, Japan.
Wang, Yi, et al., "Virtual Routers on the Move: Live Router Migration as a Network-management Primitive," SIGCOMM 08, Aug. 17-22, 2008, 12 pages, ACM, Seattle, Washington, USA.
Yang, L., et al., "Forwarding and Control Element Separation (ForCES) Framework," Apr. 2004, pp. 1-40, The Internet Society.
Yu, Minlan, et al., "Scalable Flow-Based Networking with DIFANE," In Proc. SIGCOMM Aug. 2010, 16 pages.
Davie, B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.
Foster, Nate, et al., "Frenetic: A Network Programming Language," ICFP '11, Sep. 19-21, 2011, 13 pages, Tokyo, Japan.

(56) References Cited

OTHER PUBLICATIONS

Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 1 of 2, pp. 1-79.

Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 2 of 2, pp. 80-167.

Loo, Boon Thau, et al., "Declarative Routing: Extensible Routing with Declarative Queries," In Proc. of SIGCOMM, Aug. 21-26, 2005, 14 pages, Philadelphia, PA, USA.

Loo, Boon Thau, et al., "Implementing Declarative Overlays," In Proc. of SOSP, Oct. 2005, 16 pages, Brighton, UK.

Shenker Scott, et al., "The Future of Networking, and the Past of Protocols," Dec. 2, 2011, pp. 1-30, USA.

Das, Suarav, et al., "Unifying Packet and Circuit Switched Networks with OpenFlow," Dec. 7, 2009, 10 pages.

Das, Suarav, et al. "Simple Unified Control for Packet and Circuit Networks," Month Unknown, 2009, pp. 147-148, IEEE.

Updated portions of prosecution history of U.S. Appl. No. 13/589,077, Jan. 20, 2015, Koponen, Teemu, et al.

Portions of prosecution history of U.S. Appl. No. 13/589,078, Jan. 23, 2015, Koponen, Teemu, et al.

Portions of prosecution history of U.S. Appl. No. 13/756,501, Mar. 17, 2015, Koponen, Teemu, et al.

Portions of prosecution history of U.S. Appl. No. 13/756,500, Mar. 27, 2015, Koponen, Teemu, et al.

Portions of prosecution history of U.S. Appl. No. 13/756,487, Mar. 18, 2015, Koponen, Teemu, et al.

Portions of prosecution history of U.S. Appl. No. 13/660,999, Jan. 26, 2015, Koponen, Teemu, et al.

Portions of prosecution history of U.S. Appl. No. 13/661,002, Mar. 13, 2015, Koponen, Teemu, et al.

Portions of prosecution history of AU2012328697, Mar. 2, 2015 (mailing date), Nicira, Inc.

Portions of prosecution history of EP12843934.6, Oct. 6, 2014 (mailing date), Nicira, Inc.

Portions of prosecution history of AU2012328699, Mar. 25, 2014 (mailing date), Nicira, Inc.

Portions of prosecution history of EP12844417.1, Oct. 7, 2014 (mailing date), Nicira, Inc.

Raganai, Chaparadza, et al., "An Architectural Reference Model for Autonomic Networking Cognitive Networking and Self-Management," Mar. 2012, 179 pages, The European Telecommunications Standards Institute, Sophia-Antipolis, France.

* cited by examiner

| Figure 18 | Figure 23A |
|---|---|
|  | Figure 23B |

| Figure 20 | Figure 20A<br>Figure 20B |

NETWORK VIRTUALIZATION APPARATUS AND METHOD WITH SCHEDULING CAPABILITIES

CLAIM OF BENEFIT TO PRIOR APPLICATIONS

This application is a continuation-in-part application of U.S. patent application Ser. No. 13/589,077, filed on Aug. 17, 2012; and U.S. patent application Ser. No. 13/589,078, filed on Aug. 17, 2012. U.S. patent application Ser. No. 13/589,077 and U.S. patent application Ser. No. 13/589,078 claim the benefit of U.S. Provisional Application 61/551,425, filed Oct. 25, 2011; U.S. Provisional Application 61/551,427, filed Oct. 25, 2011; U.S. Provisional Application 61/577,085, filed Dec. 18, 2011; U.S. Provisional Application 61/595,027, filed Feb. 4, 2012; U.S. Provisional Application 61/599,941, filed Feb. 17, 2012; U.S. Provisional Application 61/610,135, filed Mar. 13, 2012; U.S. Provisional Application 61/635,056, filed Apr. 18, 2012; U.S. Provisional Application 61/635,226, filed Apr. 18, 2012; and U.S. Provisional Application 61/647,516, filed May 16, 2012. This application claims the benefit of U.S. Provisional Application 61/551,425, filed Oct. 25, 2011; U.S. Provisional Application 61/551,427, filed Oct. 25, 2011; U.S. Provisional Application 61/577,085, filed Dec. 18, 2011; U.S. Provisional Application 61/595,027, filed Feb. 4, 2012; U.S. Provisional Application 61/599,941, filed Feb. 17, 2012; U.S. Provisional Application 61/610,135, filed Mar. 13, 2012; U.S. Provisional Application 61/635,056, filed Apr. 18, 2012; U.S. Provisional Application 61/635,226, filed Apr. 18, 2012; U.S. Provisional Application 61/647,516, filed May 16, 2012; and U.S. Provisional Application 61/684,693, filed Aug. 17, 2012. U.S. Provisional Applications 61/551,425, 61/551,427, 61/577,085, 61/595,027, 61/599,941, 61/610,135, 61/635,056, 61/635,226, 61/647,516, and 61/684,693 are incorporated herein by reference.

BACKGROUND

Many current enterprises have large and sophisticated networks comprising switches, hubs, routers, servers, workstations and other networked devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual components. Network configurations often depend on the underlying network: for example, blocking a user's access with an access control list ("ACL") entry requires knowing the user's current IP address. More complicated tasks require more extensive network knowledge: forcing guest users' port 80 traffic to traverse an HTTP proxy requires knowing the current network topology and the location of each guest. This process is of increased difficulty where the network switching elements are shared across multiple users.

In response, there is a growing movement, driven by both industry and academia, towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Making network management decisions often requires knowledge of the network state. To facilitate management decision-making, the network controller creates and maintains a view of the network state and provides an application programming interface upon which management applications may access a view of the network state.

Some of the primary goals of maintaining large networks (including both datacenters and enterprise networks) are scalability, mobility, and multi-tenancy. Many approaches taken to address one of these goals results in hampering at least one of the others. For instance, one can easily provide network mobility for virtual machines within a layer 2 (L2) domain, but L2 domains cannot scale to large sizes. Furthermore, retaining user isolation greatly complicates mobility. As such, improved solutions that can satisfy the scalability, mobility, and multi-tenancy goals are needed.

BRIEF SUMMARY

Some embodiments of the invention provide a network control system that allows several different logical datapath (LDP) sets to be specified for several different users through one or more shared forwarding elements without allowing the different users to control or even view each other's forwarding logic. These shared forwarding elements are referred to below as managed switching elements or managed forwarding elements as they are managed by the network control system in order to implement the LDP sets.

In some embodiments, the network control system includes one or more controllers (also called controller instances below) that allow the system to accept LDP sets from users and to configure the switching elements to implement these LDP sets. These controllers allow the system to virtualize control of the shared switching elements and the logical networks that are defined by the connections between these shared switching elements, in a manner that prevents the different users from viewing or controlling each other's LDP sets and logical networks while sharing the same switching elements.

In some embodiments, each controller instance is a device (e.g., a general-purpose computer) that executes one or more modules that transform the user input from a logical control plane to a logical forwarding plane, and then transform the logical forwarding plane data to physical control plane data. These modules in some embodiments include a control module and a virtualization module. A control module allows a user to specify and populate a logical datapath set (LDPS), while a virtualization module implements the specified LDPS by mapping the LDPS onto the physical switching infrastructure. In some embodiments, the control and virtualization modules are two separate applications, while in other embodiments they are part of the same application.

The control system of some embodiments detects a change in the state of the network or receives such a change from the user. The control system then updates the LDPS that is affected by the changes. The control system then converts the updated LDPS into physical data, which in turn is sent to the managed switching elements that implement the LDPS. By implementing the updated LDPS, the managed switching elements can forward data packets properly according to the updated logical datapath. The time it takes from the occurrence of the change in the state of the network to the implementation of the updated LDP sets at the managed switching elements is referred to as "network convergence time."

In order to reduce the network convergence time, the control system of some embodiments uses different techniques to optimize different parts of the control system. For instance, when a number of changes for a number of different LDP sets occur within a short period of time, a controller responsible for managing the LDP sets aggregates the changes based on the LDP sets that these changes affect. That is, the controller aggregates the changes that affect a first LDPS into a first group and aggregates the changes that affect a second LDPS into a second group. Then, the control application updates each particular LDPS using aggregated changes for the particular LDPS. Updating the LDP sets in this manner reduces the computation time for updating each LDPS because the control system can dedicate all resources to updating a single LDPS at a time instead of moving back and forth between changes that affect different LDP sets.

In some embodiments, the controller assigns different priorities to different changes based on the LDPS to which the changes affect. The control application processes first the changes that affect the LDPS with the highest priority. For instance, when a new change is received that has a higher priority than a priority assigned to an aggregated group of changes, the control application of the control system stops processing the group of aggregated changes and starts processing the new change even if not all of the changes in the aggregated group of changes have been processed. The control application processes the new change as well as a group of changes to which the new change belongs before going back to continue processing the aggregated group of changes in some embodiments.

In addition, when the network operating system (NOS) of the controller propagates the data resulting from updating the LDPS to the managed switching elements that implement the LDPS or to another controller, the NOS of the controller aggregates the data before sending them out so that all data related to a single LDPS is propagated together. By receiving related data to a single LDPS, the switching elements or the other controller can process the propagated data rapidly and efficiently and thus reduces overall network convergence time.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
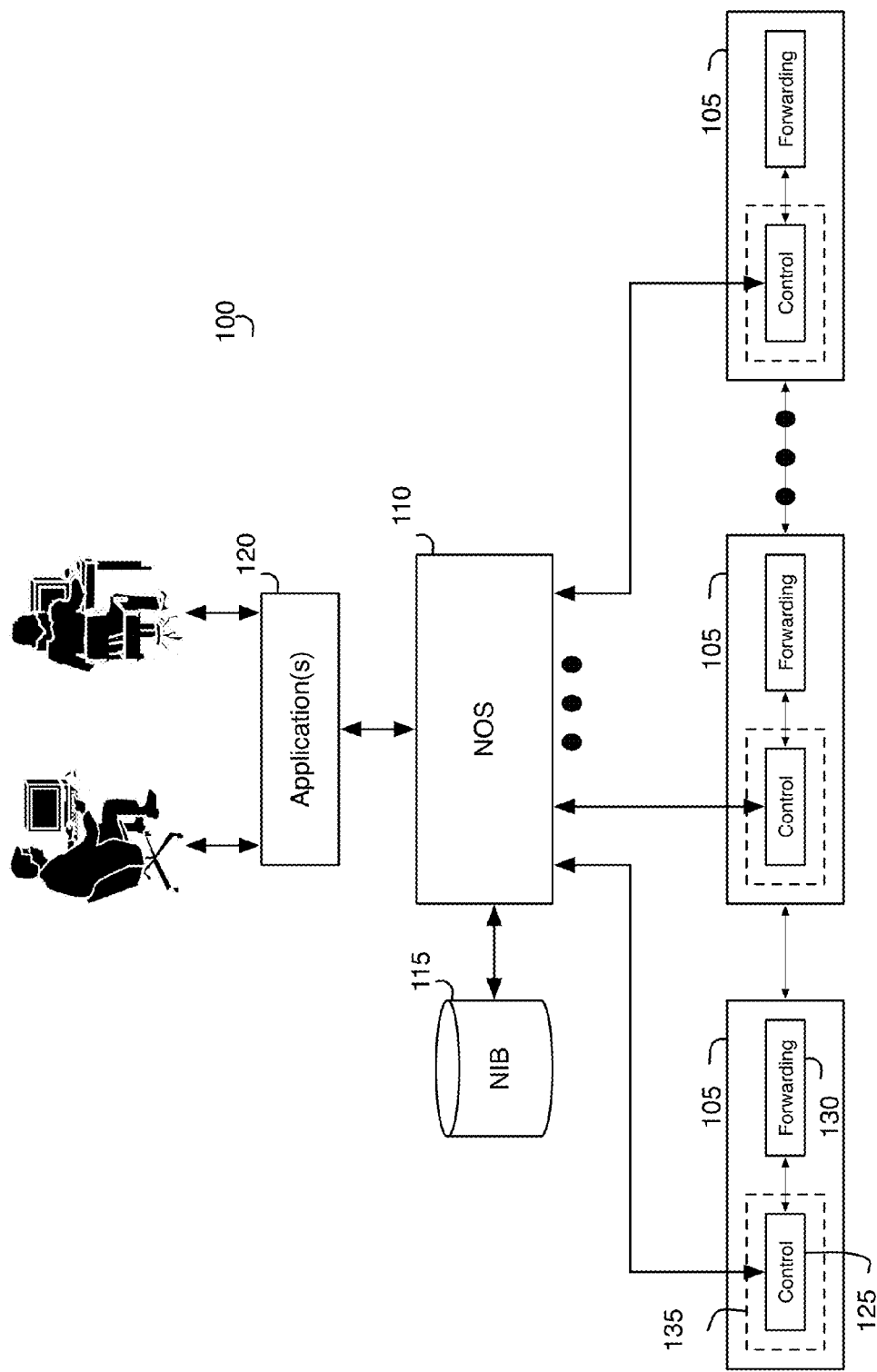
FIG. 1 illustrates a virtualized network system of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some of the embodiments described below are implemented in a novel network control system that is formed by one or more controllers (controller instances) for managing several managed switching elements. In some embodiments, the control application of a controller receives logical control plane (LCP) data and converts this data to logical forwarding plane (LFP) data that is then supplied to the virtualization application. The virtualization application then generates the physical control plane data from the LFP data. The physical control plane data is propagated to the managed switching elements.

In some embodiments, the controller instance uses a network information base (NIB) data structure to send the physical control plane data to the managed switching elements. A controller instance of some embodiments uses an n Log engine to generate LFP data from LCP data and physical control plane data from the LFP data. The controller instances of some embodiments communicate with each other to exchange the generated logical and physical data. In some embodiments, the NIB data structure may serve as a communication medium between different controller instances.

In some embodiments, the controller instance employs different scheduling schemes to quickly and efficiently produce universal physical control plane (UPCP) data and/or customized physical control plane (CPCP) data from user inputs or from the detected changes in the network state.

Several examples of a network control system are described below in Section I. Section II then describes universal forwarding state. Next, Section III describes scheduling schemes that the network control system employ. Section IV describes the rules engine of some embodiments. Finally, Section V describes the computer systems and processes used to implement some embodiments of the invention.

I. Network Control System

Some embodiments of the invention provide a method that allows several different logical datapath (LDP) sets to be specified for several different users through one or more shared switching elements without allowing the different users to control or even view each other's switching logic. In some embodiments, the method provides a set of software tools that allows the system to accept LDP sets from users and to configure the switching elements to implement these LDP sets. These software tools allow the method to virtualize control of the shared switching elements and the network that is defined by the connections between these shared switching elements, in a manner that prevents the different users from viewing or controlling each other's LDP sets while sharing the same switching elements.

In some embodiments, one of the software tools that the method provides that allows it to virtualize control of a set of switching elements (i.e., to enable the method to allow several users to share the same switching elements without viewing or controlling each other's LDP sets) is an intermediate data storage structure that (1) stores the state of the network, (2) receives modifications to different parts of the network from different users, and (3), in some embodiments, provide different views of the state of the network to different users. For instance, in some embodiments, the intermediate data storage structure is a network information base (NIB) data structure that stores the state of the network that is defined by one or more switching elements. In some embodiments, the NIB also stores the logical configuration and the logical state for each user specified logical datapath set (LDPS). In these embodiments, the information in the NIB that represents the state of the actual switching elements accounts for only a subset of the total information stored in the NIB.

The method of some embodiments uses the NIB data structure to read the state of the network and to write modifications to the state of the network. When the data structure is modified in order to effectuate a change in the switching logic of a switching element, the method propagates the modification to the switching element.

In some embodiments, the method is employed by a virtualized network control system that (1) allows users to specify different LDP sets, (2) maps these LDP sets to a set of switching elements managed by the control system. In some embodiments, the network infrastructure switching elements includes virtual or physical network switches, software switches (e.g., Open vSwitch), routers, and/or other switching devices, as well as any other network elements (such as load balancers, etc.) that establish connections between these switches, routers, and/or other switching devices. Such switching elements (e.g., physical switching elements, such as physical switches or routers) are implemented as software switches in some embodiments. Software switches are switches that are implemented by storing the switching tables in the memory of a standalone computer instead of an off the shelf switch. In some embodiments, the standalone computer may also be executing a hypervisor and one or more virtual machines on top of that hypervisor These switches are referred to as managed switching elements or managed forwarding elements as they are managed by the network control system in order to implement the LDP sets. In some embodiments, the control system manages these switching elements by pushing physical control plane data to them, as further described below. Switching elements generally receive data (e.g., a data packet) and perform one or more processing operations on the data, such as dropping a received data packet, passing a packet that is received from one source device to another destination device, processing the packet and then passing it a destination device, etc. In some embodiments, the physical control plane data that is pushed to a switching element is converted by the switching element (e.g., by a general purpose processor of the switching element) to physical forwarding plane data that specify how the switching element (e.g., how a specialized switching circuit of the switching element) processes data packets that it receives.

The network control system of some embodiments includes (1) a network operating system (NOS) that creates and maintains the NIB storage structure, and (2) one or more applications that run on top of the NOS to specify control logic for reading values from and writing values to the NIB. The NIB of some of these embodiments serves as a communication channel between the different controller instances and, in some embodiments, a communication channel between different processing layers of a controller instance.

FIG. 1 illustrates a virtualized network system 100 of some embodiments of the invention. This system allows multiple users to create and control multiple different sets of logical datapaths on a shared set of network infrastructure switching elements (e.g., switches, virtual switches, software switches, etc.). In allowing a user to create and control the user's set of logical datapaths (i.e., the user's switching logic), the system does not allow the user to have direct access to another user's set of logical datapaths in order to view or modify the other user's switching logic. However, the system does allow different users to pass packets through their virtualized switching logic to each other if the users desire such communication.

As shown in FIG. 1, the system 100 includes one or more switching elements 105, a network operating system 110, a network information base 115, and one or more applications 120. The switching elements include N switching devices (where N is a number equal to 1 or greater) that form the network infrastructure switching elements of the system 100. In some embodiments, the network infrastructure switching elements includes virtual or physical network switches, software switches (e.g., Open vSwitch), routers, and/or other switching devices, as well as any other network elements (such as middleboxes, etc.) that establish connections between these switches, routers, and/or other switching devices. All such network infrastructure switching elements are referred to below as switching elements or forwarding elements.

The virtual or physical switching devices 105 typically include control switching logic 125 and forwarding switching logic 130. In some embodiments, a switch's control logic 125 specifies (1) the rules that are to be applied to incoming packets, (2) the packets that will be discarded, and (3) the packet processing methods that will be applied to incoming packets. The virtual or physical switching elements 105 use the control logic 125 to populate tables governing the forwarding logic 130. The forwarding logic 130 performs lookup operations on incoming packets and forwards the incoming packets to destination addresses.

As further shown in FIG. 1, the system 100 includes one or more applications 120 through which switching logic (i.e., sets of logical datapaths) is specified for one or more users (e.g., by one or more administrators or users). The network operating system (NOS) 110 serves as a communication interface between (1) the switching elements 105 that perform the physical switching for any one user, and (2) the applications 120 that are used to specify switching logic for the users. In this manner, the application logic determines the desired network behavior while the NOS merely provides the primitives needed to access the appropriate network state. In some embodiments, the NOS 110 provides a set of Application Programming Interfaces (API) that provides the applications 120 programmatic access to the network switching elements 105 (e.g., access to read and write the configuration of network switching elements). In some embodiments, this API set is data-centric and is designed around a view of the switching infrastructure, allowing control applications to read and write state to any element in the network.

To provide the applications 120 programmatic access to the switching elements, the NOS 110 needs to be able to control the switching elements 105 itself. The NOS uses different techniques in different embodiments to control the switching elements. In some embodiments, the NOS can specify both control and forwarding switching logic 125 and 130 of the switching elements. In other embodiments, the NOS 110 controls only the control switching logic 125 of the switching elements, as shown in FIG. 1. In some of these embodiments, the NOS 110 manages the control switching logic 125 of a switching element through a commonly known switch-access interface that specifies a set of APIs for allowing an external application (such as a network operating system) to control the control plane functionality of a switching element. Two examples of such known switch-access interfaces are the OpenFlow interface and the Open Virtual Switch (OVS) interface, which are respectively described in the following two papers: McKeown, N. (2008). *OpenFlow: Enabling Innovation in Campus Networks* (which can be retrieved from http://www.openflowswitch.org//documents/openflow-wp-latest-.pdf), and Pettit, J. (2010). *Virtual Switching in an Era of Advanced Edges* (which can be retrieved from http://openvswitch.org/papers/dccaves2010.pdf). These two papers are incorporated herein by reference.

FIG. 1 conceptually illustrates the use of switch-access APIs through the depiction of halos 135 around the control switching logic 125. Through these APIs, the NOS can read and write entries in the control plane flow tables. The NOS' connectivity to the switching elements' control plane resources (e.g., the control plane tables) is implemented in-band (i.e., with the network traffic controlled by NOS) in some embodiments, while it is implemented out-of-band (i.e., over a separate physical network) in other embodiments. There are only minimal requirements for the chosen mechanism beyond convergence on failure and basic connectivity to the NOS, and thus, when using a separate network, standard IGP protocols such as IS-IS or OSPF are sufficient.

In order to define the control switching logic 125 for physical switching elements, the NOS of some embodiments uses the Open Virtual Switch protocol to create one or more control tables within the control plane of a switch element. The control plane is typically created and executed by a general purpose CPU of the switching element. Once the system has created the control table(s), the system then writes flow entries to the control table(s) using the OpenFlow protocol. The general purpose CPU of the physical switching element uses its internal logic to convert entries written to the control table(s) to populate one or more forwarding tables in the forwarding plane of the switch element. The forwarding tables are created and executed typically by a specialized switching chip of the switching element. Through its execution of the flow entries within the forwarding tables, the switching chip of the switching element can process and route packets of data that it receives.

To enable the programmatic access of the applications 120 to the switching elements 105, the NOS also creates the network information base (NIB) 115. The NIB is a data structure in which the NOS stores a copy of the switch-element states tracked by NOS. The NIB of some embodiments is a graph of all physical or virtual switch elements and their interconnections within a physical network topology and their forwarding tables. For instance, in some embodiments, each switching element within the network infrastructure is represented by one or more data objects in the NIB. However, in other embodiments, the NIB stores state information about only some of the switching elements. For example, as further described below, the NIB in some embodiments only keeps track of switching elements at the edge of a network infrastructure. In yet other embodiments, the NIB stores state information about edge switching elements in a network as well as some non-edge switching elements in the network that facilitate communication between the edge switching elements. In some embodiments, the NIB also stores the logical configuration and the logical state for each user specified LDPS. In these embodiments, the information in the NIB that represents the state of the actual switching elements accounts for only a subset of the total information stored in the NIB.

In some embodiments, the NIB 115 is the heart of the NOS control model in the virtualized network system 100. Under one approach, applications control the network by reading from and writing to the NIB. Specifically, in some embodiments, the application control logic can (1) read the current state associated with network entity objects in the NIB, (2) alter the network state by operating on these objects, and (3) register for notifications of state changes to these objects. Under this model, when an application 120 needs to modify a record in a table (e.g., a control plane flow table) of a switching element 105, the application 120 first uses the NOS' APIs to write to one or more objects in the NIB that represent the table in the NIB. The NOS then acting as the switching element's controller propagates this change to the switching element's table. The NIB and NOS of a virtualized network system are further described in U.S. patent application Ser. No. 13/177,529, filed Jul. 6, 2011, now issued as U.S. Pat. No. 8,743,889. U.S. patent application Ser. No. 13/177,529, now issued as U.S. Pat. No. 8,743,889, is incorporated herein by reference.

Figure 2:
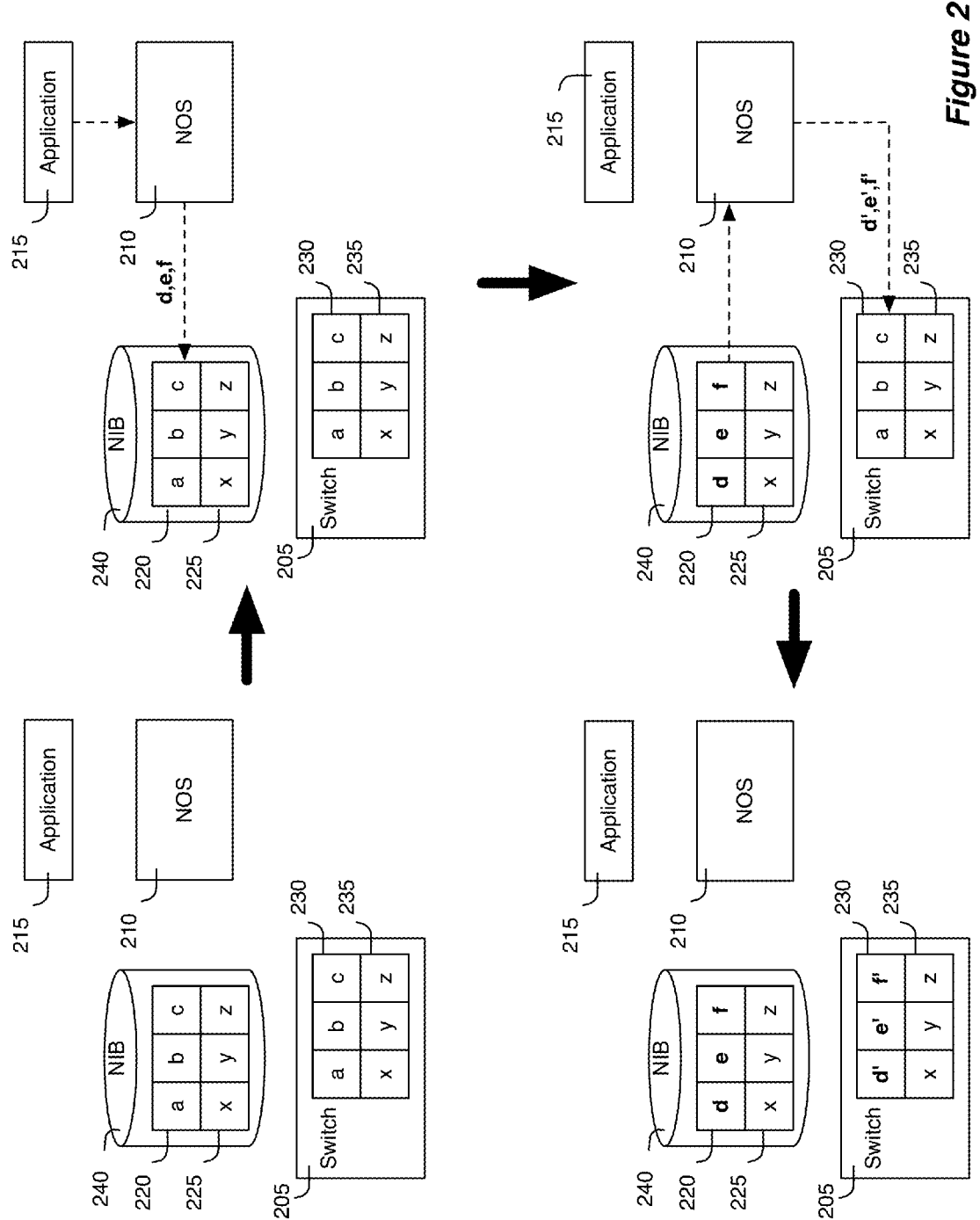
FIG. 2 illustrates an example of switch controller functionality of the network operating system (NOS) of some embodiments.

FIG. 2 presents one example that illustrates this switch controller functionality of the NOS 110. In particular, this figure illustrates in four stages the modification of a record (e.g., a flow table record) in a switch 205 by an application 215 and a NOS 210. In this example, the switch 205 has two switch logic records 230 and 235. As shown in stage one of FIG. 2, a NIB 240 stores two records 220 and 225 that correspond to the two switch logic records 230 and 235 of the switch. In the second stage, the application uses the NOS' APIs to write three new values d, e, and f in the record 220 of the NIB to replace three previous values a, b, and c.

Next, in the third stage, the NOS uses the set of switch-access APIs to write a new set of values into the switch. In some embodiments, the NIB performs a translation operation that modifies the format of the records before writing these records into the NIB. These operations are pictorially illustrated in FIG. 2 by showing the values d,e,f translated into d',e',f', and the writing of these new values into the switch 205. Alternatively, in some embodiments, one or more sets of values are kept identically in the NIB and the switching element, which thereby causes the NOS 210 to write the NIB values directly to the switch 205 unchanged.

In yet other embodiments, the NOS' translation operation might modify the set of values in the NIB (e.g., the values d, e, f) into a different set of values with fewer values (e.g., values x and y, where x and y might be a subset of d, e, and f, or completely different) or additional values (e.g., the w,x,y,z, where w, x, y, and z might be a super set of all or some of d, e, and f, or completely different). The NOS in these embodiments would then write this modified set of values (e.g., values x and y, or values w, x, y and z into the switching element).

The fourth stage finally shows the switch 205 after the old values a, b, and c have been replaced in the switch control record 230 with the values d', e', and f'. Again, in the example shown in FIG. 2, the NOS of some embodiments propagates NIB records to the switches as modified versions of the records that were written to the NIB. In other embodiments, the NOS applies processing (e.g., data transformation) to the NIB records before the NOS propagates the NIB records to the switches, and such processing changes the format, content and quantity of data written to the switches.

A. Different NIB Views

In some embodiments, the virtualized system 100 of FIG. 1 provides different views of the NIB to different users in order (1) to ensure that different users do not have direct view and control over each other's switching logic and (2) to provide each user with a view of the switching logic at an abstraction level that is desired by the user. For instance, in some embodiments, the NIB is a hierarchical data structure that represents different attributes of different switching elements as elements (e.g., different nodes) in a hierarchy. The NIB in some of these embodiments is a multi-layer hierarchical data structure, with each layer having a hierarchical structure and one or more elements (e.g., nodes) on each layer linked to one or more elements (e.g., nodes) on another layer. In some embodiments, the lowest layer elements correspond to the actual switching elements and their attributes, while each of the higher layer elements serves as abstractions of the actual switching elements and their attributes. As further described below, some of these higher layer elements are used in some embodiments to show different abstract switching elements and/or switching element attributes to different users in a network control system. In other words, the NOS of some embodiments generates the multi-layer, hierarchical NIB data structure, and the NOS or an application that runs on top of the NOS shows different users different views of different parts of the hierarchical levels and/or layers, in order to provide the different users with virtualized access to the shared switching elements and network.

Figure 3:
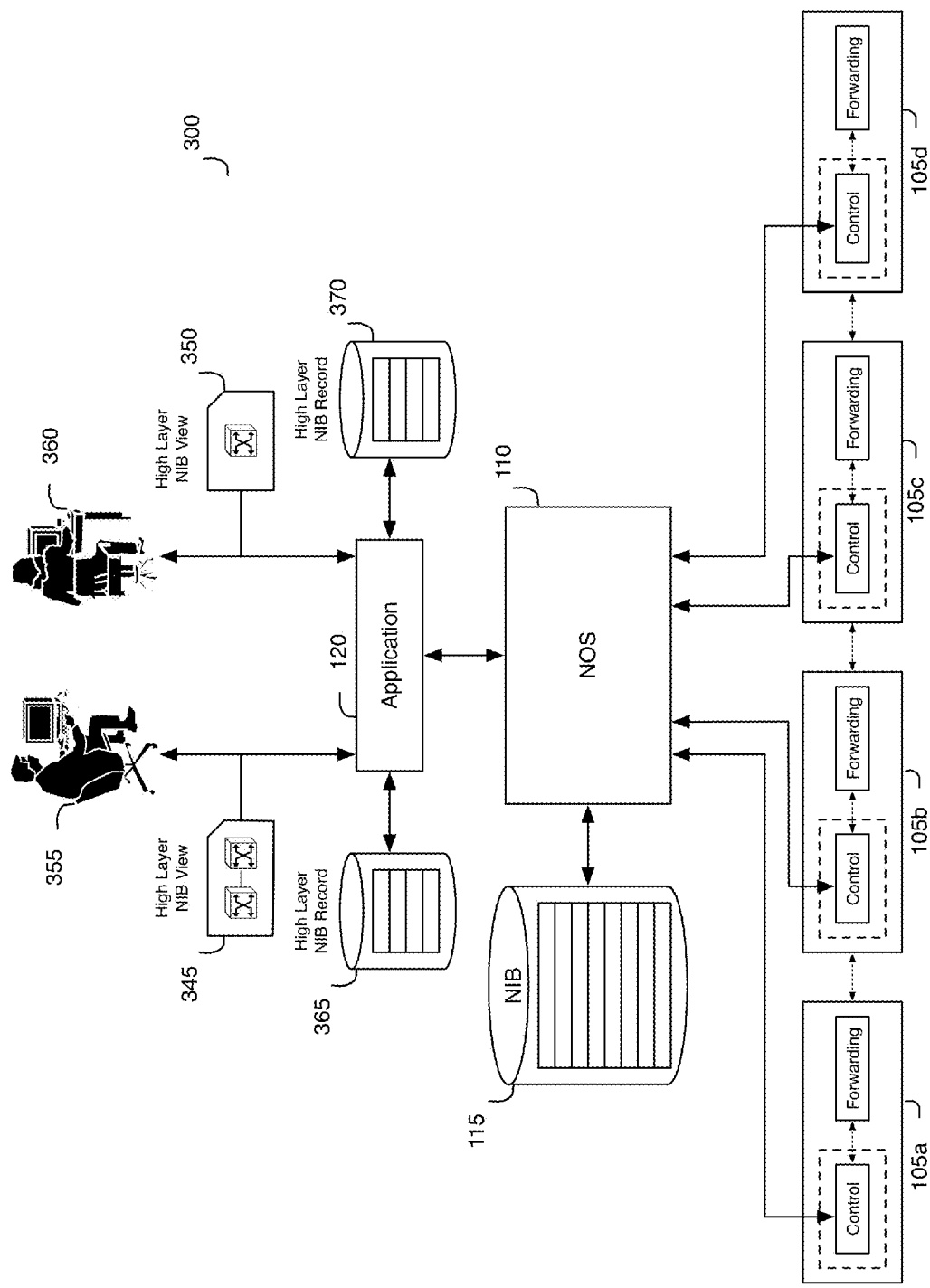
FIG. 3 illustrates an example of displaying different network information base (NIB) views to different users.

FIG. 3 illustrates an example of displaying different NIB views to different users. Specifically, this figure illustrates a virtualized switching system 300 that includes several switching elements that are shared by two users. The system 300 is similar to the system 100 of FIG. 1, except that the system 300 is shown to include four switching elements 105a-105d and one application 120, as opposed to the more general case of N switching elements 105 and M (where M is a number greater than or equal to 1) applications in FIG. 1. The number of switching elements and the use of one application are purely exemplary. Other embodiments might use more or fewer switching elements and applications. For instance, instead of having the two users interface with the same application, other embodiments provide two applications to interface with the two users.

In system 300, the NIB 115 stores sets of data records for each of the switching elements 105a-105d. In some embodiments, a system administrator can access these four sets of data through an application 120 that interfaces with the NOS. However, other users that are not system administrators do not have access to all of the four sets of records in the NIB, because some switch logic records in the NIB might relate to the logical switching configuration of other users.

Instead, each non system-administrator user can only view and modify the switching element records in the NIB that relate to the logical switching configuration of the user. FIG. 3 illustrates this limited view by showing the application 120 providing a first layered NIB view 345 to a first user 355 and a second layered NIB view 350 to a second user 360. The first layered NIB view 345 shows the first user data records regarding the configuration of the shared switching elements 105a-105d for implementing the first user's switching logic and the state of this configuration. The second layered NIB view 350 shows the second user data records regarding the configuration of the shared switching elements 105a-105d for implementing the second user's switching logic and the state of this configuration. In viewing their own logical switching configuration, neither user can view the other user's logical switching configuration.

In some embodiments, each user's NIB view is a higher level NIB view that represents an abstraction of the lowest level NIB view that correlates to the actual network infrastructure that is formed by the switching elements 105a-105d. For instance, as shown in FIG. 3, the first user's layered NIB view 345 shows two switches that implement the first user's logical switching configuration, while the second user's layered NIB view 350 shows one switch that implements the second user's logical switching configuration. This could be the case even if either user's switching configuration uses all four switching elements 105a-105d. However, under this approach, the first user perceives that his computing devices are interconnected by two switching elements, while the second user perceives that her computing devices are interconnected by one switching element.

The first layered NIB view is a reflection of a first set of data records 365 that the application 120 allows the first user to access from the NIB, while the second layered NIB view is a representation of a second set of data records 370 that the application 120 allows the second user to access from the NIB. In some embodiments, the application 120 retrieves the two sets of data records 365 and 370 from the NIB and maintains these records locally, as shown in FIG. 3. In other embodiments, however, the application does not maintain these two sets of data records locally. Instead, in these other embodiments, the application simply provides the users with an interface to access the limited set of first and second data records from the NIB 115. Also, in other embodiments, the system 300 does not provide switching element abstractions in the higher layered NIB views 345 and 350 that it provides to the users. Rather, it simply provides views to the limited first and second set of data records 365 and 370 from the NIB.

Irrespective of whether the application maintains a local copy of the first and second data records or whether the application only provides the switching element abstractions in its higher layered NIB views, the application 120 serves as an interface through which each user can view and modify the user's logical switching configuration, without being able to view or modify the other user's logical switching configuration. Through the set of APIs provided by the NOS 110, the application 120 propagates to the NIB 115 changes that a user makes to the logical switching configuration view that the user receives from the application. The propagation of these changes entails the transferring, and in some cases of some embodiments, the transformation, of the high level data entered by a user for a higher level NIB view to lower level data that is to be written to lower level NIB data that is stored by the NOS.

In the system 300 of FIG. 3, the application 120 can perform several different sets of operations in several different embodiments of the invention, as discussed above. Examples of such operations include providing an interface to a user to access NIB data regarding the user's logical switching configuration, providing different layered NIB views to different users, providing control logic for modifying the provided NIB data, providing logic for propagating received modifications to the NIB structure stored by the NOS, etc.

Figure 4:
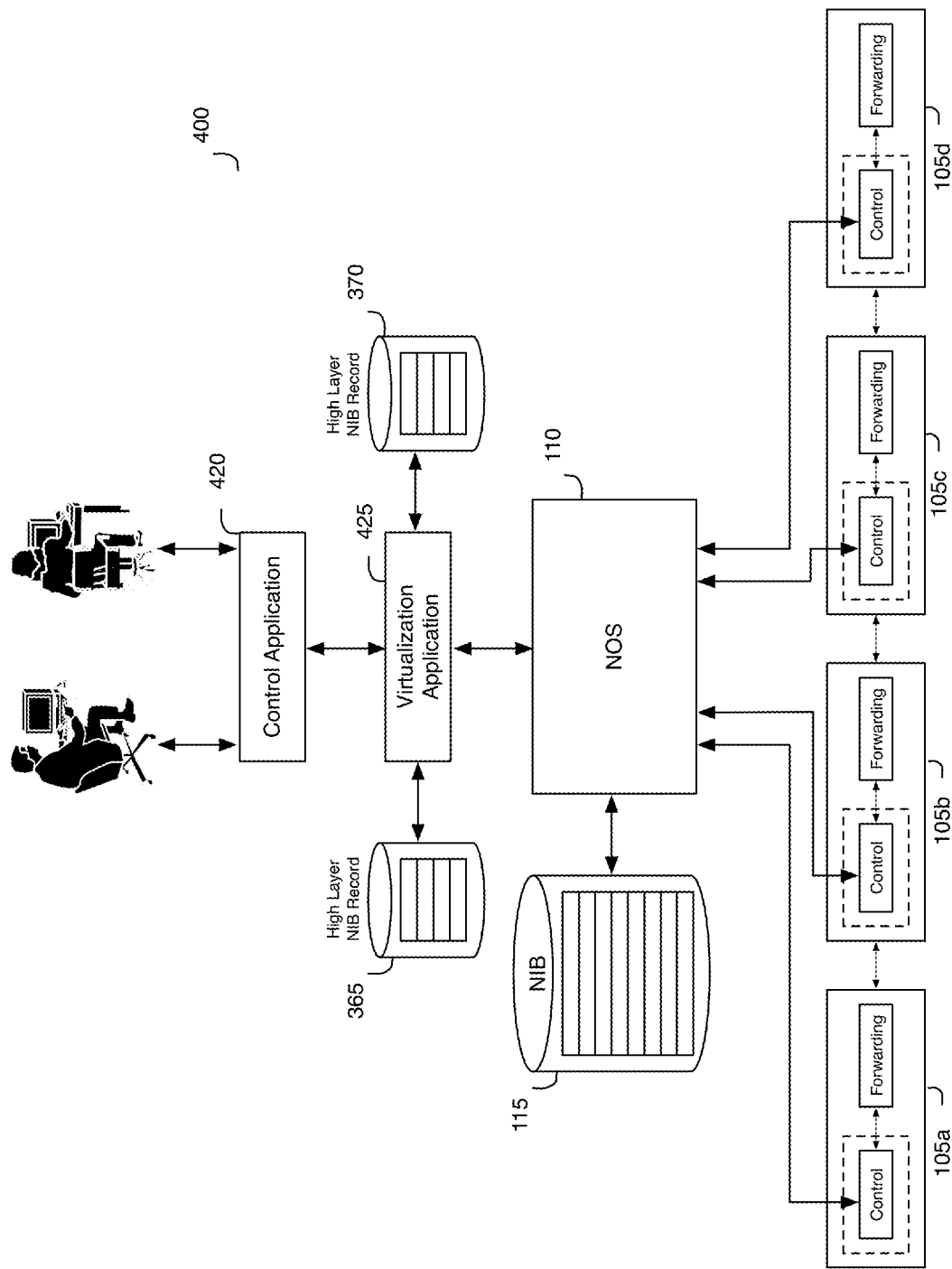
FIG. 4 illustrates a virtualized system that employs control and virtualization applications.

The system of some embodiments embeds all such operations in the NOS 110 instead of in the application 120 operating on top of the NOS. Alternatively, in other embodiments the system separates these operations into several applications that operate above the NOS. FIG. 4 illustrates a virtualized system that employs several such applications. Specifically, this figure illustrates a virtualized system 400 that is similar to the virtualized system 300 of FIG. 3, except that the operations of the application 120 in the system 400 have been divided into two sets of operations, one that is performed by a control application 420 and one that is performed by a virtualization application 425.

In some embodiments, the virtualization application 425 interfaces with the NOS 110 to provide different views of different NIB records to different users through the control application 420. The control application 420 provides the control logic for allowing a user to specify different operations with respect to the limited NIB records/views provided by the virtualization application. Examples of such operations can be read operations from the NIB or write operations to the NIB. The virtualization application then translates these operations into operations that access the NIB. In translating these operations, the virtualization application in some embodiments also transfers and/or transforms the data that are expressed in terms of the higher level NIB records/views to data that are expressed in terms of lower level NIB records.

Even though FIG. 4 shows just one control application and one virtualization application being used for the two users, the system 400 in other embodiments employs two control applications and/or two virtualization applications for the two different users. Similarly, even though several of the above-described figures show one or more applications operating on a single NOS instance, other embodiments provide several different NOS instances on top of each of which, one or more applications can execute.

B. Virtualization Application

A network control system of different embodiments allows mapping of the LDP sets of the user to the physical switching elements of the control system differently. In some embodiments, the virtualization application of the system exposes the definition of different elements at different hierarchical levels in the NIB and the definition of the links between these elements to the control applications that run on top of the NOS and the virtualization application in order to allow the control application to define its operations by reference to these definitions. For instance, in some embodiments, the developer of the control application running on top of the virtualization application uses these definitions to enumerate how the application is to map the LDP sets of the user to the physical switching elements of the control system. Under this approach, the developer would have to enumerate all different scenarios that the control system may encounter and the mapping operation of the application for each scenario.

Alternatively, the network control system in some embodiments does not require the application developers to have intimate knowledge of the NIB elements and the links in the NIB between these elements. Instead, the virtualization application of the system in these embodiments allows the control applications to simply provide user specified switching element attributes in the form of one or more tables, which are then mapped to NIB records by a table mapping engine. In other words, the virtualization application accepts switching element configurations (e.g., access control list table configurations, L2 table configurations, L3 table configurations, etc.) that the user defines without referencing any operational state of the switching elements in a particular network configuration. The virtualization application then maps the user-specified switching element configurations to the switching element configurations stored in the NIB.

Figure 5:
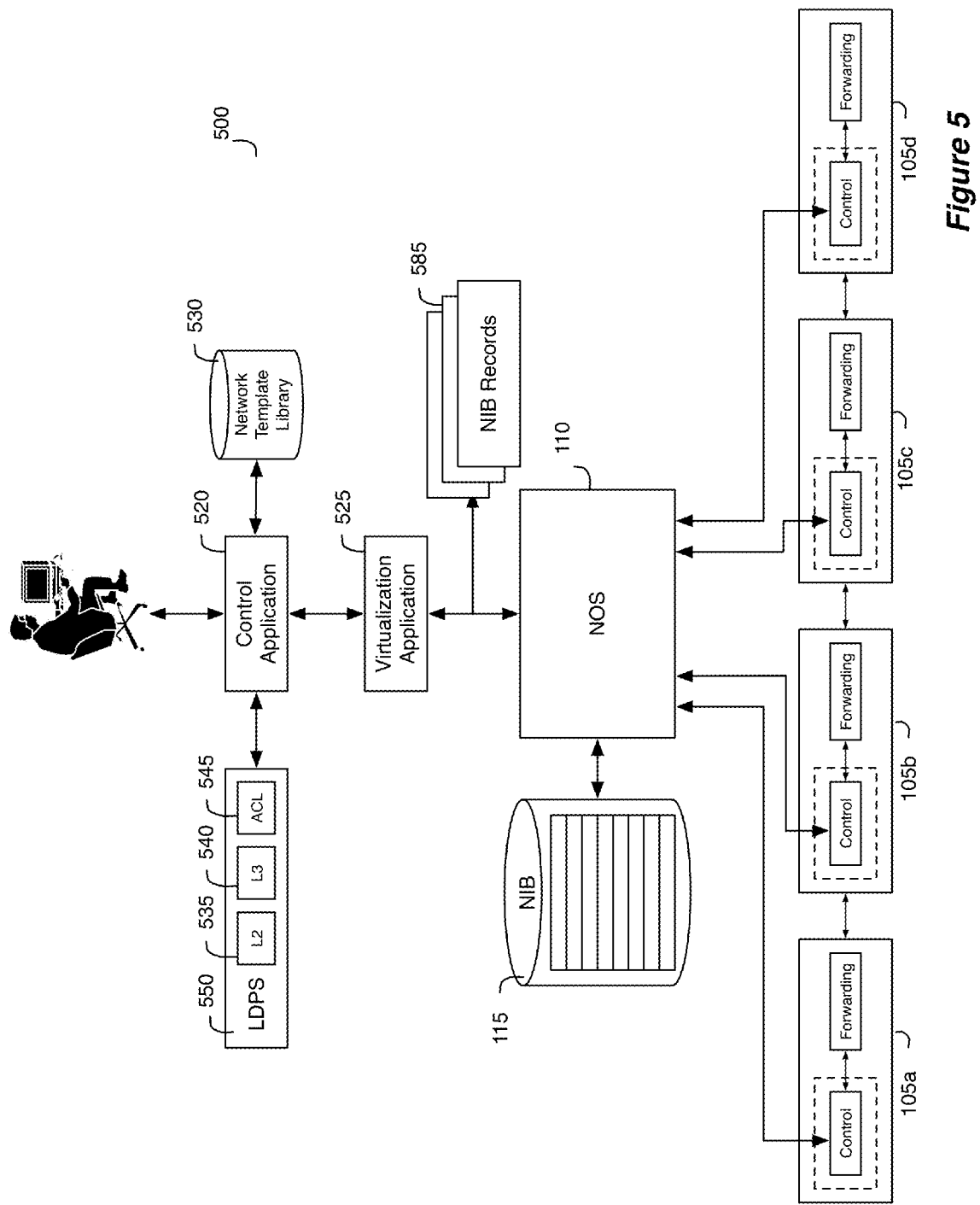
FIG. 5 illustrates an example of a virtualized system of some embodiments.

FIG. 5 illustrates an example of such a virtualized system. Like the virtualized system 300 of FIG. 3 and the virtualized system 400 of FIG. 4, the virtualized system 500 in this example is shown to include one NOS 110 and four switching elements 105a-105d. Also, like the virtualized system 400, the system 500 includes a control application 520 and a virtualization application 525 that run on top of the NOS 110. In some embodiments, the control application 520 allows a user to specify and populate LDP sets, while the virtualization application 525 implements the specified LDP sets by mapping the LDPS to the physical switching infrastructure.

More specifically, the control application 520 allows (1) a user to specify abstract switching element configurations, which the virtualization application 525 then maps to the data records in the NIB, and (2) the user to view the state of the abstract switching element configurations. In some embodiments, the control application 520 uses a network template library 530 to allow a user to specify a set of logical datapaths by specifying one or more switch element attributes (i.e., one or more switch element configurations). In the example shown in FIG. 5, the network template library includes several types of tables that a switching element may include. In this example, the user has interfaced with the control application 520 to specify an L2 table 535, an L3 table 540, and an access control list (ACL) table 545. These three tables specify a LDPS 550 for the user. In specifying these tables, the user simply specifies desired switch configuration records for one or more abstract, logical switching elements. When specifying these records, the user of the system 500 does not have any understanding of the switching elements 105a-105d employed by the system or any data regarding these switching elements from the NIB 115. The only switch-element specific data that the user of the system 500 receives is the data from the network template library, which specifies the types of network elements that the user can define in the abstract, which the system can then process.

While the example in FIG. 5 shows the user specifying an ACL table, one of ordinary skill in the art will realize that the system of some embodiments does not provide such specific switch table attributes in the library 530. For instance, in some embodiments, the switch-element abstractions provided by the library 530 are generic switch tables and do not relate to any specific switching element table, component and/or architecture. In these embodiments, the control application 520 enables the user to create generic switch configurations for a generic set of one or more tables. Accordingly, the abstraction level of the switch-element attributes that the control application 520 allows the user to create is different in different embodiments.

Irrespective of the abstraction level of the switch-element attributes produced through the control logic application, the virtualization application 525 performs a mapping operation that maps the specified switch-element attributes (e.g., the specific or generic switch table records) to records in the NIB. In some embodiments, the virtualization application translates control application input into one or more NIB records 585. The virtualization application then writes the resulting NIB records 585 to the NIB through the API set provided by NOS. From the NIB, these records are then subsequently transferred to the switching infrastructure through the operation of the NOS. In some embodiments, the NIB stores both the LDPS input received through the control application as well as the NIB records that are produced by the virtualization application.

In some embodiments, the control application can receive switching infrastructure data from the NIB. In response to this data, the control application may modify record(s) associated with one or more LDP sets. Any such modified LDPS record would then be translated to one or more physical switching infrastructure records by the virtualization application, which might then be transferred to the physical switching infrastructure by the NOS.

To map the control application input to physical switching infrastructure attributes for storage in the NIB, the virtualization application of some embodiments uses a database table mapping engine to map input tables to output tables. These input tables are created from (1) the control-application specified input tables, and (2) a set of properties associated with switching elements used by the system. The content of these output tables are then transferred to the NIB elements.

Some embodiments use a variation of the datalog database language to allow application developers to create the table mapping engine for the virtualization application, and thereby to specify the manner by which the virtualization application maps LDP sets to the controlled physical switching infrastructure. This variation of the datalog database language is referred to below as n Log. Like datalog, n Log provides a few declaratory rules and operators that allow a developer to specify different operations that are to be performed upon the occurrence of different events. In some embodiments, n Log provides a limited subset of the operators that are provided by datalog in order to increase the operational speed of n Log. For instance, in some embodiments, n Log only allows the AND operator to be used in any of the declaratory rules.

The declaratory rules and operations that are specified through n Log are then compiled into a much larger set of rules by an n Log compiler. In some embodiments, this compiler translates each rule that is meant to address an event into several sets of database join operations. Collectively the larger set of rules forms the table mapping, rules engine that is referred to below as the n Log engine. The n Log mapping techniques of some embodiments is further described below.

In some embodiments, the n Log virtualization engine provides feedback (e.g., from one or more of the output tables or from NIB records that are updated to reflect values stored in the output tables) to the user in order to provide the user with state information about the LDPS that he or she created. In this manner, the updates that the user gets are expressed in terms of the logical space that the user understands and not in terms of the underlying switching element states, which the user does not understand.

The use of n Log allows the application developers to produce applications that express the user-specified LDP sets in terms of one or more tables, which are then automatically mapped to output tables whose content are in turn transferred to the NIB. Also, because the n Log provides a machine-generated rules engine that addresses the mapping between the logical and physical domains, the need for maintaining the data regarding the LDP sets in the NIB is eliminated. However, some embodiments maintain this data in the NIB in order to distribute this data among other NOS instances, as further described below.

C. Edge and Non-Edge Switch Controls

Figure 6:
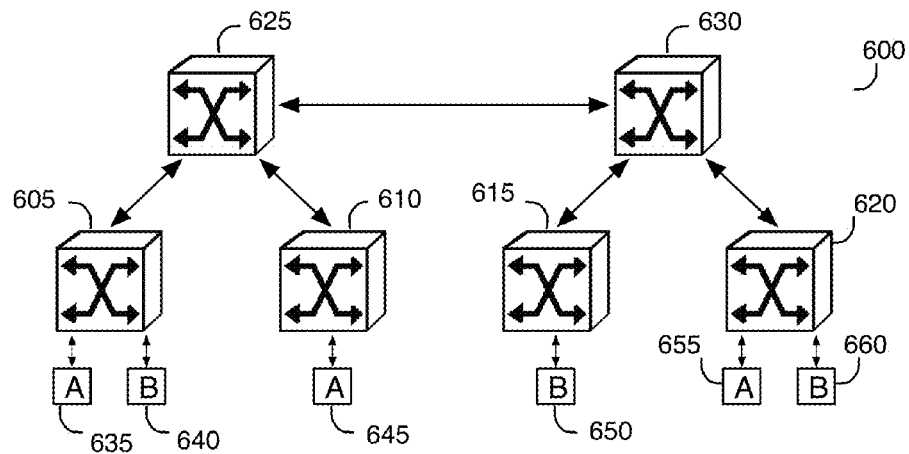
FIG. 6 illustrates the switch infrastructure of a multi-tenant server hosting system in some embodiments.
Figure 7:
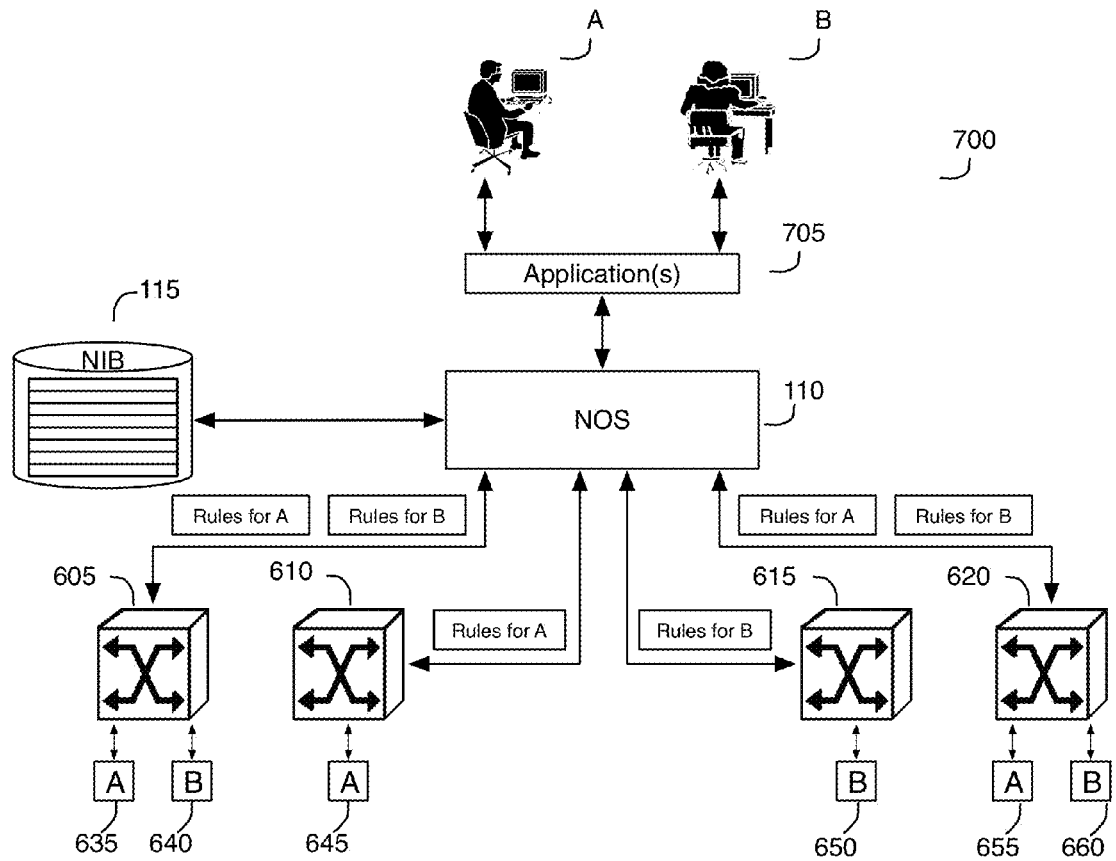
FIG. 7 illustrates a virtualized network control system that manages edge switches.

As mentioned above, the NIB in some embodiments stores data regarding each switching element within the network infrastructure of a system, while in other embodiments, the NIB stores state information about only switching elements at the edge of a network infrastructure. FIGS. 6 and 7 illustrate an example that differentiates the two differing approaches. Specifically, FIG. 6 illustrates the switch infrastructure of a multi-tenant server hosting system. In this system, six switching elements are employed to interconnect six computing devices of two users A and B. Four of these switches 605-620 are edge switches that have direct connections with the computing devices 635-660 of the users A and B, while two of the switches 625 and 630 are interior switches (i.e., non-edge switches) that interconnect the edge switches and connect to each other.

FIG. 7 illustrates a virtualized network control system 700 that manages the edge switches 605-620. As shown in this figure, the system 700 includes a NOS 110 that creates and maintains a NIB 115, which contains data records regarding only the four edge switching elements 605-620. In addition, the applications 705 running on top of the NOS 110 allow the users A and B to modify their switch element configurations for the edge switches that they use. The NOS then propagates these modifications if needed to the edge switching elements. Specifically, in this example, two edge switches 605 and 620 are used by computing devices of both users A and B, while edge switch 610 is only used by the computing device 645 of the user A and edge switch 615 is only used by the computing device 650 of the user B. Accordingly, FIG. 7 illustrates the NOS modifying users A and B records in switches 605 and 620, but only updating user A records in switch element 610 and only user B records in switch element 615.

The system of some embodiments only controls edge switches (i.e., only maintains data in the NIB regarding edge switches) for several reasons. Controlling edge switches provides the system with a sufficient mechanism for maintaining isolation between computing devices, which is needed, as opposed to maintaining isolation between all switch elements, which is not needed. The interior switches forward data packets between switching elements. The edge switches forward data packets between computing devices and other network elements (e.g., other switching elements). Thus, the system can maintain user isolation simply by controlling the edge switch because the edge switch is the last switch in line to forward packets to a host.

Controlling only edge switches also allows the system to be deployed independent of concerns about the hardware vendor of the non-edge switches, because deploying at the edge allows the edge switches to treat the internal nodes of the network as simply a collection of elements that moves packets without considering the hardware makeup of these internal nodes. Also, controlling only edge switches makes distributing switching logic computationally easier. Controlling only edge switches also enables non-disruptive deployment of the system because edge-switching solutions can be added as top of rack switches without disrupting the configuration of the non-edge switches.

In addition to controlling edge switches, the network control system of some embodiments also utilizes and controls non-edge switches that are inserted in the switch network hierarchy to simplify and/or facilitate the operation of the controlled edge switches. For instance, in some embodiments, the control system requires the switches that it controls to be interconnected in a hierarchical switching architecture that has several edge switches as the leaf nodes and one or more non-edge switches as the non-leaf nodes. In some such embodiments, each edge switch connects to one or more of the non-leaf switches, and uses such non-leaf switches to facilitate its communication with other edge switches. Examples of functions that a non-leaf switch of some embodiments may provide to facilitate such communications between edge switch in some embodiments include (1) routing of a packet with an unknown destination address (e.g., unknown MAC address) to the non-leaf switch so that this switch can route this packet to the appropriate edge switch, (2) routing a multicast or broadcast packet to the non-leaf switch so that this switch can convert this packet to a series of unicast packets to the desired destinations, (3) bridging remote managed networks that are separated by one or more networks, and (4) bridging a managed network with an unmanaged network.

Some embodiments employ one level of non-leaf (non-edge) switches that connect to edge switches and in some cases to other non-leaf switches. Other embodiments, on the other hand, employ multiple levels of non-leaf switches, with each level of non-leaf switch after the first level serving as a mechanism to facilitate communication between lower level non-leaf switches and leaf switches. In some embodiments, the non-leaf switches are software switches that are implemented by storing the switching tables in the memory of a standalone computer instead of an off the shelf switch. In some embodiments, the standalone computer may also be executing in some cases a hypervisor and one or more virtual machines on top of that hypervisor. Irrespective of the manner by which the leaf and non-leaf switches are implemented, the NIB of the control system of some embodiments stores switching state information regarding the leaf and non-leaf switches.

The above discussion relates to the control of edge switches and non-edge switches by a network control system of some embodiments. In some embodiments, edge switches and non-edge switches (leaf and non-leaf nodes) may be referred to as managed switching elements. This is because these switches are managed by the network control system (as opposed to unmanaged switching elements, which are not managed by the network control system, in the network) in order to implement LDP sets through the managed switching elements.

D. Secondary Storage Structure

In addition to using the NIB to store switching-element data, the virtualized network-control system of some embodiments also stores other storage structures to store data regarding the switching elements of the network. These other storage structures are secondary storage structures that supplement the storage functions of the NIB, which is the primary storage structure of the system while the system operates. In some embodiments, the primary purpose for one or more of the secondary storage structures is to back up the data in the NIB. In these or other embodiments, one or more of the secondary storage structures serves a purpose other than backing up the data in the NIB (e.g., for storing data that are not in the NIB). For instance, the secondary storage structure of some embodiments is used as a communication channel among virtualization applications and/or other applications that run on top of the NOS, a communication channel between different network controllers of the system, a medium through which physical plane data are pushed to the managed switching elements of the system, etc.

In some embodiments, the NIB is stored in system memory (e.g., RAM) while the system operates. This allows for the fast access of the NIB records. In some embodiments, one or more of the secondary storage structures, on the other hand, are stored on disk or other non-volatile memories that are slower to access. Such non-volatile disk or other storages, however, improve the resiliency of the system as they allow the data to be stored in a persistent manner.

Figure 8:
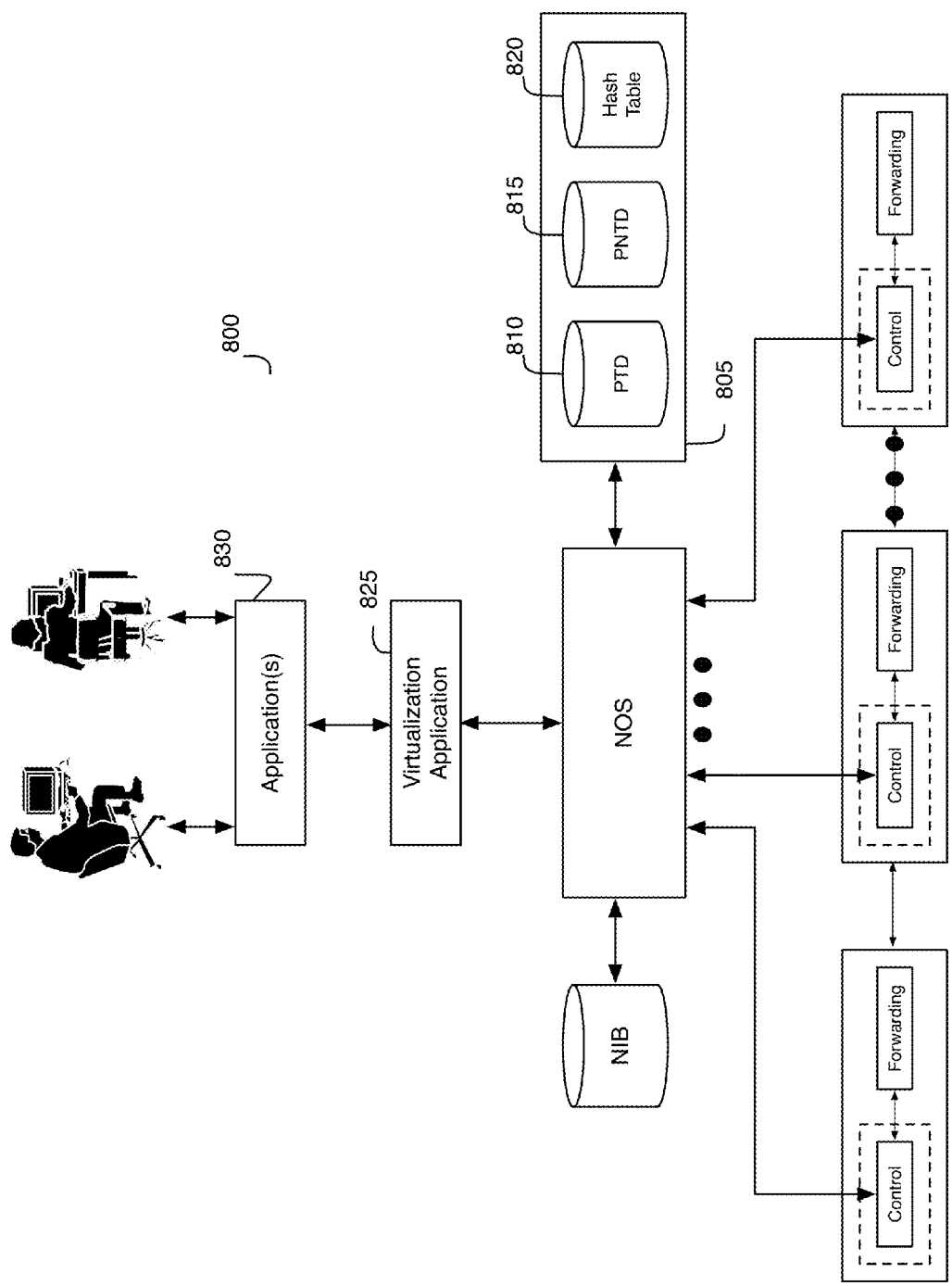
FIG. 8 illustrates an example of a virtualized system that employs secondary storage structures that supplement the NIB's storage operations.

FIG. 8 illustrates an example of a virtualized system 800 that employs secondary storage structures that supplement the NIB's storage operations. This system is similar to the systems 400 and 500 of FIGS. 4 and 5, except that it also includes secondary storage structures 805. In this example, these structures include a persistent transactional database (PTD) 810, a persistent non-transactional database (PNTD) 815, and a hash table 820. In some embodiments, these three types of secondary storage structures store different types of data, store data in different manners, and/or provide different query interfaces that handle different types of queries.

In some embodiments, the PTD 810 is a database that is stored on disk or other non-volatile memory. In some embodiments, the PTD is a commonly available database, such as MySQL or SQLite. The PTD of some embodiments can handle complex transactional queries. As a transactional database, the PTD can undo a series of prior query operations that it has performed as part of a transaction when one of the subsequent query operations of the transaction fails. Moreover, some embodiments define a transactional guard processing (TGP) layer before the PTD in order to allow the PTD to execute conditional sets of database transactions. The TGP layer allows the PTD to avoid unnecessary later database operations when conditions of earlier operations are not met.

The PTD in some embodiments stores the exact replica of the data that are stored in the NIB, while in other embodiments it stores only a subset of the data that are stored in the NIB. Some or all of the data in the NIB are stored in the PTD in order to ensure that the NIB data will not be lost in the event of a crash of the NOS or the NIB.

The PNTD 815 is another persistent database that is stored on disk or other non-volatile memory. Some embodiments use this database to store data (e.g., statistics, computations, etc.) regarding one or more switch element attributes or operations. For instance, this database is used in some embodiment to store the number of packets routed through a particular port of a particular switching element. Other examples of types of data stored in the database 815 include error messages, log files, warning messages, and billing data. Also, in some embodiments, the PNTD stores the results of operations performed by the application(s) 830 running on top of the NOS, while the PTD and hash table store only values generated by the NOS.

The PNTD in some embodiments has a database query manager that can process database queries, but as it is not a transactional database, this query manager cannot handle complex conditional transactional queries. In some embodiments, accesses to the PNTD are faster than accesses to the PTD but slower than accesses to the hash table 820.

Unlike the databases 810 and 815, the hash table 820 is not a database that is stored on disk or other non-volatile memory. Instead, it is a storage structure that is stored in volatile system memory (e.g., RAM). It uses hashing techniques that use hashed indices to quickly identify records that are stored in the table. This structure combined with the hash table's placement in the system memory allows this table to be accessed very quickly. To facilitate this quick access, a simplified query interface is used in some embodiments. For instance, in some embodiments, the hash table has just two queries: a Put query for writing values to the table and a Get query for retrieving values from the table. Some embodiments use the hash table to store data that change quickly. Examples of such quick-changing data include network entity status, statistics, state, uptime, link arrangement, and packet handling information. Furthermore, in some embodiments, the NOS uses the hash tables as a cache to store information that is repeatedly queried for, such as flow entries that will be written to multiple nodes. Some embodiments employ a hash structure in the NIB in order to quickly access records in the NIB. Accordingly, in some of these embodiments, the hash table 820 is part of the NIB data structure.

The PTD and the PNTD improve the resiliency of the NOS system by preserving network data on hard disks. If a NOS system fails, network configuration data will be preserved on disk in the PTD and log file information will be preserved on disk in the PNTD.

E. Multi-Instance Control System

Using a single NOS instance to control a network can lead to scaling and reliability issues. As the number of network elements increases, the processing power and/or memory capacity that are required by those elements will saturate a single node. Some embodiments further improve the resiliency of the control system by having multiple instances of NOS running on one or more computers, with each instance of NOS containing one or more of the secondary storage structures described above. The control applications in some embodiments partition the workload between the different instances in order to reduce each instance's workload. Also, in some embodiments, the multiple instances of NOS communicate the information stored in their storage layers to enable each instance of NOS to cover for the others in the event of a NOS instance failing.

U.S. patent application Ser. No. 13/177,533, filed Jul. 6, 2011 and entitled "Network Virtualization Apparatus and Method", now issued as U.S. Pat. No. 8,817,620, describes different embodiments of a multi-instance, distributed network control system that controls the operations of the same switch or of different switches by distributing workload over different controller instances. U.S. patent application Ser. No. 13/177,533, now issued as U.S. Pat. No. 8,817,620, is incorporated herein by reference.

U.S. patent application Ser. No. 13/177,533 also describes different approaches that the multi-instance, distributed network control system takes to maintain a global NIB data structure (e.g., a collection of switch element data in different NIB instances of different controller instances) in each of the controller instances using secondary storage structures such as a distributed hash table (DHT), a persistent non-transaction database (PNTD), and a PTD.

Figure 9:
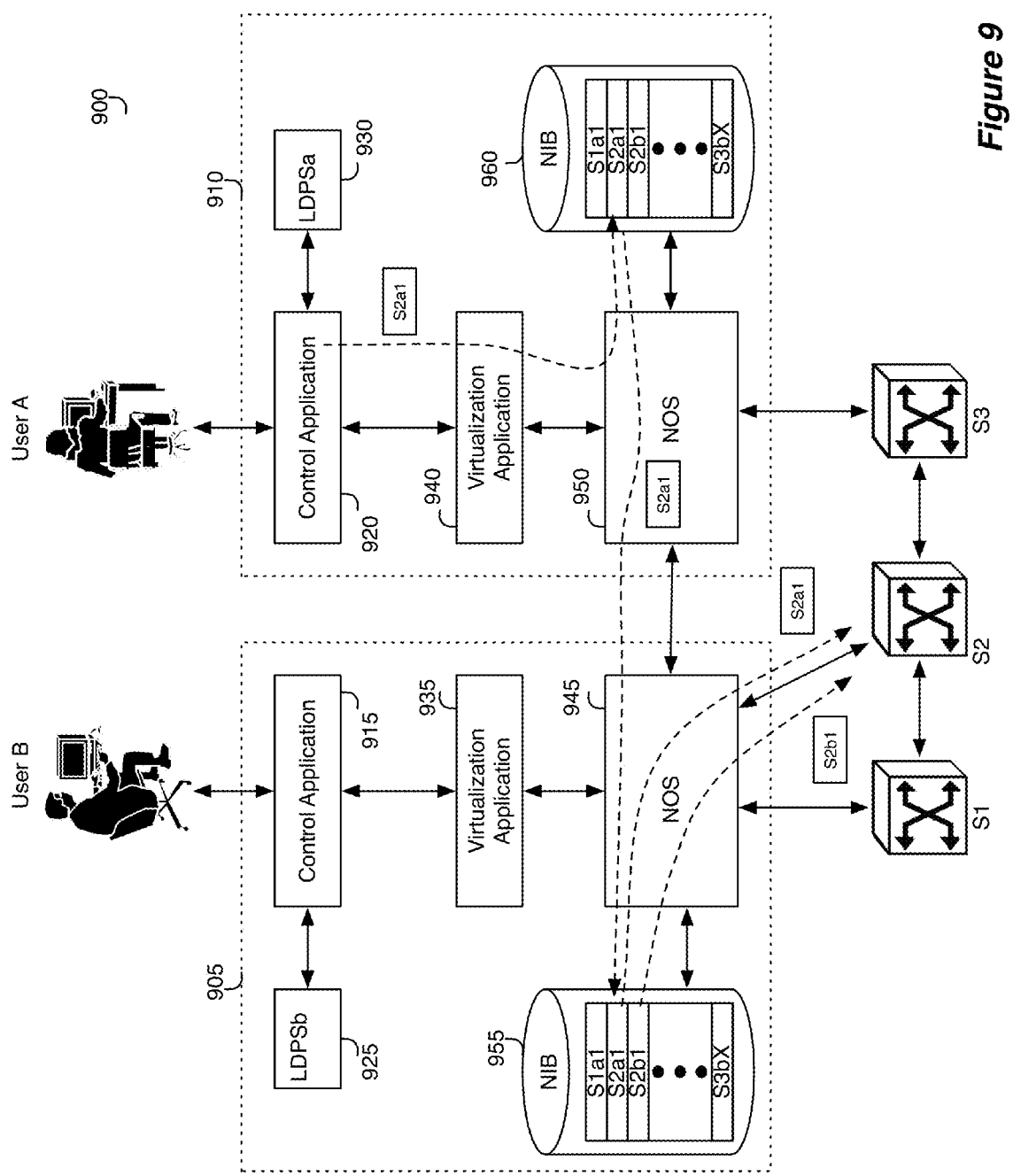
FIG. 9 illustrates an example of specifying a master controller instance for a switch in a distributed system.

FIG. 9 illustrates an example of specifying a controller instance for a switch in a distributed system 900. In this example, two controllers 905 and 910 control three switching elements S1, S2 and S3, for two different users A and B. Through two control applications 915 and 920, the two users specify two different sets of logical datapaths 925 and 930, which are translated into numerous records that are identically stored in two NIBs 955 and 960 of the two controller instances 905 and 910 by NOS instances 945 and 950 of the controllers.

In the example illustrated in FIG. 9, both control applications 915 and 920 of both controllers 905 and 910 can modify records of the switching element S2 for both users A and B, but only controller 905 is the master of this switching element. This example illustrates two different scenarios. The first scenario involves the controller 905 updating the record S2b1 in switching element S2 for the user B. The second scenario involves the controller 905 updating the records S2a1 in switching element S2 after the control application 920 updates a NIB record S2a1 for switching element S2 and user A in NIB 960. In the example illustrated in FIG. 9, this update is routed from NIB 960 of the controller 910 to the NIB 955 of the controller 905, and subsequently routed to switching element S2.

Different embodiments use different techniques to propagate changes to the NIB 960 of controller instance 910 to the NIB 955 of the controller instance 905. For instance, to propagate changes, the system 900 in some embodiments uses the secondary storage structures (not shown) of the controller instances 905 and 910. More generally, the distributed control system of some embodiments uses the secondary storage structures as communication channels between the different controller instances. Because of the differing properties of the secondary storage structures, these structures provide the controller instances with different mechanisms for communicating with each other. For instance, in some embodiments, different DHT instances can be different, and each DHT instance is used as a bulletin board for one or more instances to store data so that they or other instances can retrieve this data later. In some of these embodiments, the PTDs are replicated across all instances, and some or all of the NIB changes are pushed from one controller instance to another through the PTD storage layer. Accordingly, in the example illustrated in FIG. 9, the change to the NIB 960 could be replicated to the PTD of the controller 910, and from there it could be replicated in the PTD of the controller 905 and the NIB 955.

Instead of propagating the NIB changes through the secondary storages, the system 900 of some embodiments uses other techniques to change the record S2a1 in the switch S2 in response to the request from control application 920. For instance, to propagate this update, the NOS 950 of the controller 910 in some embodiments sends an update command to the NOS 945 of the controller 905 (with the requisite NIB update parameters that identify the record and one or more new values for the record) to direct the NOS 945 to modify the record in the NIB 955 or in the switch S2. In response, the NOS 945 would make the changes to the NIB 955 and the switch S2 (if such a change is allowed). After this change, the controller instance 910 would change the corresponding record in its NIB 960 once it receives notification (from controller 905 or through another notification mechanism) that the record in the NIB 955 and/or switch S2 has changed Moreover, the NOS instances of two controller instances establish remote procedure call (RPC) channels to exchange records in their NIBs in some embodiments.

Other variations to the sequence of operations shown in FIG. 9 could exist because some embodiments designate one controller instance as a master of a portion of the NIB, in addition to designating a controller instance as a master of a switching element. In some embodiments, different controller instances can be masters of a switch and a corresponding record for that switch in the NIB, while other embodiments require the controller instance to be master of the switch and all records for that switch in the NIB.

In the embodiments where the system 900 allows for the designation of masters for switching elements and NIB records, the example illustrated in FIG. 9 illustrates a case where the controller instance 910 is the master of the NIB record S2a1, while the controller instance 905 is the master for the switch S2. If a controller instance other than the controller instance 905 and 910 was the master of the NIB record S2a1, then the request for the NIB record modification from the control application 920 would have had to be propagated to this other controller instance. This other controller instance would then modify the NIB record and this modification would then cause the NIB 955, the NIB 960 and the switch S2 to update their records once the controller instances 905 and 910 are notified of this modification through any number of mechanisms that would propagate this modification to the controller instances 905 and 910.

In other embodiments, the controller instance 905 might be the master of the NIB record S2a1, or the controller instance 905 might be the master of switch S2 and all the records of its NIB. In these embodiments, the request for the NIB record modification from the control application 920 would have to be propagated to the controller instance 905, which would then modify the records in the NIB 955 and the switch S2. Once this modification is made, the NIB 960 would modify its record S2a1 once the controller instance 910 is notified of this modification through any number of mechanisms that would propagate this modification to the controller instance 910.

As mentioned above, different embodiments employ different techniques to facilitate communication between different controller instances. In addition, different embodiments implement the controller instances differently. For instance, in some embodiments, the stack of the control application(s) (e.g., 915 in FIG. 9), the virtualization application (e.g., 935), and the NOS (e.g., 945) is installed and runs on a single computer. Also, in some embodiments, multiple controller instances can be installed and run in parallel on a single computer. In some embodiments, a controller instance can also have its stack of components divided amongst several computers. For example, within one instance, the control application (e.g., 915) can be on a first physical or virtual computer, the virtualization application (e.g., 935) can be on a second physical or virtual computer, and the NOS (e.g., 950) can be on a third physical or virtual computer.

Figure 10:
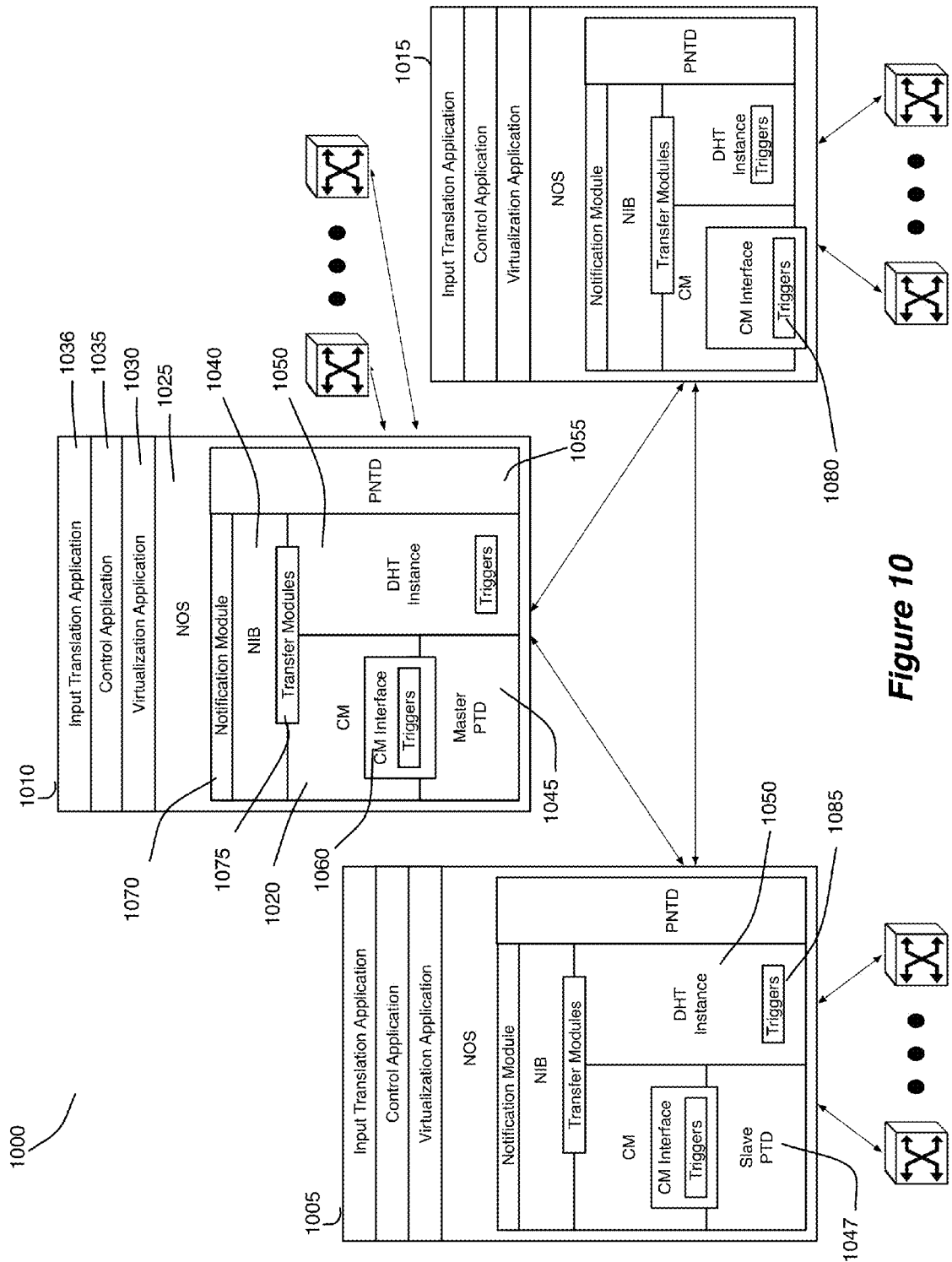
FIG. 10 illustrates a particular distributed network control system of some embodiments of the invention.

FIG. 10 illustrates a particular distributed network control system 1000 of some embodiments of the invention. The control system 1000 uses several different controller instances to control the operations of the same switching elements or of different switching elements. In the example illustrated in FIG. 10, three instances 1005, 1010 and 1015 are illustrated. However, one of ordinary skill in the art will understand that the control system 1000 can have any number of controller instances.

Each controller instance includes a NOS 1025, a virtualization application 1030, a control application 1035, an input translation application 1036, and a coordination manager (CM) 1020. Each NOS in the system 1000 includes a NIB 1040 and at least two secondary storage structures, e.g., a distributed hash table (DHT) 1050 and a PNTD 1055. In addition, the control system 1000 has a NIB notification module 1070, NIB transfer modules 1075, a CM interface 1060, PTD triggers 1080, DHT triggers 1085, and master/slave PTDs 1045/1047.

In some embodiments, the notification module 1070 in each controller instance allows applications (e.g., a control application) that run on top of the NOS to register for callbacks when changes occur within the NIB. This module in some embodiments has two components, which include a notification processor and a notification registry. The notification registry stores the list of applications that need to be notified for each NIB record that the module 1070 tracks, while the notification processor reviews the registry and processes the notifications upon detecting a change in a NIB record that it tracks. The notification module as well as its notification registry and notification processor are a conceptual representation of the NIB-application layer notification components of some embodiments, as the system of these embodiments provides a separate notification function and registry within each NIB object that can be tracked by the application layer.

The transfer modules 1075 include one or more modules that allow data to be exchanged between the NIB 1040 on one hand, and the PTD or DHT storage layers in each controller instance on the other hand. In some embodiments, the transfer modules 1075 include an import module for importing changes from the PTD/DHT storage layers into the NIB, and an export module for exporting changes in the NIB to the PTD/DHT storage layers.

While the control system of some embodiments has the same type of PTD in each instance, the control system 1000 only has PTDs in some of the NOS instances, and of these PTDs, one of them serves as master PTD 1045, while the rest serve as slave PTDs 1047. In some embodiments, NIB changes within a controller instance that has a slave PTD are first propagated to the master PTD 1045, which then direct the controller instance's slave PTD to record the NIB change. The master PTD 1045 similarly receives NIB changes from controller instances that do not have either master or slave PTDs.

In the control system 1000, the coordination manager 1020 includes the CM interface 1060 to facilitate communication between the NIB storage layer and the PTD storage layer. The CM interface also maintains the PTD trigger list 1080, which identifies the modules of the system 1000 to callback whenever the CM interface 1060 is notified of a PTD record change. A similar trigger list 1085 for handling DHT callbacks is maintained by the DHT instance 1050. The CM 1020 also has a DHT range identifier (not shown) that allows the DHT instances of different controller instances to store different DHT records in different DHT instances.

Also, in the control system 1000, the PNTD is not placed underneath the NIB storage layer. This placement is to signify that the PNTD in the control system 1000 does not exchange data directly with the NIB storage layer, but rather is accessible solely by the application(s) (e.g., the control application) running on top of the NOS 1025 as well as other applications of other controller instances. This placement is in contrast to the placement of the PTD storage layer 1045/1047 and DHT storage layers 1050, which are shown to be underneath the NIB storage layer because the PTD and DHT are not directly accessible by the application(s) running on top of the NOS 1025. Rather, in the control system 1000, data are exchanged between the NIB storage layer and the PTD/DHT storage layers of the same or different instances.

The control system 1000 uses the PTD, DHT and PNTD storage layers to facilitate communication between the different controller instances. In some embodiments, each of the three storages of the secondary storage layer uses a different storage and distribution technique to improve the resiliency of the distributed, multi-instance system 1000. For instance, the system 1000 of some embodiments replicates the PTD across NOS instances so that every NOS has a full copy of the PTD to enable a failed NOS instance to quickly reload its PTD from another instance. On the other hand, the system 1000 in some embodiments distributes the PNTD with partial overlapping distributions of data across the NOS instances to reduce the damage of a failure. Similarly, the system 1000 in some embodiments distributes the DHT fully or with minimal overlap across multiple controller instances in order to maintain the DHT instance within each instance small. Also, using this approach, allows the system to increase the size of the DHT by adding additional DHT instances in order to make the system more scalable.

One of the advantages of this system is that it can be configured in any number of ways. In some embodiments, this system provides great flexibility to specify the configurations for the components of the system in order to customize its storage and data distribution scheme to achieve the best tradeoff of scalability and speed on one hand, and reliability and consistency on the other hand. Attributes of the storage structures that affect scalability, speed, reliability and consistency considerations include the speed of the storage (e.g., RAM versus disk access speed), the reliability of the storage (e.g., persistent non-volatile storage of disk versus volatile storage of RAM), the query interface of the storage (e.g., simple Put/Get query interface of DHT versus more robust transactional database queries of PTD in some embodiments), and the number of points of failures in the system (e.g., a single point of failure for a DHT record versus multiple points of failure for a PTD record in some embodiments).

Through the configurations of its components, the system can be configured (1) on how to distribute the data records between the NIB and the secondary storage structures within one instance (e.g., which secondary storage should store which NIB record), (2) on how to distribute the data records between the NIBs of different instances (e.g., which NIB records should be replicated across different controller instances), (3) on how to distribute the data records between the secondary storage structures within one instance (e.g., which secondary storage records contain which records), (4) on how to distribute the data records between the secondary storage structures of different instances (e.g., which secondary storage records are replicated across different controller instances), (5) on how to distribute secondary storage instances across controller instances (e.g., whether to put a PTD, a DHT, or a Stats database instances within each controller or whether to put different subset of these storages within different instances), and (6) on how to replicate data records in the distributed secondary storage structures (e.g., whether to replicated PTD fully across all instances, whether to replicate some or all DHT records across more than one instance, etc.). The system also allows the coordination between the different controller instances as to the master control over different switching elements or different portions of the NIB to be configured differently. In some embodiments, some or all of these configurations can be specified by applications (e.g., a control application or a virtualization application) that run on top of the NOS.

In some embodiments, as noted above, the CMs facilitate inter-controller communication related to fault tolerance of controller instances. For instance, the CMs implement the inter-controller communication through the secondary storage layers described above. A controller instance in the control system may fail due to any number of reasons. (e.g., hardware failure, software failure, network failure, etc.). Different embodiments may use different techniques for determining whether a controller instance has failed. In some embodiments, Paxos protocol is used to determine whether a controller instance in the control system has failed. While some of these embodiments may use Apache Zookeeper to implement the Paxos protocols, other embodiments may implement Paxos protocol in other ways.

Some embodiments of the CM 1020 may utilize defined timeouts to determine whether a controller instance has failed. For instance, if a CM of a controller instance does not respond to a communication (e.g., sent from another CM of another controller instance in the control system) within an amount of time (i.e., a defined timeout amount), the non-responsive controller instance is determined to have failed. Other techniques may be utilized to determine whether a controller instance has failed in other embodiments.

When a master controller instance fails, a new master for the LDP sets and the switching elements needs to be determined. Some embodiments of the CM 1020 make such determination by performing a master election process that elects a master controller instance (e.g., for partitioning management of LDP sets and/or partitioning management of switching elements). The CM 1020 of some embodiments may perform a master election process for electing a new master controller instance for both the LDP sets and the switching elements of which the failed controller instance was a master. However, the CM 1020 of other embodiments may perform (1) a master election process for electing a new master controller instance for the LDP sets of which the failed controller instance was a master and (2) another master election process for electing a new master controller instance for the switching elements of which the failed controller instance was a master. In these cases, the CM 1020 may determine two different controller instances as new controller instances: one for the LDP sets of which the failed controller instance was a master and another for the switching elements of which the failed controller instance was a master.

In some embodiments, the master election process is further for partitioning management of LDP sets and/or management of switching elements when a controller instance is added to the control system. In particular, some embodiments of the CM 1020 perform the master election process when the control system 1000 detects a change in membership of the controller instances in the control system 1000. For instance, the CM 1020 may perform the master election process to redistribute a portion of the management of the LDP sets and/or the management of the switching elements from the existing controller instances to the new controller instance when the control system 1000 detects that a new network controller has been added to the control system 1000. However, in other embodiments, redistribution of a portion of the management of the LDP sets and/or the management of the switching elements from the existing controller instances to the new controller instance does not occur when the control system 1000 detects that a new network controller has been added to the control system 1000. Instead, the control system 1000 in these embodiments assigns unassigned LDP sets and/or switching elements (e.g., new LDP sets and/or switching elements or LDP sets and/or switching elements from a failed network controller) to the new controller instance when the control system 1000 detects the unassigned LDP sets and/or switching elements.

II. Universal Forwarding State

Figure 11:
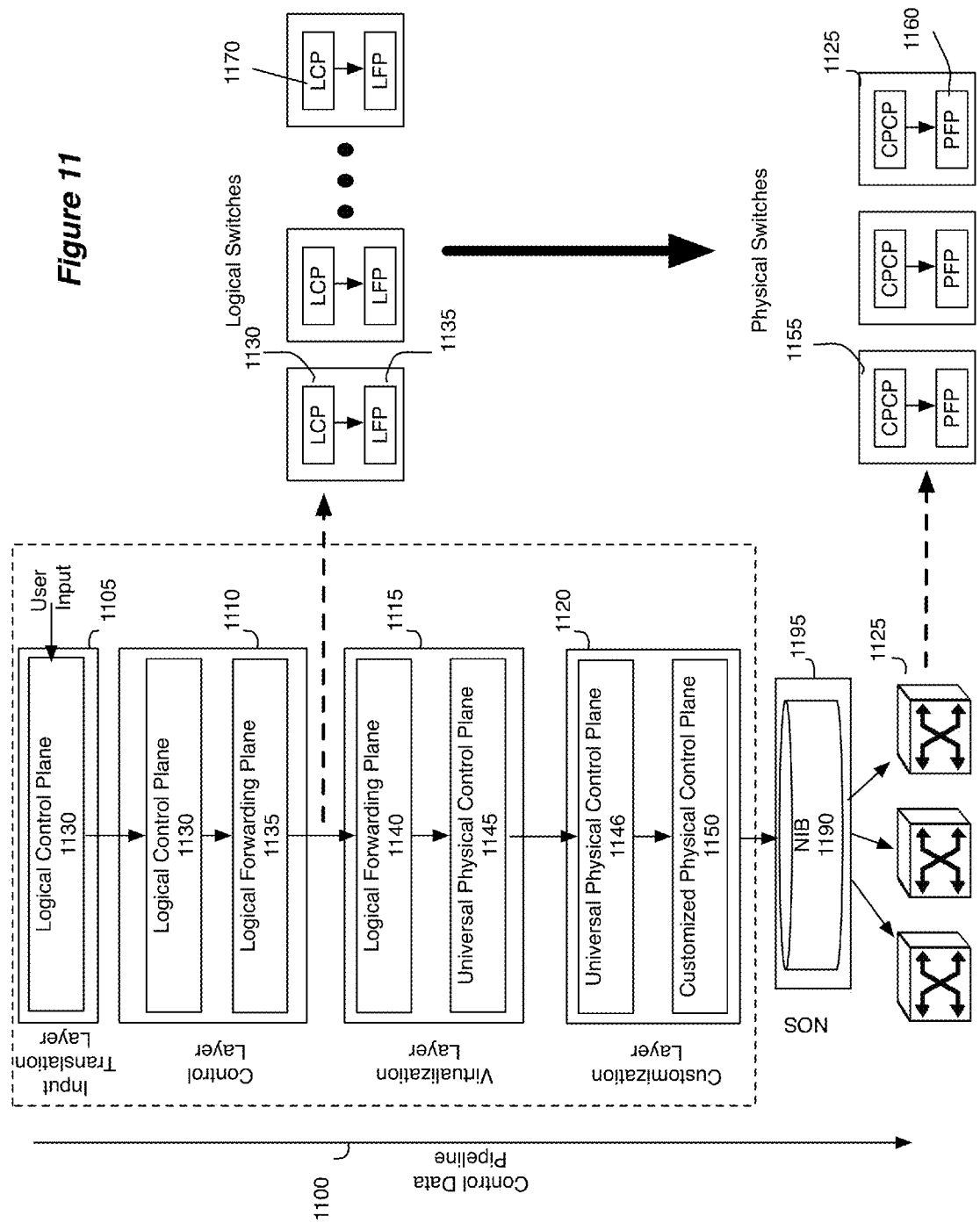
FIG. 11 illustrates the propagation of the instructions to control a managed switching element through the various processing layers of the controller instances.

FIG. 11 illustrates the propagation of the instructions to control a managed switching element through the various processing layers of the controller instances of some embodiments of the invention. This figure illustrates a control data pipeline 1100 that translates and propagates control plane data through five processing layers of the same or different controller instances to a managed switching element 1125. These five layers are the input translation layer 1105, the control layer 1110, the virtualization layer 1115, the customization layer 1120, and the NOS 1195.

In some embodiments, these five layers are in the same controller instance. However, other arrangements of these layers exist in other embodiments. For instance, each of the five layers may be in a different controller instance. One or more of the five layers may be in one controller instance, too. As a more specific example, only the control layer 1110, the virtualization layer 1115, and the NIB 1190 of the NOS 1195 that initially stores the output of the virtualization layer 1115 are in the same controller instance, but the functionality to propagate the CPCP data reside in a NOS of another controller instance (not shown) in some embodiments. In these embodiments, the UPCP data is transferred from the initial NIB to the NIB of a NOS of the other controller instance, before this other controller instance generates and pushes the CPCP data to the managed switching element. The former controller instance may be a logical controller that generates UPCP data and the latter controller instance may be a physical controller that customizes the UPCP data into CPCP data.

As shown in FIG. 11, the input translation layer 1105 in some embodiments has a LCP 1130 that can be used to express the output of this layer. In some embodiments, an application (e.g., web-based application, not shown) is provided to the users for them to supply inputs specifying the LDP sets. This application sends the inputs in the form of API calls to the input translation layer 1105, which translates them into LCP data in a format that can be processed by the control layer 1110. For instance, the inputs are translated into a set of input events that can be fed into an n Log table mapping engine of the control layer. The n Log table mapping engine and its operation will be described further below and is also further described in U.S. patent application Ser. No. 13/177, 532, filed Jul. 6, 2011 and entitled "Network Control Apparatus and Method", now issued as U.S. Pat. No. 8,743,888. U.S. patent application Ser. No. 13/177,532, now issued as U.S. Pat. No. 8,743,888, is incorporated herein by reference. In those embodiments where the input translation layer 1105 is in a controller instance from the controller instance in which the other three layers are, the input translation layer 1105 sends the input events to the control layer through one or more communication channels (e.g., remote procedure call (RPC) channels).

The control layer 1110 in some embodiments has the LCP 1130 and the LFP 1135 that can be used to express the input and output to this layer. The LCP includes a collection of higher-level constructs that allow the control layer and its users to specify one or more LDP sets within the LCP for one or more users. The LFP 1135 represents the LDP sets of the users in a format that can be processed by the virtualization layer 1115. In this manner, the two logical planes 1130 and 1135 are virtualization space analogs of the control and forwarding planes 1155 and 1160 that typically can be found in a typical managed switching element 1125, as shown.

In some embodiments, the control layer 1110 defines and exposes the LCP constructs with which the layer itself or users of the layer define different LDP sets within the LCP. For instance, in some embodiments, the LCP data 1130 includes logical ACL data, etc. Some of this data (e.g., logical ACL data) can be specified by the user, while other such data (e.g., the logical L2 or L3 records) are generated by the control layer and may not be specified by the user. In some embodiments, the control layer 1110 generates and/or specifies such data in response to certain changes to the NIB (which indicate changes to the managed switching elements and the managed datapaths) that the control layer 1110 detects.

In some embodiments, the LCP data (i.e., the LDP sets data that is expressed in terms of the control plane constructs) can be initially specified without consideration of current operational data from the managed switching elements and without consideration of the manner by which this control plane data will be translated to physical control plane data. For instance, the LCP data might specify control data for one logical switch that connects five computers, even though this control plane data might later be translated to physical control data for three managed switching elements that implement the desired switching between the five computers.

The control layer includes a set of modules for converting any LDPS within the LCP to a LDPS in the LFP 1135. In some embodiments, the control layer 1110 uses the n Log table mapping engine to perform this conversion. The control layer's use of the n Log table mapping engine to perform this conversion is further described below. The control layer also includes a set of modules for pushing the LDP sets from the LFP 1135 of the control layer 1110 to a LFP 1140 of the virtualization layer 1115.

The LFP 1140 includes one or more LDP sets of one or more users. The LFP 1140 in some embodiments includes logical forwarding data for one or more LDP sets of one or more users. Some of this data is pushed to the LFP 1140 by the control layer, while other such data are pushed to the LFP by the virtualization layer detecting events in the NIB 1190 as further described below for some embodiments.

In addition to the LFP 1140, the virtualization layer 1115 includes a UPCP 1145. The UPCP 1145 includes UPCP data for the LDP sets. The virtualization layer includes a set of modules (not shown) for converting the LDP sets within the LFP 1140 to UPCP data in the UPCP 1145. In some embodiments, the virtualization layer 1115 uses the n Log table mapping engine to perform this conversion. The virtualization layer of some embodiments also includes a set of modules (not shown) for pushing the UPCP data from the UPCP 1145 of the virtualization layer 1115 to the UPCP 1146 of the customization layer 1120.

In some embodiments, the UPCP data that is sent to the customization layer 1120 allows managed switching element 1125 to process data packets according to the LDP sets specified by the control layer 1110. However, in contrast to the CPCP data, the UPCP data is not a complete implementation of the logical data specified by the control layer because the UPCP data in some embodiments does not express the differences in the managed switching elements and/or location-specific information of the managed switching elements.

The UPCP data has to be translated into the CPCP data for each managed switching element in order to completely implement the LDP sets at the managed switching elements. For instance, when the LDP sets specifies a tunnel that spans several managed switching elements, the UPCP data expresses one end of the tunnel using a particular network address (e.g., IP address) of the managed switching element representing that end. However, each of the other managed switching elements over which the tunnel spans uses a port number that is local to the managed switching element to refer to the end managed switching element having the particular network address. That is, the particular network address has to be translated to the local port number for each of the managed switching elements in order to completely implement the LDP sets specifying the tunnel at the managed switching elements.

The UPCP data as intermediate data to be translated into CPCP data enables the control system of some embodiments to scale, assuming that the customization layer 1120 is running in another controller instance in some embodiments. This is because the virtualization layer 1115 does not have to convert the LFP data specifying the LDP sets to CPCP data for each of the managed switching elements that implements the LDP sets. Instead, the virtualization layer 1115 converts the LFP data to universal physical control data once for all the managed switching elements that implement the LDP sets. In this manner, the virtualization application saves computational resources that it would otherwise have to spend to perform conversion of the LDP sets to CPCP data for as many times as the number of the managed switching elements that implement the LDP sets.

The customization layer 1120 includes the UPCP 1146 and a CPCP 1150 that can be used to express the input and output to this layer. The customization layer includes a set of modules (not shown) for converting the UPCP data in the UPCP 1146 into CPCP data in the CPCP 1150. In some embodiments, the customization layer 1120 uses the n Log table mapping engine to perform this conversion. The customization layer also includes a set of modules (not shown) for pushing the CPCP data from the CPCP 1150 of the customization layer 1120 into the managed switching elements 1125.

The CPCP data that is pushed to each managed switching element is specific to the managed switching element. The CPCP data allows the managed switching element to perform physical switching operations in both the physical and logical data processing domains. In some embodiments, the customization layer 1120 runs in a separate controller instance for each of the managed switching elements 1125.

In some embodiments, the customization layer 1120 does not run in a controller instance. The customization layer 1115 in these embodiments resides in the managed switching elements 1125. Therefore, in these embodiments, the virtualization layer 1115 sends the UPCP data to the managed switching elements. Each managed switching element will customize the UPCP data into CPCP data specific to the managed switching element. In some of these embodiments, a controller daemon runs in each managed switching element and will perform the conversion of the universal data into the customized data for the managed switching element. A controller daemon will be described further below.

In some embodiments, the CPCP data that is propagated to the managed switching element 1125 enables this switching element to perform physical forwarding operations on network data (e.g., packets) based on the logical values defined in the logical domain. Specifically, in some embodiments, the CPCP data specify flow entries that include the logical values. These logical values include logical addresses, logical port numbers, and etc. that are used to forward the network data in the logical domain. These flow entries also map the logical values to the physical values defined in the physical domain such that the managed switching element can perform logical forwarding operations on the network data by performing physical forwarding operations based on the logical values. In this manner, the physical control plane data facilitates implementing logical switching elements across managed switching elements. Several examples of using the propagated physical control plane data to implement logical data processing in the managed switching elements is further described in U.S. patent application Ser. No. 13/177,535, filed Jul. 6, 2011, now issued as U.S. Pat. No. 8,750,164. U.S. patent application Ser. No. 13/177,535, now issued as U.S. Pat. No. 8,750, 164, is incorporated herein by reference.

The control plane data that is handled by a layer of the control data pipeline 1100 gets more global as the higher the layer is. That is, the LCP data in the control layer 1110 would span the entire set of managed switching elements that implement a logical switching element defined by the LCP data. In contrast, the CPCP data in the customization layer 1120 is local and specific to each of the managed switching elements that implement the logical switching element.

In some embodiments, the NIB 1190 serves as a medium for communications between different layers. Each of the layers in a controller instance pushes the data that the layer has generated into the NIB so that another layer above or below the layer detects the data change in the NIB and uses the data to perform the other layer's portion of the processing pipeline 1100. In other embodiments, the layers of a controller instance may directly push generated data to the layer above or below without resorting to the NIB as a communication medium (e.g., by establishing and using RPC channels between the layers). In some embodiments, the NIB also serves as a medium for communications between different controller instances as described above by reference to FIGS. 9 and 10.

Figure 12:
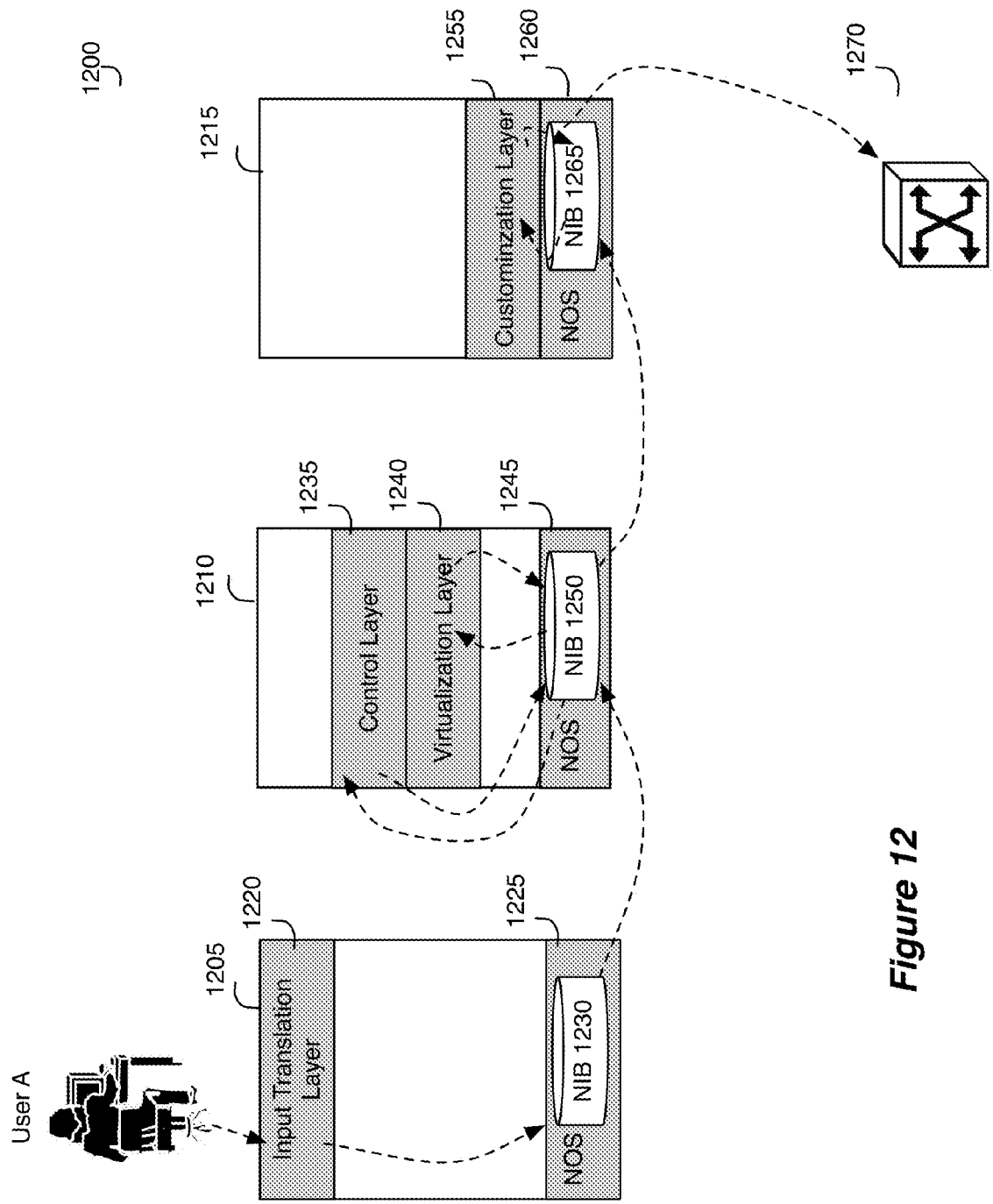
FIG. 12 illustrates an example operation of several controller instances.

FIG. 12 illustrates an example of using the NIB as a medium for communication between different controller instances. Specifically, FIG. 12 illustrates an operation of several controller instances that function as a controller for distributing inputs, a master controller of a LDPS (also referred to as a logical controller), and a master controller of a managed switching element (also referred to as a physical controller). As mentioned above, not every controller instance includes a full stack of the five layers described above by reference to FIG. 11. In other embodiments, every controller instance includes all five layers, but does not perform the whole control data pipeline 1100.

In this example, none of the controller instances 1205, 1210, and 1215 has all five layers or perform the entire control data pipeline 1100. Specifically, the controller instance 1205 includes input translation layer 1220 and NOS 1225. The controller instance 1210 includes control layer 1235, virtualization layer 1240, and NOS 1245. The controller instance 1215 includes customization layer 1255 and NOS 1260. Each NOS instance in each of the controller instances 1205-1215 maintains a NIB as shown.

The controller instance 1205 in this example is a controller instance for distributing inputs. That is, the controller instance 1205 of some embodiments takes the inputs from the users in the form of API calls. Through the API calls, the users can specify requests for configuring a particular LDPS (i.e., configuring a logical switching element or a logical router to be implemented in a set of managed switching elements). The input module 1220 of the controller instance 1205 receives these API calls and translates them into the form (e.g., data tuples or records) that can be pushed into the NIB 1225 of the NOS 1225.

The NOS 1225 in this example then sends these NIB records to another controller instance that is responsible for managing the records for the particular LDPS. In this example, the controller instance 1210 is responsible for the records for the LDPS. The controller instance 1210 updates the NIB 1250 with the records received. This data propagation from the NIB 1230 of the controller instance 1205 to the NIB 1250 of the controller instance 1245 can be achieved through any of the different ways described above by reference to FIGS. 9 and 10. For instance, the data from the NIB 1230 may be replicated to the NIB 1250 through secondary storage structures (not shown) of the two controller instances 1205 and 1210.

The control layer 1235 of the controller instance 1210 then detects the addition of these records to the NIB 1250 and processes the records to generate or modify other records in the NIB 1250. In particular, the control layer 1235 generates LFP data. The virtualization layer 1240 in turn detects the modification and/or addition of these records in the NIB 1250 and modifies and/or generates other records in the NIB. These records represent the UPCP data in this example. These records then get sent to another controller instance that is managing at least one switching element that implements the particular LDPS.

The controller instance 1215 in this example is a controller instance that is managing the switching element 1270. The switching element implements at least part of the particular LDPS. The NOS 1260 of the controller instance 1215 receives the records representing the UPCP data from the NOS 1245 of the controller instance 1210. In some embodiments, the customization layer 1255 performs a conversion of the UPCP data to the CPCP data and pushes the CPCP data to the NIB 1265. The NOS 1260 of the controller instance 1215 then pushes the CPCP data to the managed switching element 1270.

In some embodiments, the controller instance 1215 just identifies a set of managed switching elements to which to send the received UPCP data and relays the UPCP data to the identified managed switching elements. The managed switching elements will perform the conversion of the UPCP data into the CPCP data. In this manner, the controller instance 1215 functions as an aggregation point to gather data to send to the managed switching elements that this controller instance is responsible for managing. In this example, the managed switching element 1270 is one of the switching elements managed by the controller instance 1215.

In some embodiments, the controller instances exchange API calls that specify requests for information inquires differently than the API calls that specify requests for configuring the LDPS. For instance, the controller instances do not use the NIBs and NOS' to send data records from one controller instance to another controller instance. Specifically, in this example, the controller instances establish communication channels (e.g., RPC channels) between them and exchange the data records that are translated from the API calls that specify the requests for information inquires over these channels without relying on the NIBs and NOS' of the controller instances.

III. Scheduling

In computer networking, a control plane of a switching element computes the state for packet forwarding ("forwarding state") for the switching element. The computed forwarding state is stored in forwarding information base (FIB) of the managed switching element (e.g., a router, a physical switch, a virtual switch, etc.). The forwarding plane of the switching element uses the stored forwarding state to process the incoming packets at high-speed and to transmit the packets to a next-hop of the network towards the destination of the packet.

The realization of the forwarding state computation at a network control system can be either distributed or centralized in nature. When a distributed routing model is used to compute the state in some embodiments, two or more controller instances compute the state collectively. In contrast, when a centralized computational model is used to compute the state in some embodiments, a single controller instance is responsible for computing the state for a set of switching elements. These two models have different costs and benefits.

When the control plane of one or more controller instances receives an event requiring updates to the forwarding state (e.g. an LDPS), the control plane initiates the re-computation of the state. When the state is re-computed, the control plane pushes the updated forwarding state to the forwarding plane at the controller instances. The controller instances propagate the updated state to the switching elements, which implement the system to forward data packets according to the updated state. The time it takes to compute and update the state at the controller. is referred to as "network convergence time." In some embodiments, the network convergence time also includes the time to propagate the updated state to the switching elements and the time to implement the state at the switching elements.

Regardless of the way the computation is performed, the forwarding state in the forwarding plane of the control system has to be correct in order to guarantee that the packets reach the intended destinations. Any transient inconsistency of the forwarding state during the network convergence time may cause one or more switching elements to fail to forward the packets towards the intended destinations and may thus result in packet loss. The longer it takes to compute, disseminate, and apply any forwarding state updates to the switching elements that use the forwarding state, the longer the window for inconsistencies will become. As the window for inconsistencies becomes longer, the end-to-end packet communication service for the users of the network will degrade accordingly.

For this reason, some embodiments of the invention carefully account for updates to the forwarding state. A network event may require immediate actions by the control plane. For instance, when a link carrier goes down, the control plane has to re-compute the forwarding state to find an alternative link (or route) towards the destinations of the packets. During the time period after the network event occurs and before the network has converged to the new, updated forwarding state, the network users will experience a partial or total loss of connectivity.

To address the loss of connectivity issue, some embodiments use "proactive preparation" processes, which have the network control plane pre-compute alternative or backup forwarding states for the forwarding plane based on the conditions under which the control plane operates. With the alternative forwarding states for the forwarding plane, the switching elements using the forwarding plane (e.g., the switching elements that receive the forwarding plane data from the controller instances) may correctly forward the packets while the control plane is updating the forwarding state for a network event. For instance, in the case of a link going down, the forwarding plane could be prepared in advance with the alternative, backup path(s) for re-directing the packets. While proactive preparations may introduce significant computation load for the control plane, proactive preparations can remove the requirement of instantaneous reaction to avoid the forwarding plane failures. Even with proactive preparations, the network control plane still needs to address several other issues in applying the forwarding state updates to the forwarding plane.

A. Localizing the State Computation in Time

Traditionally, the switching elements offer no transactional updates for updating the forwarding state in the FIB. Even when a centralized computation model is used, the need to distribute of the transactions might result in undue complexity because of the distributed chassis architecture of the switching elements or the physical separation of the computational and forwarding switching elements.

Without resorting to distributing transactions that are undesirable, the network control plane of some embodiments carefully schedules pushing the forwarding state updates to the forwarding plane because the overall forwarding state for the forwarding plane may still remain inconsistent after a single update is pushed to the forwarding plane. Thus, the control plane pushes all the related updates together to minimize the window of inconsistency and the overall experienced end-user downtime in the networking services.

The control plane in some embodiments utilizes the isolation of the virtualization. That is, since the network forwarding states of individual LDP sets remain isolated from each other, as do those of individual logical networks, the control plane computes any updates on different LDP sets independently. Hence, the control application can dedicate all the available resources to a single LDPS (or a few LDP sets) and the datapath set's state re-computation, and thereby finishes the state computation for all the related forwarding states faster.

Localizing the computation still offers benefits even when the computation of the forwarding state updates takes long enough to warrant aggregating updates to the forwarding plane in order to minimize the experienced downtime in packet forwarding. For instance, there will be less data to buffer and aggregate in total, as the updates are produced only for one LDPS, or a few LDP sets, at a time.

In this manner, the control plane delays reacting to network events for some of the LDP sets affected by the network events. However, when the control plane reacts to a particular event, the control plane can complete the computation of all the resulting state updates as quickly as possible by focusing on a particular LDPS affected by the particular event. Described at a high-level, the control plane has to factor the network virtualization when scheduling the computation of the forwarding state updates.

B. Network Virtualization-Aware Scheduler

In a network control system of some embodiments, a single controller instance can be responsible for computing state updates for several LDP sets. As with any network control plane, the controller instance may have to re-compute and update the forwarding state for all the affected LDP sets when the controller instance receives an event from the user of the controller or from the network. As discussed above, a simple way of updating the forwarding state would be computing updates for all affected LDP sets in parallel.

To minimize the per LDPS convergence time, some embodiments localize the computation in time. To accomplish this, the control plane of some embodiments has a scheduler that takes a unit of virtualization (e.g., a LDPS) in consideration in two ways. First, on an occurrence of a network event, the controller instance classifies the event to determine the LDPS that the event affects. Second, as the computation for the event begins, the scheduler does not preempt the computation until the computation for the event completes (e.g., until the LDPS state converges).

In this manner, the controller instance achieves faster convergence times for the given computation context. In addition, as with schedulers in general, the control plane scheduler of the controller can implement various scheduling policies to better match certain high-level requirements. One such policy is giving a preference to a computation that affects physical-only forwarding state because a physical-only forwarding state may affect multiple LDP sets and thus may be more important than the state of any single LDPS. Another such policy is prioritizing a given LDPS over another LDPS in order to process a network event that affects a LDPS with a higher priority first. The prioritization of the LDP sets may reflect the tiered pricing structure of the provided network services in multi-tenant environments.

C. Scheduling Considerations Beyond a Single Controller

The considerations of the scheduling extend beyond a single controller instance when solutions that split the computation of the forwarding state over multiple controller instances for improved scaling are applied. For example, each of the controller instances computes for a slice of the overall forwarding state.

As another example, computation of the forwarding state may span over a controller instance and several switching elements when the switching elements perform computation of the forwarding state prepared by the controller instance. For instance, spanning the distributed computation of the forwarding state may be necessary when the forwarding state is expressed in terms of UPCP data.

In case of a controller instance fails, the forwarding state computation may take longer than the time it would have taken without the failure. Therefore, any switching element or controller instances consuming the state updates from a previous stage should not use the state updates until the initial re-computation has converged or completed. To prevent the use of the state updates until the convergence of the initial re-computation, the control plane scheduler of the state-computing controller instance informs, through an out-of-band communication channel in some embodiments, any consumers of the state updates about the convergence for a given LDPS. By delaying the consumption and computation of the subsequent state until the computation of the state from the earlier stage is completed, the controller instances involved in the computation of the states minimize the possible downtime for the network services.

When no controller instance fails, the state re-computing controller instance computes state updates for one virtualization unit (e.g., a LDPS) at a time and feeds the state updates to any switching element or controller that consumes the state updates. While the volume of the state updates for any given LDPS may be relatively modest when there is no controller instance failure, multiple controller instances at one stage of the computation and multiple consumers of a next stage of the computation share a communication channel. For instance, multiple computational processes for multiple LDP sets might operate concurrently in order to exploit all the processing power of the modern multi-core CPUs.

When computations for multiple logical data paths are being performed, the reach of the scheduling has to extend into the communication channel itself. Specifically, when computations for multiple LDP sets are not being performed, the channel sharing could introduce convergence delays as the transmission of the state updates for a single LDPS could be effectively preempted. This may result in an extended downtime of the network services. To address this problem, the scheduler factors the delays in the scheduling policy. That is, such a policy will not start the transmission of queued updates for a single LDPS until the computation for the LDPS has converged. Alternatively, a policy will start the transmission of the updates but not preempt before the convergence occurs.

The above-described techniques for temporally localizing the computation of forwarding state updates avoid an explicit, heavyweight synchronization mechanism between the computation processes of multiple LDP sets across network elements.

D. Network Control System with Schedulers

As described above, a network controller of some embodiments detects a network event (e.g., a change in the network infrastructure) and updates one or more LDP sets that are affected by the network event. The controller then converts the updated LDP sets into physical control plane data and propagates the physical control plane data to the managed switching elements that implement the LDP sets.

After an occurrence of a network event and before the complete implementation of the updated LDP sets at the managed switching elements, the switching elements are in a state that is inconsistent with the current network state (i.e., a network state that includes the occurrence of the network event). For instance, when a managed switching element goes down, the datapath set involving the managed switching element should be recomputed so that the packets that are supposed to go through the managed switching element reach their destinations without getting lost. Until the recomputed datapath set reaches other managed switching elements to get around the managed switching element that had gone down, the packets might be lost. This means that the longer the network convergence time is, the longer the window for inconsistencies will become.

The network controller of some embodiments minimizes the network convergence time by aggregating several detected network events and computing physical control plane data for the events. The network controller propagates this physical control plane data to the managed switching elements. In other words, the network controller of some embodiments computes and propagates the physical control plane data for these several events together instead of separately computing and propagating physical control plane data for each of the several detected network events. In this manner, the network controller reduces the overall network convergence time for the several events.

1. Scheduling in Input Translation Layer

Figure 13:
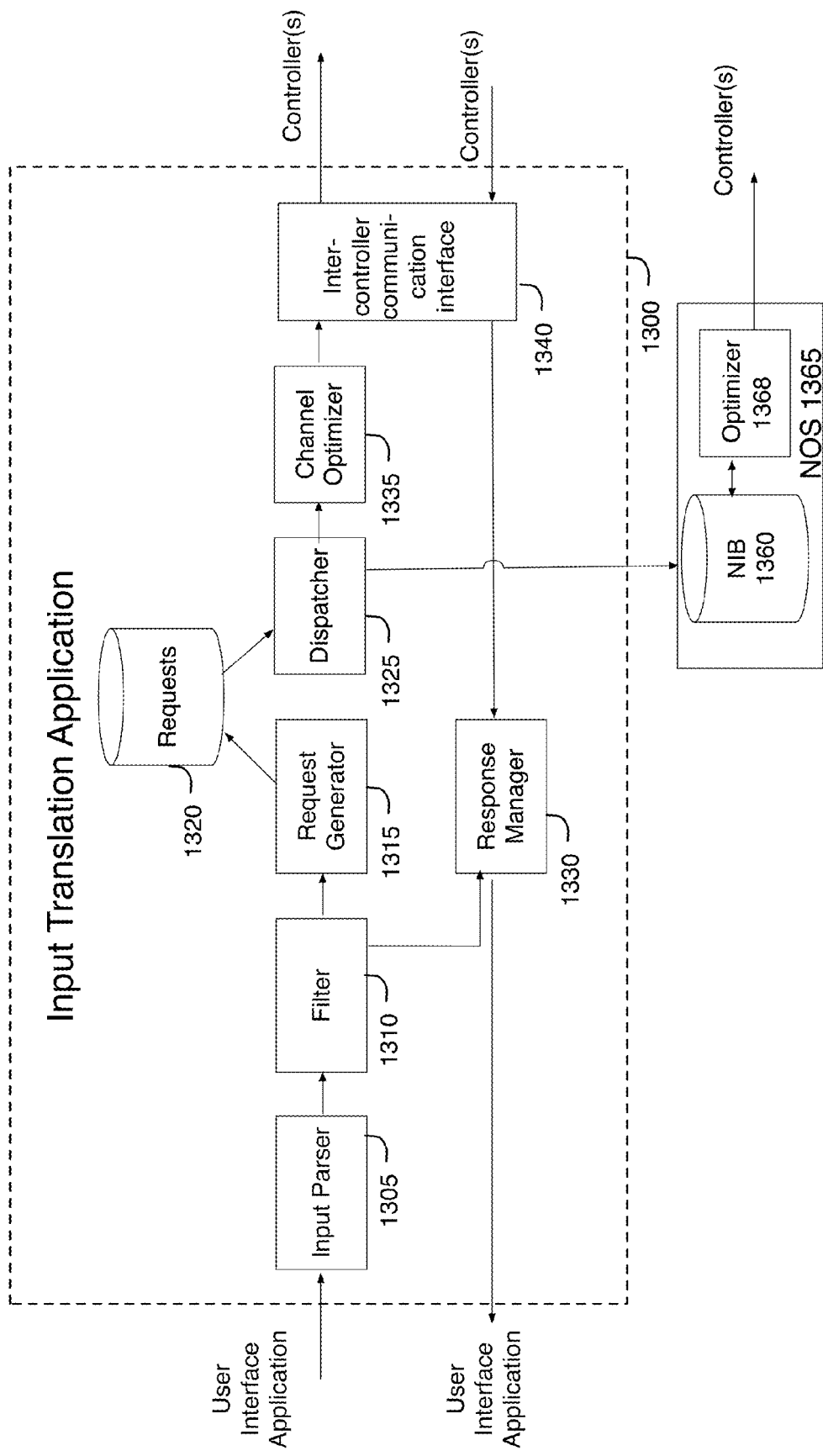
FIG. 13 conceptually illustrates software architecture for an input translation application.

FIG. 13 conceptually illustrates software architecture for an input translation application 1300. The input translation application of some embodiments functions as the input translation layer 1105 described above by reference to FIG. 11. In particular, the input translation application receives inputs from a user interface application that allows the user to enter input values. The input translation application then translates inputs into requests and then dispatches the requests to one or more controller instances that process the requests and send back responses to the input translation application. In some embodiments, the input translation application runs in the same controller instance in which a control layer runs, while in other embodiments the input translation application runs in a separate controller instance. In these other embodiments, the separate controller instance functions as the API controller. As shown in this figure, the input translation application includes an input parser 1305, a filter 1310, a request generator 1315, a requests repository 1320, a dispatcher 1325, a channel optimizer 1335, a response manager 1330, and an inter-controller communication interface 1340. The input translation application 1405 resides on top of a NOS 1365 that contains a NIB 1360 that stores the data tuples generated by the input translation application 1300.

In some embodiments, the input translation application 1300 supports a set of API calls for specifying LDP sets and information inquires. In these embodiments, the user interface application that allows the user to enter input values sends the inputs in the form of API calls to the input translation application 1300. These API calls specify the LDPS (e.g., logical switch configuration specified by the user) and the user's information inquiry (e.g., network traffic statistics for the logical ports of the logical switch of the user). Also, the input translation application 1300 may get inputs from logical controllers, physical controllers and/or physical controllers as well as from another controller in which another input translation application runs in some embodiments.

The input parser 1305 of some embodiments receives inputs in the form of API calls from the user interface application. In some embodiments, the input parser extracts the user input values from the API calls and passes the input values to the filter 1310. The filter 1310 filters out the input values that do not conform to certain requirements. For instance, the filter 1310 filters out the input values that specify an invalid network address for a logical port. For those API calls that contain non-conforming input values, the response manager 1330 sends a response to the user indicating the inputs do no conform.

The request generator 1315 generates requests to be sent to one or more controller instances. As mentioned above, a first type of request is for configuring a particular LDPS (e.g., configuring a logical switching element or a logical router to be implemented in a set of managed switching elements) and a second type of request is for information inquires (e.g., network traffic statistics for the logical ports of the logical switch of the user). The request generator 1315 deposits the generated requests in the requests repository 1320.

The request generator 1315 of different embodiments generates requests according to different formats, depending on the types of request. For instance, when the requests specify configuration of the LDPS (e.g., LCP data), the request generator 1315 of some embodiments generates such requests in the form of records (e.g., data tuples). When the requests specify information inquiries, the request generator 1315 of some embodiments generates such requests in the form of the remote procedure calls.

The dispatcher 1325 retrieves the generated requests. The dispatcher 1325 then either updates the NIB 1360 with the requests or sends the requests to the appropriate controller instances. In some embodiments, the dispatcher publishes the records containing the requests for configuring the particular LDPS to the NIB 1360, from which the NOS 1365 propagates the records to several other controller instances (e.g., logical controller). This data propagation from the NIB 1360 can be achieved through any of the different ways described above by reference to FIGS. 9 and 10.

As shown in FIG. 13, the NOS 1365 includes an optimizer 1368. The optimizer 1368 schedules the propagation of the records to the other controller instances. The optimizer 1368 will be described in detail further below by reference to FIG. 23.

For the requests that specify information inquires, the dispatcher 1325 of some embodiments identifies the controller instance to which each request should be sent. In some cases, the dispatcher looks at the LDPS associated with the request and identifies a controller instance that is the master of that LDPS. In some cases, the dispatcher identifies a master of a particular switching element (e.g., a physical controller) as a controller instance to send the request when the request is specifically related to a managed switching element (e.g., when the request is about statistical information of a logical port that is mapped to a port of the managed switching element). The dispatcher sends the request to the identified controller instance using the inter-controller communication interface 1340. The inter-controller communication interface 1340 establishes a communication channel (e.g., an RPC channel) with each of the other controller instances to facilitate data exchange (e.g., requests and responses) with other controllers.

The dispatcher 1325 uses a communication channel established with a particular controller instance by the inter-controller communication interface 1340 to send the requests for the particular controller. In some embodiments, the dispatcher 1325 sends the requests as the requests arrive from the request generator 1315. In some of these embodiments, each request is sent as an RPC (remote procedure call) over the channel. Therefore, the dispatcher would have to make as many RPCs as the number of the requests.

In some embodiments, the channel optimizer 1335 minimizes the number of RPCs by batching up the requests to be sent over an RPC channel. Different embodiments use different criteria to batch up the requests. For instance, the channel optimizer 1335 of some embodiments makes an RPC only after a certain number (e.g., 32) of requests are batched for a communication channel. Alternatively or conjunctively, the channel optimizer 1335 of some embodiments batches up requests that arrived for a certain period of time (e.g., 10 milliseconds).

When the receiving controller instances receive requests that specify information inquires, the controller instances process the requests and produce responses containing inquired information. The response manager 1330 receives the responses from the controller instances that processed requests through the channel(s) established by the inter-controller communication interface 1340. In some cases, more than one response may return for a request that was sent out. For instance, a request for statistical information from all logical ports of the logical switching element that the user is managing would return a response from each controller. The responses from multiple physical controller instances for multiple different switching elements whose ports are mapped to the logical ports may return to the input translation application 1300, either directly to the input translation application 1300 or through the master of the LDPS associated with the logical switch. In such cases, the response manager 1330 of some embodiments merges those responses and sends a single merged response to the user interface application.

2. Scheduling in Control Layer

Figure 14:
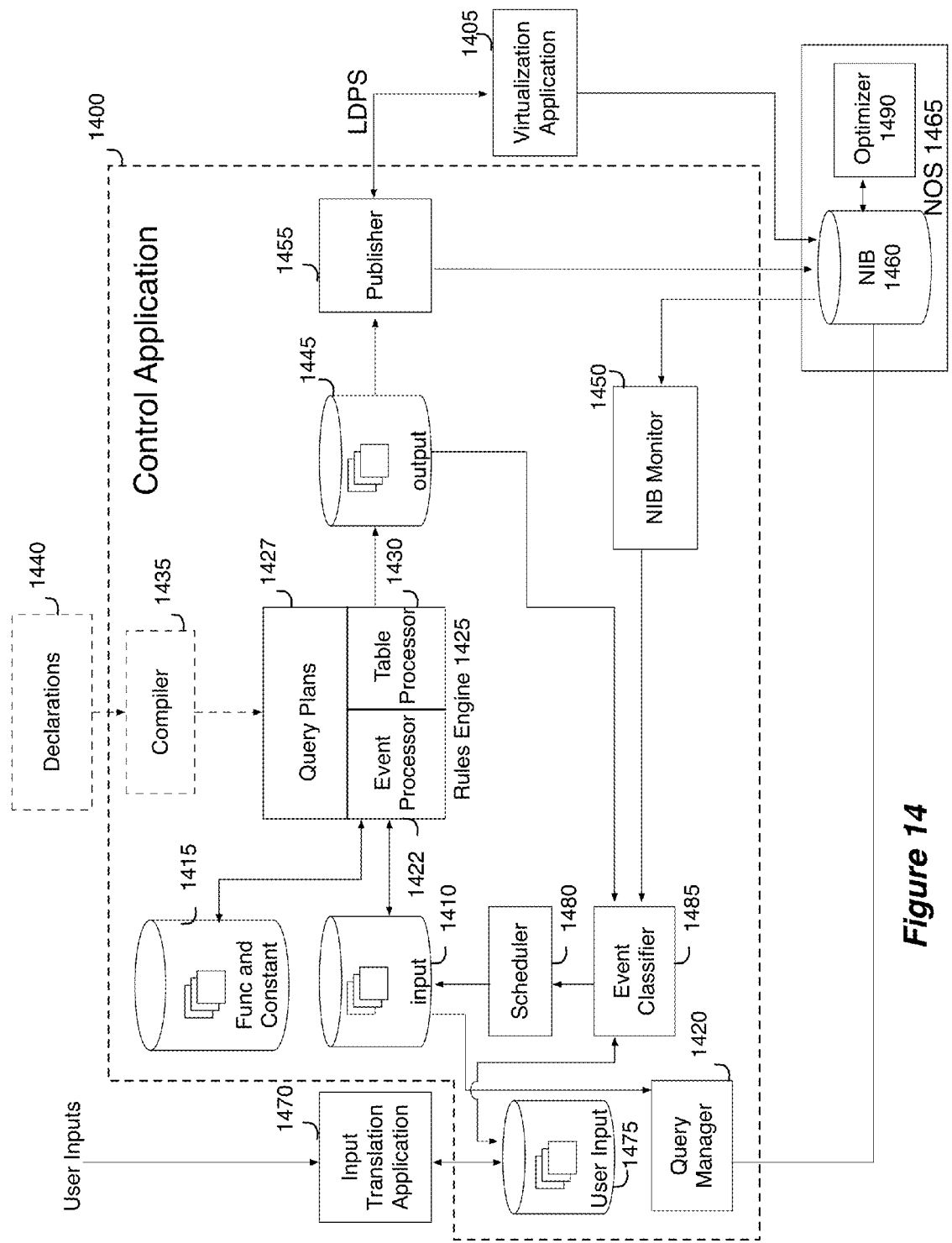
FIG. 14 illustrates a control application of some embodiments of the invention.

The control application in some embodiments performs its mapping operations by using the n Log table mapping engine, which is a variation of the datalog table mapping technique. FIG. 14 illustrates a control application 1400 of some embodiments of the invention. This application 1400 receives input events data from an input translation application 1470 (e.g., over the communication channel established between the input translation application and the control application) and store the data in a user input tables 1475. The control application 1400 uses an n Log table mapping engine to map the input tables that contain input data tuples to LDPS data tuples. In some embodiments, an input event data represents a desired change in the network that is specified by the user or an actual change in the network. Examples of a change in the network includes migration of a virtual machine from one managed switching element to another and failure of a virtual machine that is connected to one of the managed switching elements.

The control application of some embodiments resides on top of a virtualization application 1405 that receives the LDPS data tuples from the control application 1400 in some embodiments. The virtualization application 1405 also functions as a virtualization layer of a controller instance in some embodiments. The virtualization application 1405 maps the LDPS data tuples to data tuples for defining UPCP data. The virtual application 1405 resides on top of a NOS 1465 that contains a NIB 1460 that stores the data tuples generated by the virtualization application 1405.

In some embodiments, the control application is executed on the same machine with the virtualization application and the NOS. However, the control application, the virtualization application, and the NOS do not have to run on the same machine in other embodiments. That is, one of these applications or each of these applications may run on a different computer.

As shown in FIG. 14, the control application 1400 includes a set of user input tables 1475, an event classifier 1485, a scheduler 1480, a set of rule-engine input tables 1410, a set of function and constant tables 1415, a query manager 1420, a rules engine 1425, a set of rule-engine output tables 1445, a NIB monitor 1450, a publisher 1455, and a compiler 1435.

The compiler 1435 is one component of the application that operates at a different instance in time than the application's other components. The compiler operates when a developer needs to specify the rules engine for a particular control application and/or virtualized environment, whereas the rest of the application's modules operate at run time when the application interfaces with the control application and the NOS to deploy and monitor LDPS sets specified by one or more users.

In some embodiments, the compiler 1435 takes a relatively small set (e.g., few hundred lines) of declarative instructions 1440 that are specified in a declarative language and converts these into a large set (e.g., thousands of lines) of code that specify the operation of the rules engine 1425, which performs the application's table mapping. As such, the compiler greatly simplifies the control application developer's process of defining and updating the control application. This is because the compiler allows the developer to use a high level programming language that allows a compact definition of the control application's complex mapping operation and to subsequently update this mapping operation in response to any number of changes (e.g., changes in the logical networking functions supported by the control application, changes to desired behavior of the control application, etc.).

In some embodiments, the rule-engine (RE) input tables 1410 include tables with logical data and/or switching configurations (e.g., access control list configurations, private virtual network configurations, port security configurations, etc.) specified by the user through the input translation application 1470 and/or the control application 1400. In some embodiments, the input tables 1410 also include tables that contain physical data from the switching elements managed by the network control system. In some embodiments, such physical data includes data regarding the managed switching elements (e.g., UPCP data and CPCP data) and other data regarding network configuration employed by the network control system to deploy the different LDPS' of the different users.

The event classifier 1485 retrieves input event data from the user input tables 1475 and classifies the input event data. The input event data may also be LFP data that the control application 1400 generates from the LCP data that is specified in the user input tables 1475. The input event data may also be physical forwarding plane data or CPCP data received from the NIB 1460 or from the RE output tables 1445.

In some embodiments, the event classifier 1485 receives the LCP data from the user of the control application 1400 through the input translation application 1470, which is similar to the input translation application 1300 described above by reference to FIG. 13. The user input tables 1475 store the input event data in the form of logical data.

The event classifier 1485 of some embodiments receives the physical forwarding plane data from the NIB monitor 1450 that monitors the NIB to detect a change in the NIB 1460 that reflects a change in one or more managed switching elements. The NIB monitor 1450 interfaces with the NIB 1460 to receive notifications regarding changes to the NIB 1460. In response to a detected NIB change event, the NIB monitor 1450 notifies the event classifier 1485 of the change event and sends the input event data (e.g., physical forwarding plane data or CPCP data) regarding the change event to the event classifier 1485.

The event classifier 1485 receives the input event data also from a RE output table that generates an internal input event. In some embodiments, an internal input event causes the rules engine 1425 to perform a query plan (e.g., a database query plan) after it is modified by the rules engine 1425.

The event classifier 1485 of some embodiments classifies the received input event data according to the LDPS that the input event data affects. The input event data affects a LDPS when the input event data is about a change at one or more managed switching elements that implement the LDPS. For instance, when the LDPS specifies a tunnel established between two network elements, the input event data that affects the LDPS are from any of the managed switching elements that implement the tunnel. Also, when the user specifies input event data to define or modify a particular LDPS, this input event data affects the particular LDPS. In some embodiments, the event classifier 1485 adds a tag to the input event data to identify the LDPS that the input event data affects. The event classifier 1485 notifies the scheduler of the received input event data and the classification (e.g., the tag identifying the LDPS) of the input event data.

The scheduler 1480 receives the input event data and the classification of the input event data from the event classifier 1485. In some embodiments, the scheduler 1480 communicates with the rules engine 1425 to determine whether the rules engine 1425 is currently processing the RE input tables 1410 (e.g., whether the rules engine 1425 is performing join operations on the RE input tables 1410 to generate RE output tables 1445). When the rules engine is currently processing the RE input tables 1410, the scheduler 1480 identifies the LDPS that is being modified or created by the rules engine 1425 by processing the RE input tables 1410. The scheduler 1480 then determines whether the received input event data affects the identified LDPS. When the scheduler 1480 determines that the received input event data affects the identified LDPS (e.g., when the classification of the input event data includes a tag specifying an LDPS that is the same as the identified LDPS), the scheduler 1480 modifies one or more RE input tables 1410 based on the received input event data. In other words, the scheduler 1480 writes the input event data into the input tables 1410. When the scheduler 1480 determines that the received input event data does not affect the identified LDPS, the scheduler 1480 holds the received input event data.

In some embodiments, the scheduler 1480 does not wait for the input event data that affects the LDPS that is currently being modified or created when none of the already received input event data affects the LDPS. When none of the received input event data affect the LDPS, the scheduler 1480 modifies one or more RE input tables 1410 based on the oldest received input event data that has been held. The scheduler 1480 will be further described below by reference to FIGS. 17-22.

In addition to the RE input tables 1410, the control application 1400 includes other miscellaneous tables 1415 that the rules engine 1425 uses to gather inputs for its table mapping operations. These tables 1415 include constant tables that store defined values for constants that the rules engine 1425 needs to perform its table mapping operations.

When the rules engine 1425 references constants, the corresponding value defined for the constants are actually retrieved and used. In addition, the values defined for constants in the constant table 1415 may be modified and/or updated. In this manner, the constant table 1415 provides the ability to modify the value defined for constants that the rules engine 1425 references without the need to rewrite or recompile code that specifies the operation of the rules engine 1425.

The tables 1415 further include function tables that store functions that the rules engine 1425 needs to use to calculate values needed to populate the output tables 1445. One example of such a function is a hash function that the rules engine uses to compute hash values for distributing distributed hash table (DHT) operations as well as load balancing traffic between lower level switches and higher level switches in a hierarchical switching architecture.

The rules engine 1425 performs table mapping operations that specify one manner for converting any LDPS within the LCP to a LDPS in the LFP. Whenever one of the rule-engine (RE) input tables is modified, the rules engine performs a set of table mapping operations that may result in the modification of one or more data tuples in one or more RE output tables. The modification of the output table data tuples, in turn, through the virtualization application 1405, may cause the NIB to be modified in order to establish and/or modify the implementation of a particular user's LDPS in the managed switching element infrastructure.

As shown in FIG. 14, the rules engine 1425 includes an event processor 1422, several query plans 1427, and a table processor 1430. Each query plan is a set of rules that specify a set of join operations that are to be performed upon the occurrence of a modification to one of the RE input table. Such a modification is referred to below as an input table event. In this example, each query plan is generated by the compiler 1435 from one declaratory rule in the set of declarations 1440. In some embodiments, more than one query plan is generated from one declaratory rule. In some embodiments, the query plans are defined by using the n Log declaratory language.

In some embodiments, the compiler 1435 does not just statically generate query plans but rather dynamically generates query plans based on performance data it gathers. The compiler 1435 in these embodiments generates an initial set of query plans and lets the rules engine operate with the initial set of query plans. The control application gathers the performance data or receives performance feedbacks (e.g., from the rules engine). Based on this data, the compiler is modified so that the control application or a user of this application can have the modified compiler modify the query plans while the rules engine is not operating or during the operation of the rules engine.

For instance, the order of the join operations in a query plan may result in different execution times depending on the number of tables the rules engine has to select to perform each join operation. The compiler in these embodiments can be re-specified in order to re-order the join operations in a particular query plan when a certain order of the join operations in the particular query plan has resulted in a long execution time to perform the join operations.

The event processor 1422 of the rules engine 1425 detects the occurrence of each input table event. The event processor of different embodiments detects the occurrence of an input table event differently. In some embodiments, the event processor registers for callbacks with the RE input tables for notification of changes to the records of the RE input tables. In such embodiments, the event processor 1422 detects an input table event when it receives notification from a RE input table that one of its records has changed.

In response to a detected input table event, the event processor 1422 (1) selects the appropriate query plan for the detected table event, and (2) directs the table processor 1430 to execute the query plan. To execute the query plan, the table processor 1430 in some embodiments performs the join operations specified by the query plan to produce one or more records that represent one or more sets of data values from one or more input and miscellaneous tables 1410 and 1415. The table processor 1430 of some embodiments then (1) performs a select operation to select a subset of the data values from the record(s) produced by the join operations, and (2) writes the selected subset of data values in one or more RE output tables 1445.

In some embodiments, the RE output tables 1445 store both logical and physical network element data attributes. The tables 1445 are called RE output tables as they store the output of the table mapping operations of the rules engine 1425. In some embodiments, the RE output tables can be grouped in several different categories. For instance, in some embodiments, these tables can be RE input tables and/or control-application (CA) output tables. A table is a RE input table when a change in the table causes the rules engine to detect an input event that requires the execution of a query plan. A RE output table 1445 can also be a RE input table 1410 that generates an event that causes the rules engine to perform another query plan. Such an event is referred to as an internal input event, and it is to be contrasted with an external input event, which is an event that is caused by a RE input table modification made by the control application 1400 or the NIB monitor 1450.

A table is a CA output table when a change in the table causes the publisher 1455 to publish a change to the virtualization application 1405 and/or to the NIB, as further described below. A table in the RE output tables 1445 can be a RE input table, a CA output table, or both a RE input table and a CA output table in some embodiments.

The publisher 1455 detects changes to the CA output tables of the RE output tables 1445. The publisher of different embodiments detects the occurrence of a CA output table event differently. In some embodiments, the publisher registers for callbacks with the CA output tables for notification of changes to the records of the CA output tables. In such embodiments, the publisher 1455 detects an output table event when it receives notification from a CA output table that one of its records has changed.

In response to a detected output table event, the publisher 1455 takes some or all of modified data tuples in the modified CA output tables and propagates this modified data tuple(s) to the input tables (not shown) of the virtualization application 1405. In some embodiments, instead of the publisher 1455 pushing the data tuples to the virtualization application, the virtualization application 1405 pulls the data tuples from the CA output tables 1445 into the input tables of the virtualization application. Alternatively, in some embodiments, the publisher 1455 publishes changes to the modified CA output tables to the NIB, and the virtualization application 1405 retrieves these changes from the NIB and based on them, modifies its input tables. In some embodiments, the CA output tables 1445 of the control application 1400 and the input tables of the virtualization 1405 may be identical. In yet other embodiments, the control and virtualization applications use one set of tables, so that the CA output tables are essentially virtualization application (VA) input tables.

Moreover, the publisher 1455 in some embodiments takes some or all of modified data tuples in the modified CA output tables and propagates this modified data tuple into the NIB 1460 through the APIs provided by the NOS 1465. Also, the publisher may push down logical data (e.g., LCP data, LFP data, etc.) processed and maintained by the control application 1400 to the NIB 1460. This is because, in some embodiments, the NIB 1460 serves as a medium for all communications between the control application, the virtualization application, and the NOS of different controller instances as described above by reference to FIG. 9.

As the CA output tables store both logical and physical network element data attributes in some embodiments, the NIB 1460 in some embodiments stores both logical and physical network element attributes that are identical to or derived by the virtualization application 1405 from the logical and physical network element data attributes in the output tables 1445. In other embodiments, however, the NIB only stores physical network element attributes that are identical to or derived by the virtualization application 1405 from the physical network element data attributes in the output tables 1445.

The NIB monitor 1450 interfaces with the NIB 1460 to receive notifications regarding changes to the NIB. The NIB monitor of different embodiments detects the occurrence of a change in the NIB differently. In some embodiments, the NIB monitor registers for callbacks with the NIB for notification of changes to one or more records in the NIB. In such embodiments, the NIB monitor 1450 detects a NIB change event when it receives notification from the NIB that one of its records has changed. In response to a detected NIB change event, the NIB monitor 1450 may modify one or more RE input tables 1410, which, in turn, may cause one or more RE input table events to occur that then initiates the execution of one or more query plans by the rules engine. In other words, the NIB monitor writes some or all of the information that it receives from the NIB into the input tables 1410, so that the state and configuration of the managed switching elements can be accounted for while generating the NIB data tuples through the mapping operations. Each time the managed switching configuration or underlying managed switching element state changes, the NIB monitor 1450 may update the input table records 1410 so that the generated NIB data tuples can be updated to reflect the modified switching configuration or underlying switching element state.

In some embodiments, the NIB monitor 1450 is a collection of input objects (or functions) associated with the RE input tables. Each input object in some embodiments is associated with one RE input table and is responsible for modifying its associated RE input table in response to a change in the NIB. Each input object in some embodiments registers with one or more NIB objects for callback notifications upon the occurrence of changes to the NIB object(s). Similarly, in some embodiments, the publisher 1455 is a collection of output objects (or functions) associated with the CA output tables. Each output object in some embodiments is associated with one CA output table and is responsible for propagating changes in its associated output table to the virtualization application 1405. As such, in some embodiments, the NIB monitor is a conceptual representation of the input and output objects that register with the NIB for callbacks.

The query manager 1420 uses an inter-controller communication interface (not shown) to interface with the control application 1400 to receive queries regarding LDPS data. In some embodiments, these queries originate from the input translation application 1401, which receives these queries (e.g., information inquires) from the user. As shown in FIG. 14, the query manager 1420 of some embodiments also interfaces with the NIB 1460 in order to query the NIB to provide the control application state information regarding the network elements in the LDPS' for the different users. In other embodiments, however, the query manager 1420 queries the output tables 1445 to obtain LDPS data for the control application.

As shown in FIG. 14, the NOS 1465 includes an optimizer 1490. In some embodiments, the NOS 1465 subsequently propagates NIB data tuples generated by the virtualization application 1405 based on logical datapath data to the managed switching elements to complete the deployment of the user's switching configuration to the managed switching elements. These NIB data tuples are resulted from processing the changes in a managed switching element or changes in the LDPS specified by the user. The optimizer 1490 schedules the propagation of the data tuples to the other controller instances. The optimizer 1490 will be described in detail further below by reference to FIG. 23.

3. Scheduling in Virtualization Layer

Figure 15:
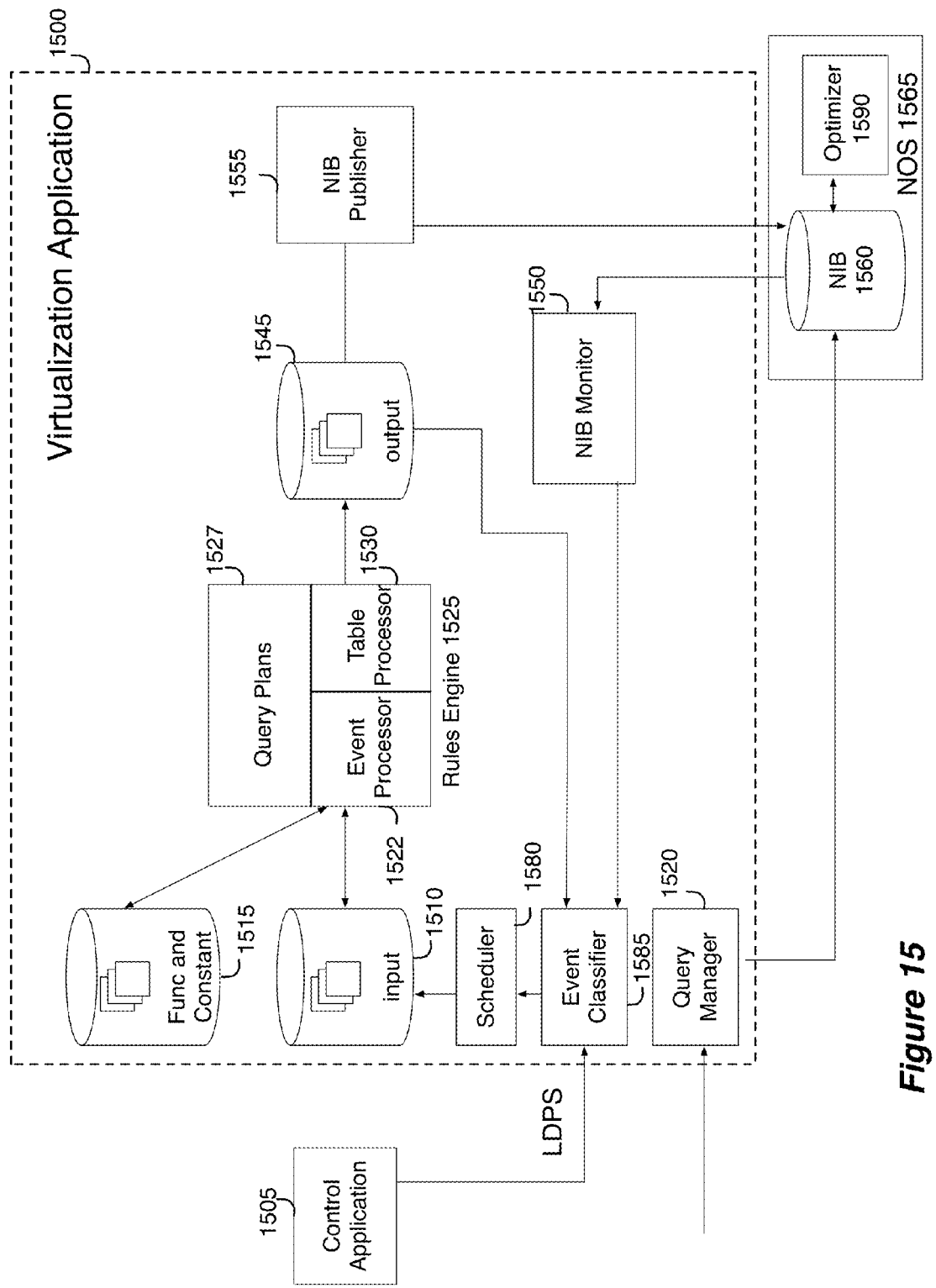
FIG. 15 illustrates a virtualization application of some embodiments of the invention.

FIG. 15 illustrates a virtualization application 1500 of some embodiments of the invention. This application 1500 is used in some embodiments as the virtualization module 1030 of FIG. 10. The virtualization application 1500 uses an n Log table mapping engine to map input tables that contain LDPS data to data tuples that represent UPCP data. This application resides below a control application 1505 that generates LDPS data tuples in some embodiments.

More specifically, the control application 1505 allows different users to define different LDP sets, which specify the desired configuration of the logical switches that the users manage. The control application 1505 through its mapping operations converts data for each LDPS of each user into a set of data tuples that specify the LFP data for the logical switch associated with the LDPS. In some embodiments, the control application is executed on the same host on which the virtualization application 1500 is executed. The control application and the virtualization application do not have to run on the same machine in other embodiments.

As shown in FIG. 15, the virtualization application 1500 includes an event classifier 1585, a scheduler 1580, a set of rule-engine input tables 1510, a set of function and constant tables 1515, an query manager 1520, a rules engine 1525, a set of rule-engine output tables 1545, a translator 1550, a NIB publisher 1555, a PTD 1560, and a compiler 1535.

The compiler 1535 is similar to the compiler 1435 described above by reference to FIG. 14. In some embodiments, the rule-engine (RE) input tables 1510 include tables with logical data and/or switching configurations (e.g., access control list configurations, private virtual network configurations, port security configurations, etc.) specified by the user and/or the virtualization application. In some embodiments, the input tables 1510 include tables that contain physical data (i.e., non-logical data) from the switching elements managed by the network control system. In some embodiments, such physical data includes data regarding the managed switching elements (e.g., UPCP data and CPCP data) and other data regarding network configuration employed by the network control system to deploy the different LDP sets of the different users.

In order for the virtualization application 1500 to map the LDPS data tuples to UPCP data tuples, the developer in some embodiments specifies in a declarative language the declarative instructions 1540 which include the instructions for mapping the LDPS data tuples to UPCP data tuples for some managed switching elements. In some such embodiments, these switching elements include UPCPs to convert the UPCP data to the CPCP data.

For other managed switching elements, the virtualization application 1500 maps the LDPS data tuples to CPCP data tuples that are specific to each managed switching elements that do not have UPCPs. In some embodiments, the virtualization application 1500 further maps the UPCP data tuples in the output tables 1540 to the CPCP data tuples for some managed switching elements that do not have UPCPs to convert the UPCP data tuples to the physical control plane data tuples.

The event classifier 1585 receives input event data and classifies the input event data. The input event data may be LFP data that the control application 1505 generates from the LCP data. The input event data in some embodiments may also be UPCP data or CPCP data received from the NIB 1560 or from the RE output tables 1545. The event classifier 1585 of some embodiments receives the physical forwarding plane data from the NIB monitor 1550 that monitors the NIB to detect a change in the NIB 1560 that reflects a change in one or more managed switching elements. The NIB monitor 1550 interfaces with the NIB 1560 to receive notifications regarding changes to the NIB 1560. In response to a detected NIB change event, the NIB monitor 1550 notifies the event classifier 1585 of the change event and sends the input event data (e.g., physical control plane data) regarding the change event to the event classifier 1585.

The event classifier 1585 receives the input event data also from a RE input table that generates an internal input event. An internal input event causes the rules engine 1525 to perform a query plan after it is modified by the rules engine 1525.

The event classifier 1585 of some embodiments classifies the received input event data according to the LDPS that the input event data affects. The input event data affects a LDPS when the input event data is about a change or a desired change at one or more managed switching elements that implement the LDPS. The event classifier 1585 notifies the scheduler of the received input event data and the classification of the input event data. In some embodiments, the event classifier 1585 adds a tag to the input event data to identify the LDPS that the input event data affects.

The scheduler 1580 receives the input event data and the classification of the input event data from the event classifier 1585. In some embodiments, the scheduler 1580 communicates with the rules engine 1525 to determine whether the rules engine 1525 is currently processing the RE input tables 1510 (e.g., whether the rules engine 1525 is performing join operations on the RE input tables 1510 to generate RE output tables 1545). When the rules engine is currently processing the RE input tables 1510, the scheduler 1580 identifies the LDPS data that is being converted to the physical datapath data by the rules engine 1525. The scheduler 1580 then determines whether the received input event data affects the identified LDPS.

When the scheduler 1580 determines that the received input event data affects the identified LDPS, the scheduler 1580 modifies one or more RE input tables 1510 based on the received input event data. In other words, the scheduler 1580 writes the input event data into the input tables 1510. When the scheduler 1580 determines that the received input event data does not affect the identified LDPS, the scheduler 1580 holds the received input event data.

In some embodiments, the scheduler 1580 does not wait for the input event data that affects the LDPS that is currently being converted to a physical datapath by the rules engine 1525 of the virtualization application 1500 when one of the already-received input event data affects the LDPS. When none of the received input event data affects the LDPS, the scheduler 1580 of some such embodiments modifies one or more RE input tables 1510 based on the oldest received input event data that has been held by the scheduler 1580.

In addition to the RE input tables 1510, the virtualization application 1500 includes other miscellaneous tables 1515 that the rules engine 1525 uses to gather inputs for its table mapping operations. These tables 1515 include constant tables that store defined values for constants that the rules engine 1525 needs to perform its table mapping operations.

When the rules engine 1525 references constants, the corresponding value defined for the constants are actually retrieved and used. In addition, the values defined for constants in the constant table 1515 may be modified and/or updated. In this manner, the constant tables 1515 provide the ability to modify the value defined for constants that the rules engine 1525 references without the need to rewrite or recompile code that specifies the operation of the rules engine 1525. The tables 1515 further include function tables that store functions that the rules engine 1525 needs to use to calculate values needed to populate the output tables 1545.

The rules engine 1525 performs table mapping operations that specify one manner for implementing the LDP sets within the managed switching element infrastructure. Whenever one of the RE input tables is modified, the rules engine performs a set of table mapping operations that may result in the modification of one or more data tuples in one or more RE output tables.

As shown in FIG. 15, the rules engine 1525 includes an event processor 1522, several query plans 1527, and a table processor 1530. In some embodiments, each query plan is a set of join operations that are to be performed upon the occurrence of a modification to one of the RE input tables. Such a modification is referred to below as an input table event. In this example, each query plan is generated by the compiler 1535 from one declaratory rule in the set of declarations 1540. In some embodiments, more than one query plan is generated from one declaratory rule as described above. In some embodiments, the query plans are defined by using the n Log declaratory language.

The event processor 1522 of the rules engine 1525 detects the occurrence of each input table event. The event processor of different embodiments detects the occurrence of an input table event differently. In some embodiments, the event processor registers for callbacks with the RE input tables for notification of changes to the records of the RE input tables. In such embodiments, the event processor 1522 detects an input table event when it receives notification from an RE input table that one of its records has changed.

In response to a detected input table event, the event processor 1522 (1) selects the appropriate query plan for the detected table event, and (2) directs the table processor 1530 to execute the query plan. To execute the query plan, the table processor 1530 in some embodiments performs the join operations specified by the query plan to produce one or more records that represent one or more sets of data values from one or more input and miscellaneous tables 1510 and 1515. The table processor 1530 of some embodiments then (1) performs a select operation to select a subset of the data values from the record(s) produced by the join operations, and (2) writes the selected subset of data values in one or more RE output tables 1545.

In some embodiments, the RE output tables 1545 store both logical and physical network element data attributes. The tables 1545 are called RE output tables as they store the output of the table mapping operations of the rules engine 1525. In some embodiments, the RE output tables can be grouped in several different categories. For instance, in some embodiments, these tables can be RE input tables and/or virtualization-application (VA) output tables. A table is an RE input table when a change in the table causes the rules engine to detect an input event that requires the execution of a query plan. A RE output table 1545 can also be an RE input table 1510 that generates an event that causes the rules engine to perform another query plan after it is modified by the rules engine. Such an event is referred to as an internal input event, and it is to be contrasted with an external input event, which is an event that is caused by an RE input table modification made by the control application 1505 or the NIB monitor 1550.

A table is a VA output table when a change in the table causes the NIB publisher 1555 to publish a change to the NIB 1560. In some embodiments, a table in the RE output tables 1545 can be an RE input table, a VA output table, or both an RE input table 1510 and a VA output table in some embodiments.

The NIB publisher 1555 detects changes to the VA output tables of the RE output tables 1545. The NIB publisher of different embodiments detects the occurrence of a VA output table event differently. In some embodiments, the NIB publisher registers for callbacks with the VA output tables for notification of changes to the records of the VA output tables. In such embodiments, the NIB publisher 1555 detects an output table event when it receives notification from a VA output table that one of its records has changed.

In response to a detected output table event, the NIB publisher 1555 takes each modified data tuple in the modified VA output tables and propagates this modified data tuple into the NIB 1560 through the APIs provided by the NOS 1565. After a new data tuple is propagated to the NIB by the NIB publisher 1555, the NOS 1565 propagates, if needed, a NIB data tuple that was modified because of the propagated VA output table data tuple to one or more of the managed switching elements. In doing this, the NOS completes the deployment of the LDPS (e.g., one or more logical switching configurations) to one or more managed switching elements as specified by the NIB records.

As the VA output tables store both logical and physical network element data attributes in some embodiments, the NIB 1560 in some embodiments stores both logical and physical network element attributes that are identical to or derived from the logical and physical network element data attributes in the output tables 1545. In other embodiments, however, the NIB only stores physical network element attributes that are identical to or derived from the physical network element data attributes in the output tables 1545.

The NIB monitor 1550 interfaces with the NIB 1560 to receive notifications regarding changes to the NIB. The NIB monitor of different embodiments detects the occurrence of a change in the NIB differently. In some embodiments, the NIB monitor registers for callbacks with the NIB for notification of changes to one or more records in the NIB. In such embodiments, the NIB monitor 1550 detects a NIB change event when it receives notification from the NIB that one of its records has changed. In response to a detected NIB change event, the NIB monitor 1550 may modify one or more RE input tables 1510, which, in turn, may cause one or more RE input table events to occur that then initiates the execution of one or more query plans by the rules engine. In other words, the NIB monitor writes some or all of the information that it receives from the NIB into the input tables 1510, so that the state and configuration of the managed switching elements can be accounted for while generating the NIB data tuples through the mapping operations. Each time the managed switching configuration or underlying managed switching element state changes, the NIB monitor 1550 may update the input table records 1510 so that the generated NIB data tuples can be updated to reflect the modified switching configuration or underlying switching element state.

In some embodiments, the NIB monitor 1550 is a collection of input objects (or functions) associated with the RE input tables. Each input object in some embodiments is associated with one RE input table and is responsible for modifying its associated input table in response to a change in the NIB. Each input object in some embodiments registers with one or more NIB objects for callback notifications upon the occurrence of changes to the NIB object(s). Similarly, in some embodiments, the NIB publisher 1555 is a collection of output objects (or functions) associated with the VA output tables. Each output object in some embodiments is associated with one VA output table and is responsible for propagating changes in its associated output table to the NIB. As such, in some embodiments, the NIB monitor is a conceptual representation of the input and output objects that register with the NIB for callbacks.

The query manager 1520 of some embodiments uses an inter-controller communication interface to interfaces with an input translation application (not shown) to receive queries (e.g., information inquires) regarding LDPS data and send responses to the input translation application. As shown in FIG. 15, the manager 1520 of some embodiments also interfaces with the NIB 1560 in order to query the NIB to provide the virtualization application state information (e.g., responses to requests that specify information inquires originated from the user) regarding the network elements in the LDPS' for the different user. In other embodiments, however, the query manager 1520 queries the output tables 1545 to obtain LDPS data for the control application.

The NOS 1565 subsequently propagates NIB data tuples (e.g., physical datapath data) generated by the virtualization application 1500 to the managed switching elements to complete the deployment of the user's switching configuration to the managed switching elements. These NIB data tuples are resulted from processing the changes in a managed switching element or changes in the LDPS specified by the user. As shown in FIG. 15, the NOS 1565 includes the optimizer 1590. The optimizer 1590 schedules the propagation of the data tuples to the other controller instances The optimizer 1590 will be described further below by reference to FIG. 23.

4. Scheduling in Customization Layer

Figure 16:
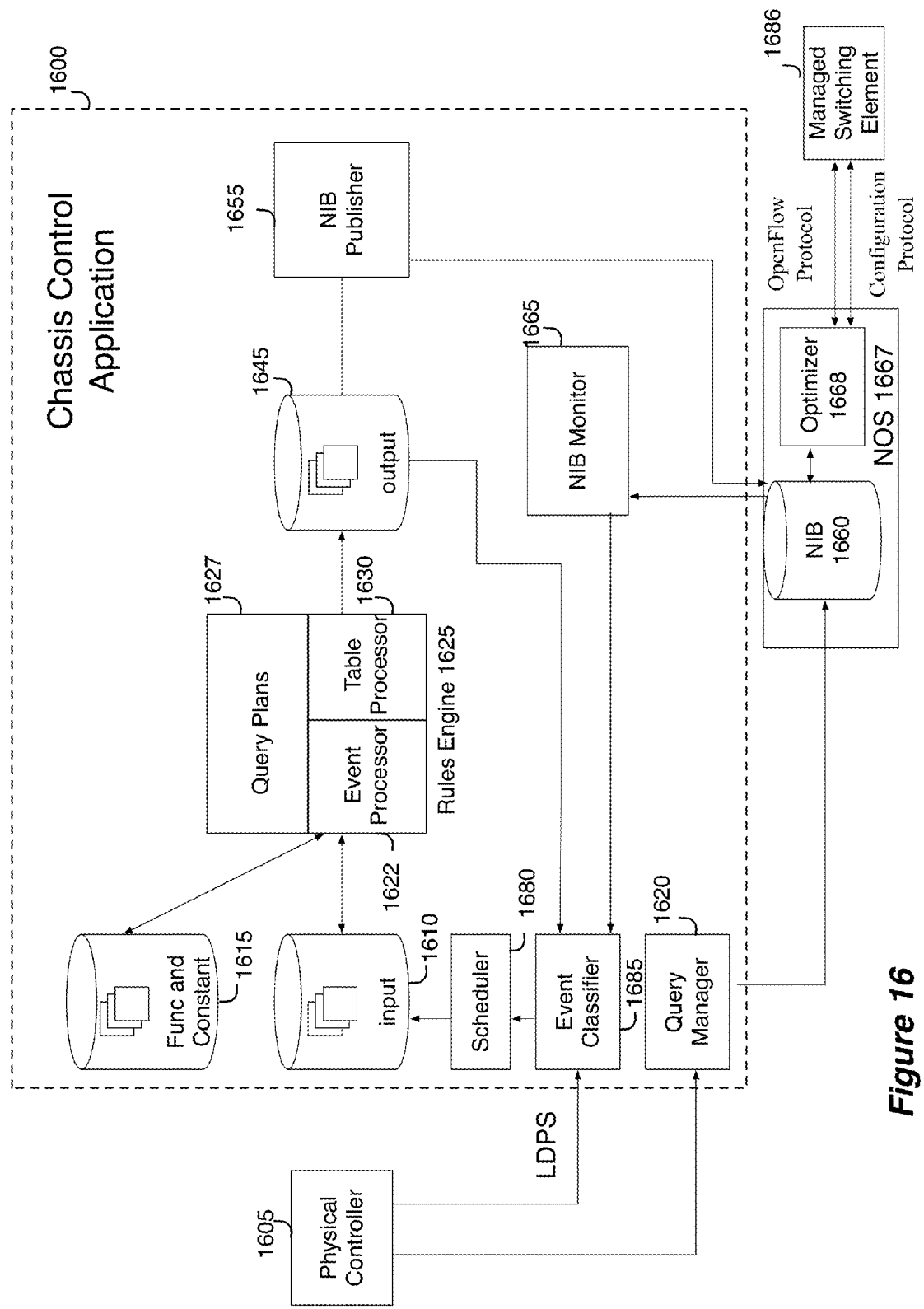
FIG. 16 illustrates an example architecture for a chassis control application.

In some embodiments, a chassis controller is a controller for managing a single managed switching element. A chassis controller of some embodiments does not have a full stack of different modules and interfaces described above by reference to FIG. 11. One of the modules that a chassis controller does have is a chassis control application that generates CPCP data from UPCP data it receives from one or more physical controllers. FIG. 16 illustrates an example architecture for a chassis control application 1600. This application 1600 uses an n Log table mapping engine to map input tables that contain input data tuples that represent UPCP data to data tuples that represent the LFP data. This application 1600 manages the managed switching element 1686 in this example by exchanging data with the managed switching element 1686. In some embodiments, the application 1600 (i.e., the chassis controller) runs in the same machine in which the managed switching element 1686 is running As shown in FIG. 16, the chassis control application 1600 includes a set of rule-engine input tables 1610, a set of function and constant tables 1615, an query manager 1620, a rules engine 1625, a set of rule-engine output tables 1645, an NIB publisher 1655, a managed switching element communication interface 1665, and a compiler 1635. This figure also illustrates a physical controller 1605 and a managed switching element 1686.

The compiler 1635 is similar to the compilers of the control application or the virtualization application described above by reference to FIGS. 14 and 15. In some embodiments, the rule-engine (RE) input tables 1610 include tables with universal physical data and/or switching configurations (e.g., access control list configurations, private virtual network configurations, port security configurations, etc.) that the physical controller 1605 that is master of the managed switching element 1686, sent to the chassis control application 1600. The input tables 1610 also include tables that contain physical data (i.e., non-logical data) from the managed switching element 1686. In some embodiments, such physical data includes data regarding the managed switching element 1686 (e.g., CPCP data, physical forwarding data) and other data regarding the configuration of the managed switching element 1686.

The event classifier 1685 retrieves input event data from the physical controller 1605 and classifies the input event data. The input event data may also be CPCP data that the chassis control application 1600 generates from the UPCP data. The input event data may also be CPCP data received from the NIB 1660 or from the RE output tables 1645.

The event classifier 1685 of some embodiments receives the physical forwarding plane data from the NIB monitor 1665 that monitors the NIB to detect a change in the NIB 1660 that reflects a change in the managed switching elements. The NIB monitor 1665 interfaces with the NIB 1660 to receive notifications regarding changes to the NIB 1660. In response to a detected NIB change event, the NIB monitor 1665 notifies the event classifier 1685 of the change event and sends the input event data (e.g., physical forwarding plane data or CPCP data) regarding the change event to the event classifier 1685.

The event classifier 1685 receives the input event data also from a RE output table that generates an internal input event. In some embodiments, an internal input event causes the rules engine 1625 to perform a query plan after it is modified by the rules engine 1625.

The event classifier 1685 of some embodiments classifies the received input event data according to the LDPS that the input event data affects. The input event data affects a LDPS when the input event data is about a change at one or more managed switching elements that implement the LDPS. For instance, when the LDPS specifies a tunnel established between two network elements, the input event data that affects the LDPS are from any of the managed switching elements that implement the tunnel. Also, when the user specifies input event data to define or modify a particular LDPS, this input event data affects the particular LDPS. In some embodiments, the event classifier 1685 adds a tag to the input event data to identify the LDPS that the input event data affects. The event classifier 1685 notifies the scheduler of the received input event data and the classification (e.g., the tag identifying the LDPS) of the input event data.

The scheduler 1680 receives the input event data and the classification of the input event data from the event classifier 1685. In some embodiments, the scheduler 1680 communicates with the rules engine 1625 to determine whether the rules engine 1625 is currently processing the RE input tables 1610 (e.g., whether the rules engine 1625 is performing join operations on the RE input tables 1610 to generate RE output tables 1645). When the rules engine is currently processing the RE input tables 1610, the scheduler 1680 identifies the LDPS that is being modified or created by the rules engine 1625 by processing the RE input tables 1610. The scheduler 1680 then determines whether the received input event data affects the identified LDPS. When the scheduler 1680 determines that the received input event data affects the identified LDPS (e.g., when the classification of the input event data includes a tag specifying an LDPS that is the same as the identified LDPS), the scheduler 1680 modifies one or more RE input tables 1610 based on the received input event data. In other words, the scheduler 1680 writes the input event data into the input tables 1610. When the scheduler 1680 determines that the received input event data does not affect the identified LDPS, the scheduler 1680 holds the received input event data.

In some embodiments, the scheduler 1680 does not wait for the input event data that affects the LDPS that is currently being modified or created when none of the already-received input data affects the LDPS. When none of the received input event data affects the LDPS, the scheduler 1680 of some such embodiments modifies one or more RE input tables 1610 based on the oldest received input event data that has been held. In this manner, the scheduler 1680 allows the rules engine 1625 to process all the input event data affecting the same LDPS together while the LDPS is being modified or created. The scheduler 1680 will be further described below by reference to FIGS. 17-22.

In addition to the input tables 1610, the chassis control application 1600 includes other miscellaneous tables 1615 that the rules engine 1625 uses to gather inputs for its table mapping operations. These tables 1615 include constant tables that store defined values for constants that the rules engine 1625 needs to perform its table mapping operations.

When the rules engine 1625 references constants, the corresponding value defined for the constants are actually retrieved and used. In addition, the values defined for constants in the constant table 1615 may be modified and/or updated. In this manner, the constant tables 1615 provide the ability to modify the value defined for constants that the rules engine 1625 references without the need to rewrite or recompile code that specifies the operation of the rules engine 1625. The tables 1615 further include function tables that store functions that the rules engine 1625 needs to use to calculate values needed to populate the output tables 1645.

The rules engine 1625 performs table mapping operations that specify one manner for implementing the LDP sets within the managed switching element 1686. Whenever one of the RE input tables is modified, the rules engine performs a set of table mapping operations that may result in the modification of one or more data tuples in one or more RE output tables.

As shown in FIG. 16, the rules engine 1625 includes an event processor 1622, several query plans 1627, and a table processor 1630. In some embodiments, each query plan is a set of join operations that are to be performed upon the occurrence of a modification to one of the RE input table. Such a modification is referred to below as an input table event. Each query plan is generated by the compiler 1635 from one declaratory rule in the set of declarations 1640. In some embodiments, more than one query plan is generated from one declaratory rule as described above. In some embodiments, the query plans are defined by using the n Log declaratory language.

The event processor 1622 of the rules engine 1625 detects the occurrence of each input table event. The event processor of different embodiments detects the occurrence of an input table event differently. In some embodiments, the event processor registers for callbacks with the input tables for notification of changes to the records of the input tables. In such embodiments, the event processor 1622 detects an input table event when it receives notification from an input table that one of its records has changed.

In response to a detected input table event, the event processor 1622 (1) selects the appropriate query plan for the detected table event, and (2) directs the table processor 1630 to execute the query plan. To execute the query plan, the table processor 1630 in some embodiments performs the join operations specified by the query plan to produce one or more records that represent one or more sets of data values from one or more input and miscellaneous tables 1610 and 1615. The table processor 1630 of some embodiments then (1) performs a select operation to select a subset of the data values from the record(s) produced by the join operations, and (2) writes the selected subset of data values in one or more output tables 1645.

In some embodiments, the RE output tables 1645 store both logical and physical network element data attributes. The tables 1645 are called RE output tables as they store the output of the table mapping operations of the rules engine 1625. In some embodiments, the RE output tables can be grouped in several different categories. For instance, in some embodiments, these tables can be RE input tables and/or chassis-controller-application (CCA) output tables. A table is an RE input table when a change in the table causes the rules engine to detect an input event that requires the execution of a query plan. A RE output table 1645 can also be an RE input table 1610 that generates an event that causes the rules engine to perform another query plan after it is modified by the rules engine. Such an event is referred to as an internal input event, and it is to be contrasted with an external input event, which is an event that is caused by an RE input table modification made by the physical controller 1605 via the importer 1620. A table is a CCA output table when a change in the table causes the NIB publisher 1655 to push a change to the NIB 1655.

The NIB publisher 1655 detects changes to the CCA output tables of the RE output tables 1645. The exporter of different embodiments detects the occurrence of a CCA output table event differently. In some embodiments, the exporter registers for callbacks with the CCA output tables for notification of changes to the records of the CCA output tables. In such embodiments, the NIB publisher 1655 detects an output table event when it receives notification from a CCA output table that one of its records has changed.

In response to a detected output table event, the NIB publisher 1655 takes each modified data tuple in the modified CCA output tables and propagates this modified data tuple into the NIB 1666 through the APIs provided by the NOS 1667. After a new data tuple is propagated to the NIB by the NIB publisher 1655, the NOS 1667 propagates, if needed, a NIB data tuple that was modified because of the propagated CCAA output table data tuple to the managed switching element 1686. In doing this, the NOS completes the deployment of the LDPS (e.g., one or more logical switching configurations) to the managed switching element 1686.

Because the chassis controller application 1600 of some embodiments is for managing the managed switching element 1665 only, the records stored in the NIB 1666 are about the managed switching element 1665 only. The NIB 1666 of some embodiments stores both logical and physical data for the managed switching element 1686 to perform logical and physical processing on the packets that the managed switching element 1686 processes.

The query manager 1620 interfaces with the physical controller 1605 to receive queries regarding LDPS data. As shown in FIG. 16, the manager 1620 of some embodiments also interfaces with the NIB 1666 in order to query the NIB to provide the physical controller with state information regarding the network elements in the LDPS' for the different users. In other embodiments, however, the query manager 1620 queries the output tables 1645 to obtain LDPS data for the physical controller.

The NOS 1667 of the chassis controller of some embodiments establishes two channels of communication. The NOS establishes a first of the two channels using a switching control protocol. One example of a switching control protocol is the OpenFlow protocol. The OpenFlow protocol, in some embodiments, is a communication protocol for controlling the forwarding plane (e.g., forwarding tables) of a switching element. For instance, the OpenFlow protocol provides commands for adding flow entries to, removing flow entries from, and modifying flow entries in the managed switching element 1686.

The NOS establishes a second of the two channels using a configuration protocol to send configuration information. In some embodiments, configuration information includes information for configuring the managed switching element 1686, such as information for configuring ingress ports, egress ports, QoS configurations for ports, tunnels, etc.

The NOS 1667 receives updates in the managed switching element 1686 from the managed switching element 1686 over the two channels. The managed switching element 1686 of some embodiments sends updates to the chassis control application when there are changes with the flow entries or the configuration of the managed switching element 1686 not initiated by the chassis control application 1600. Examples of such changes include failure of a machine that was connected to a port of the managed switching element 1686, a VM migration to the managed switching element 1686, etc.

As shown in FIG. 16, the NOS 1667 includes an optimizer 1668. In some embodiments, the NOS 1667 subsequently propagates NIB data tuples generated by the chassis control application 1600 based on logical datapath data, to the managed switching elements to complete the deployment of the user's switching configuration to the managed switching elements. These NIB data tuples are resulted from processing the changes in a managed switching element or changes in the LDPS specified by the user. The optimizer 1668 will be described in detail further below by reference to FIG. 23.

5. Scheduling Schemes

Figure 17:
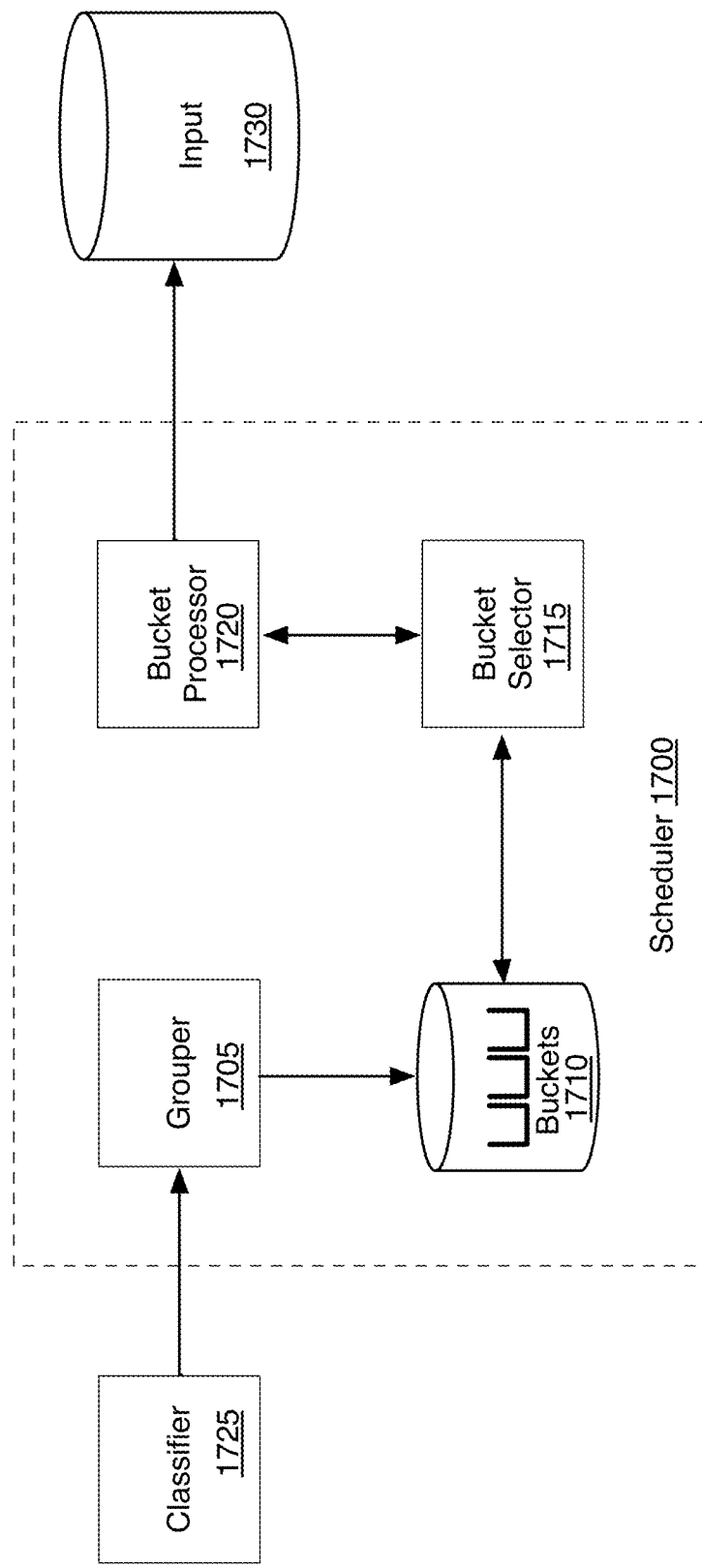
FIG. 17 conceptually illustrates a scheduler of some embodiments.

FIG. 17 conceptually illustrates a scheduler 1700 of some embodiments. Specifically, this figure illustrates that the scheduler 1700 uses buckets to determine whether to modify one or more input tables 1730 based on the input event data received from an event classifier 1725. FIG. 17 illustrates the classifier 1725, the scheduler 1700, and the input tables 1730.

As shown, the scheduler 1700 includes a grouper 1705, buckets 1710, a bucket selector 1715, and a bucket processor 1720. The classifier 1725 and the scheduler 1700 are similar to the classifiers 1485, 1585, and 1685 and the schedulers 1480, 1580, and 1680 in FIGS. 14-16, respectively.

The buckets 1710 is conceptual groupings of input event data coming from the classifier 1725. In some embodiments, a bucket is associated with a LDPS. Whenever the scheduler 1700 receives input event data, the grouper 1705 places the input event data into a bucket that is associated with a LDPS that the input event data affects. When there is no bucket to place the input event data, the grouper 1705 in some embodiments creates a bucket and associates the bucket with the LDPS that the input event data affects.

The bucket selector 1715 selects a bucket and designates the selected bucket as the bucket from which the bucket processor 1720 retrieves events. In some embodiments, the bucket selector selects a bucket that is associated with the LDPS that is currently being processed a rules engine (not shown in this figure). That is, the bucket selector 1715 selects a bucket that contains the input data that affects the LDPS that is being processed by the rules engine.

The bucket processor 1720 in some embodiments removes input event data for one input event from the bucket selected by the bucket selector 1715. The bucket processor 1720 updates one or more input tables 1730 using the input event data retrieved from the bucket so that the rules engine can perform table mapping operations on the updated input tables to modify the LDPS.

When the retrieved input event data is the only remaining event data in the selected bucket, the bucket selector 1700 in some embodiments destroys the bucket or leaves the bucket empty. When the bucket is destroyed, the grouper 1705 re-creates the bucket when an event data that is received at a later point in time affects the same LDPS that was associated with the destroyed bucket. When input event data for an input event comes in and there is no bucket or all buckets are empty, the grouper 1705 places the input event data in a bucket so that the bucket processor 1720 immediately retrieves the input event data and starts updating one or more input tables 1730. As mentioned above, the scheduler does not wait for a new input event data to arrive when none of the already-received input data affects the LDPS being processed by the rules engine. Thus, the processor 1720 immediately retrieves the input event data as soon as the rules engine finishes processing the LDPS (assuming no new input event data that affects the LDPS in the meantime.).

The bucket from which input event data was removed most recently is the current bucket for the scheduler 1700. In some embodiments, the bucket selector 1715 does not select another bucket until the current bucket becomes empty. When input event data for an input event comes in while a LDPS is currently being updated, the grouper 1705 places the input event data into the current bucket if the input event data affects the LDPS being modified. If the input event data does not affect the LDPS that is currently being modified but rather affects another LDPS, the grouper 1705 places the input event data into another bucket (the grouper creates this bucket if the bucket does not exist) that is associated with the other LDPS. In this manner, the bucket processor 1720 uses input event data for as many input events affecting one LDPS as possible.

When the current bucket is destroyed or becomes empty, the bucket selector 1715 designates the oldest bucket as the current bucket. Then, the bucket processor 1720 starts using the input event data from the new current bucket to update the input tables 1730. In some embodiments, the oldest bucket is a bucket that includes the oldest input event data.

Figure 18A:
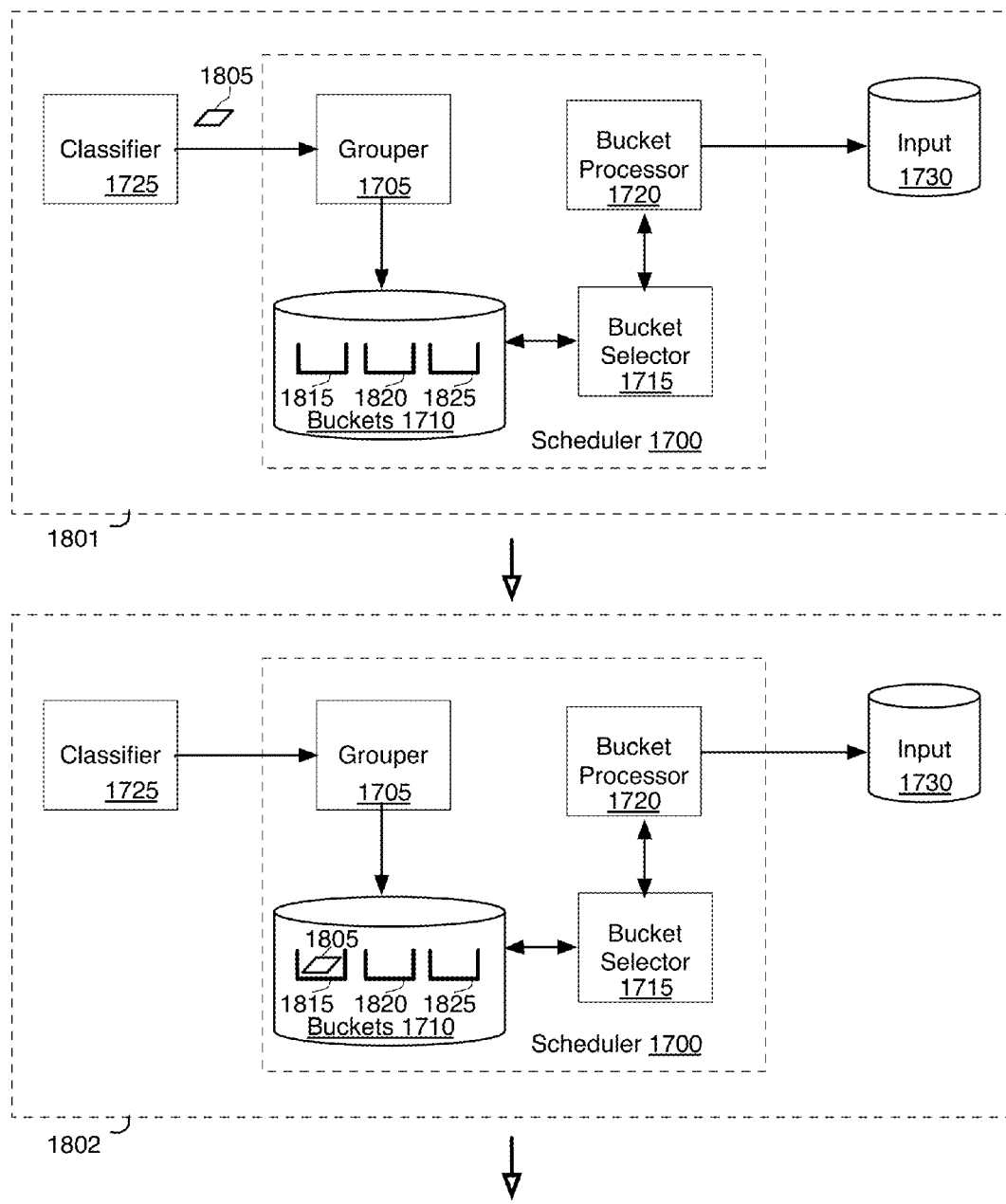
FIGS. 18A-18B illustrate in three different stages that the scheduler processing of the input event data for an input event.
Figure 18B:
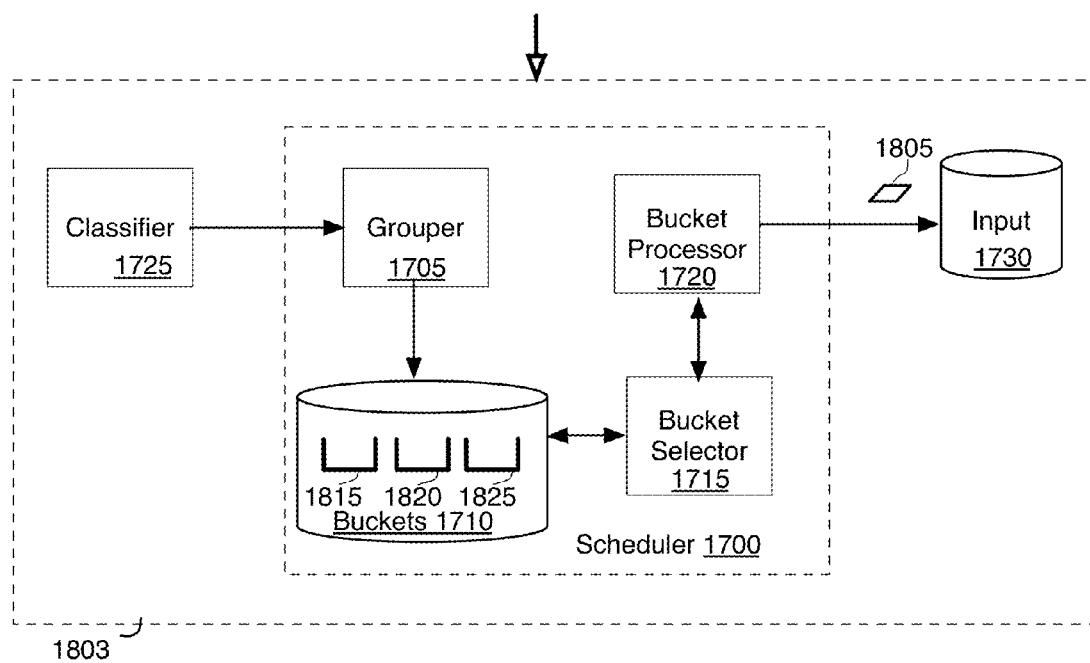

Several exemplary operations of the scheduler 1700 are now described by reference to FIGS. 18A-18B and 19A-19B. FIGS. 18A-18B illustrate in three different stages 1801, 1802, and 1803 that the scheduler 1700's processing of the input event data 1805 for an input event. Specifically, this figure shows that the scheduler 1700 processes input event data for an event right away without waiting for more input event data when the scheduler 1700 has no other input event data to process. This figure also illustrates the classifier 1725 and the input tables 1730.

At stage 1801, the classifier sends to the scheduler 1700 the input event data 1805 that the classifier has classified. All the buckets 1710, including buckets 1815, 1820, and 1825, are empty or deemed non-existent because the bucket processor 1720 has just used the last input event data (not shown) from the last non-empty bucket to update the input tables 1730 or because the input event data 1805 is the first input event data brought into the scheduler 1700 after the scheduler 1700 starts to run.

At stage 1802, the grouper 1705 places the input event data 1805 in the bucket 1815 because the bucket 1815 is associated with a LDPS that the input event data 1805 affects. The bucket selector 1715 selects the bucket 1815 so that the bucket processor 1720 can take event input event data from the bucket 1815. At stage 1803, the bucket processor 1720 retrieves the input event data 1805 and uses the input event data 1805 to update one or more input tables 1730.

Figure 19A:
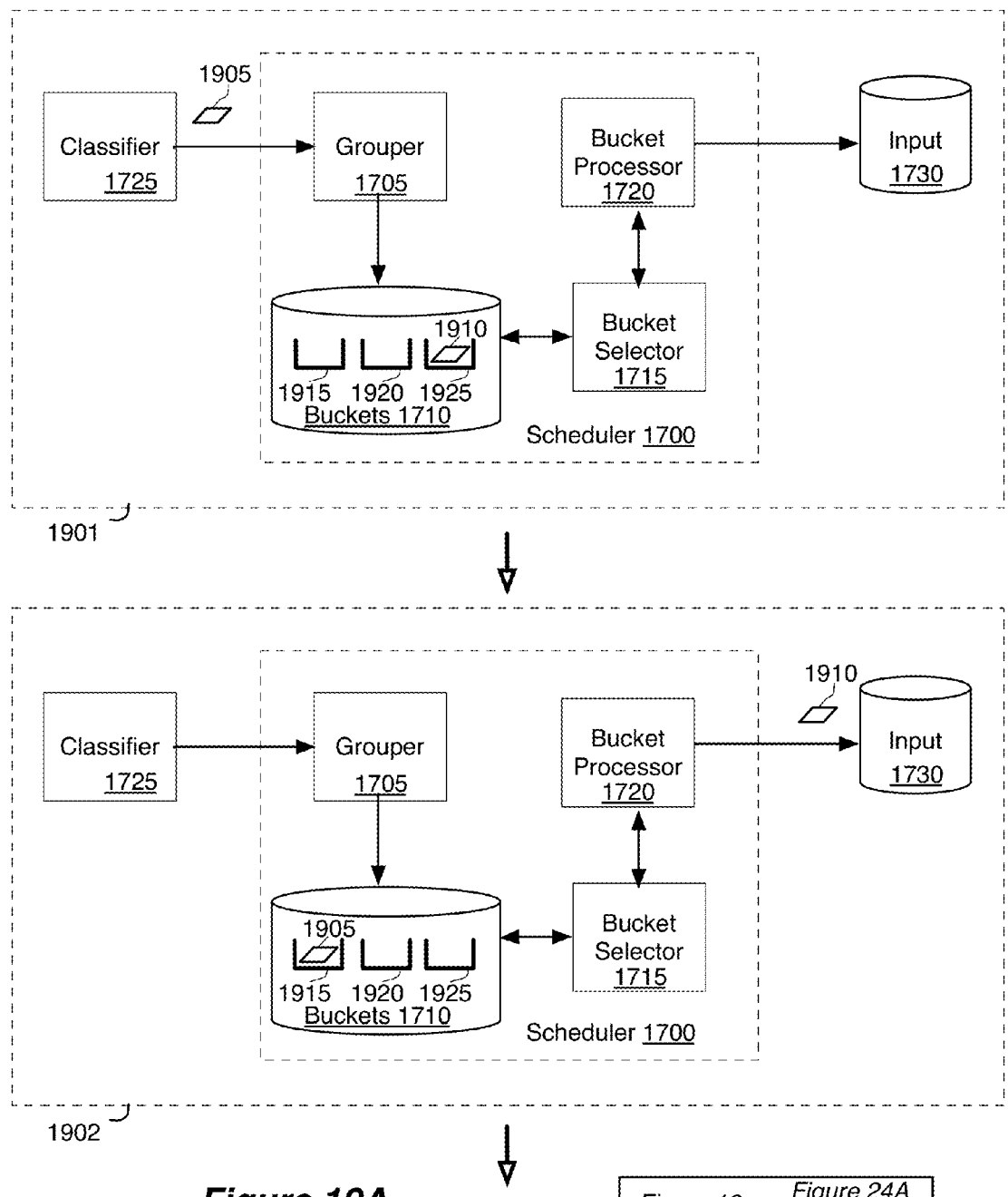
FIGS. 19A-19B illustrate that the scheduler processes two input event data for two different input events in three different stages.
Figure 19B:
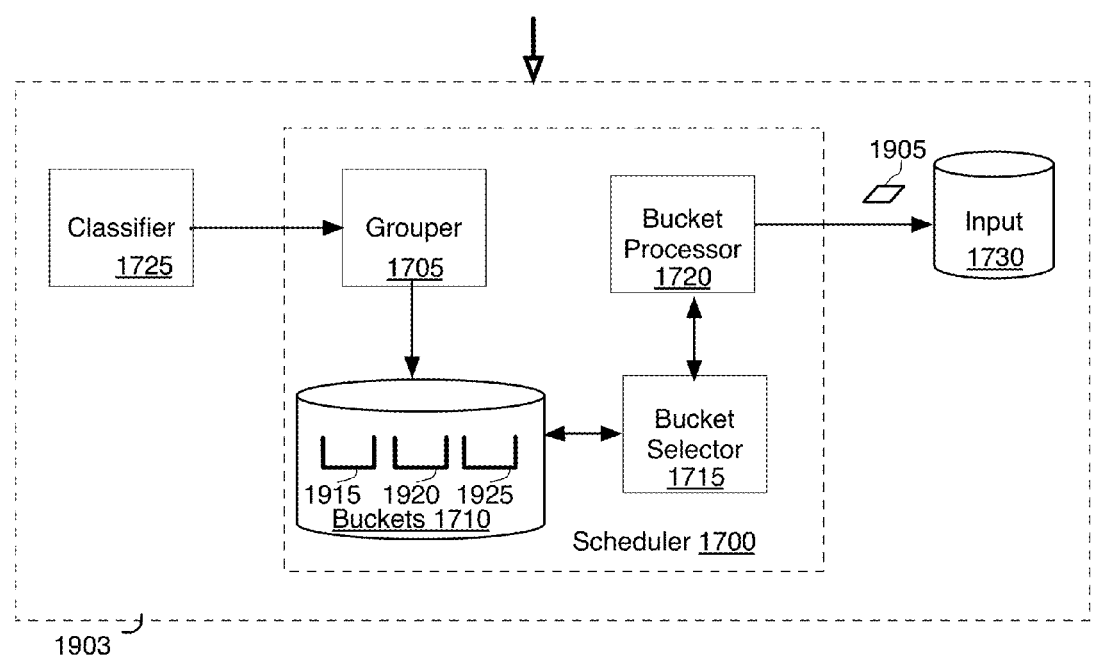

FIGS. 19A-19B illustrate that the scheduler 1700 processes two input event data 1905 and 1910 for two different input events in three different stages 1901, 1902, and 1903. This figure also illustrates the classifier 1725 and the input tables 1730.

At stage 1901, the buckets 1710 include three buckets 1915, 1920, and 1925. In the bucket 1925, the grouper 1705 previously placed the input event data 1910. The other two buckets 1915 and 1920 are empty. The buckets 1915-1925 are associated with three different LDP sets. The classifier 1725 sends the input event data 1905 that the classifier has classified to the grouper 1705. The input event data 1905 affects the LDPS that is associated with the bucket 1915. The bucket 1925 is the bucket that the bucket selector 1715 has designated as the current bucket. That is, the bucket processor 1720 is retrieving input event data from bucket 1925.

At stage 1902, the grouper 1705 places the input event data 1905 in the bucket 1915. The bucket selector 1715 does not change designation of the current bucket from the bucket 1925. The bucket processor 1720 takes out the input event data 1910 from the bucket 1925 and updates the input tables 1730 using the input event data 1910.

At stage 1903, the classifier 1725 has not classified another input event data because the classifier 1725 has not received another input event data for an input event. The bucket selector 1715 selects the bucket 1915 and designates the bucket 1915 as the new current bucket because the previous current bucket 1925 has become empty after the input event data 1910 was taken out from the bucket 1925. The bucket processor 1720 takes out the input event data 1905 from the new current bucket 1915 and updates the input tables 1730 using the input event data 1905.

In addition to a scheduling scheme based on LDP sets that has been described so far, different embodiments employ other different scheduling schemes to determine the order in which the input event data triggers the table mapping process. The different scheduling schemes include (i) a priority-based scheduling scheme, (ii) scheduling based on critical input event data and non-critical input event data, and (iii) scheduling based on start and end tags (also referred to as 'barriers' in some embodiments) that may be associated with input event data. These different scheduling schemes may be used alone or in combination. One of ordinary skill in the art will recognize that other scheduling schemes may be employed in order to determine the order in which the input event data is used to update input tables.

In the priority-based scheme, the event classifier 1725 assigns a priority level to the input event data. In some embodiments, the event classifier 1725 attaches a tag to the input event data to indicate the priority level for the input event data. Usually, the event classifier 1725 assigns the same priority level to different input event data when the different input event data affects the same LDPS. Therefore, a bucket includes different input event data with the same priority level and this priority level is the priority level for the bucket.

In some embodiments, the bucket selector 1715 designates a bucket with the highest priority level as the current bucket. That is, when input event data for an input event, which the grouper 1705 places in a particular bucket other than the current bucket, has a priority level that is higher than the priority level of the current bucket, the particular bucket becomes the new current bucket even if the old current bucket had not become empty. Thus, from that instance in time, the bucket processor 1720 uses the input event data from the new current bucket to update the input tables 1910. In this manner, the input event data with a higher priority level gets ahead of the input event data with a lower priority level. When the input event data that the scheduler 1700 receives from the event classifier 1725 and the current bucket have the same priority level, the bucket selector 1700 does not change the designation of the current bucket.

Figure 20A:
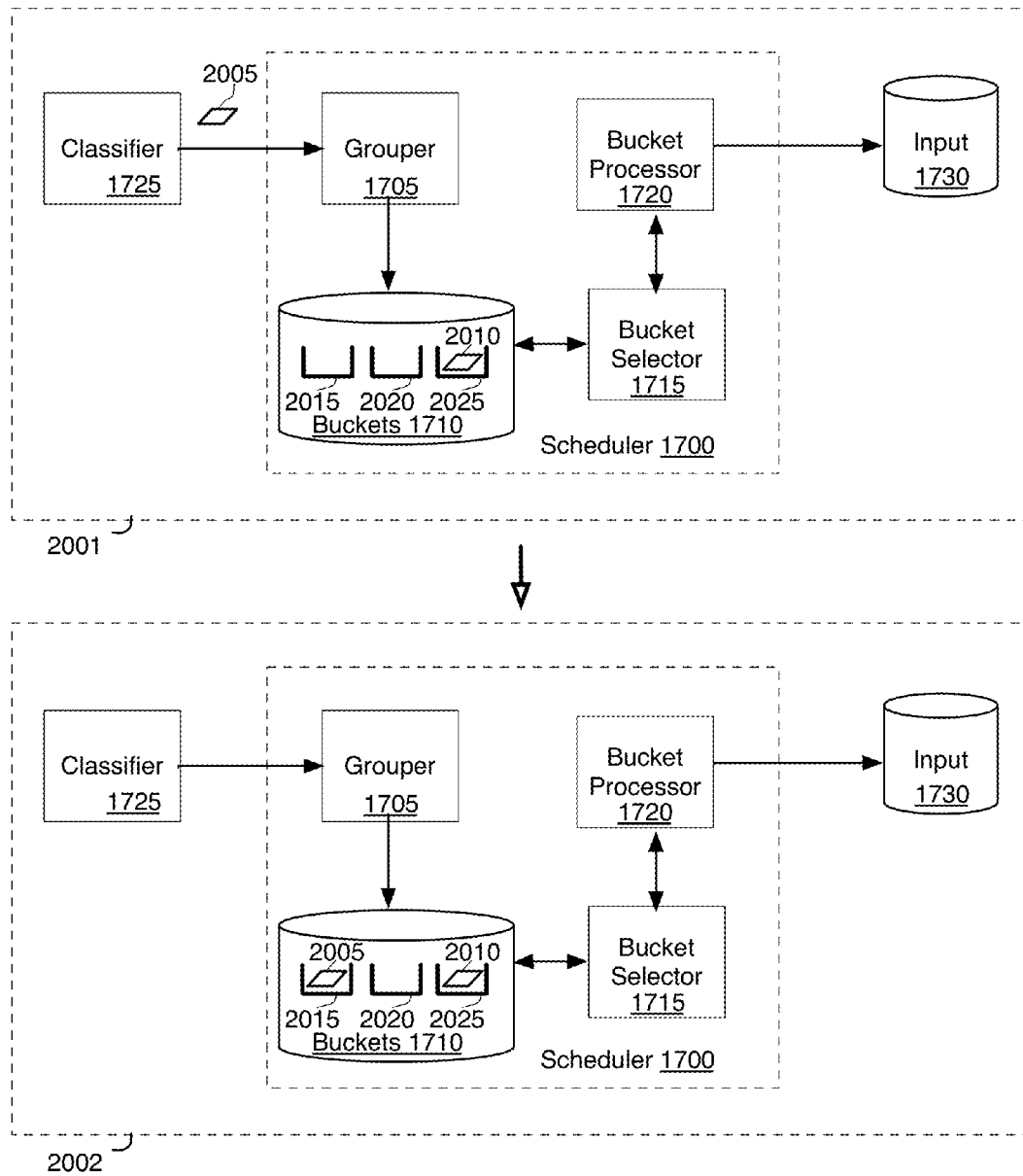
FIGS. 20A-20B illustrate that the scheduler processes input event data for two different input events in three different stages.
Figure 20B:
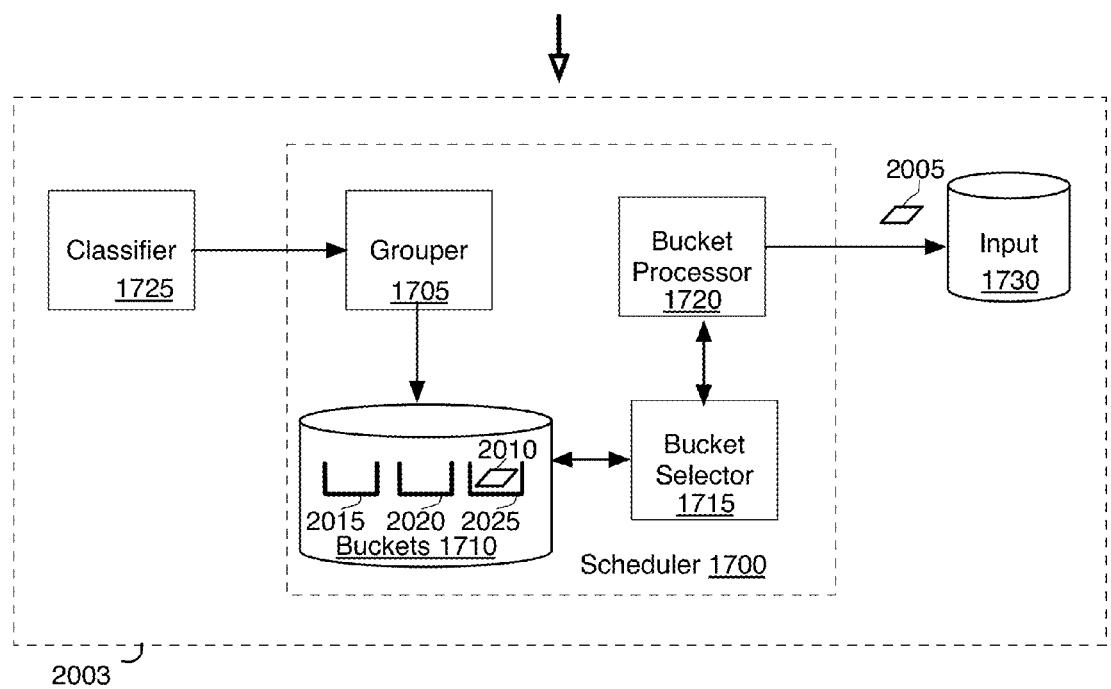

An example operation of the scheduler 1700 employing the priority-based scheduling scheme will now be described by reference to FIGS. 20A-20B. FIGS. 20A-20B illustrate that the scheduler 1700 processes input event data 2005 and 2010 for two different input events in three different stages 2001-2003. This figure also illustrates the classifier 1725 and the input tables 1730.

At stage 2001, the buckets 1710 includes three buckets 2015, 2020, and 2025. In the bucket 2025, the grouper 1705 previously placed the input event data 2010. The input event data 2010 has a priority level that the classifier 1725 assigned to the input event data 2010. The other two buckets 2015 and 2020 are empty. The buckets 2015-2025 are associated with three different LDP sets. The classifier 1725 sends the input event data 2005 that the classifier has assigned a priority level that is higher than the priority level of the input event data 2010. The input event data 2005 also affects the LDPS that is associated with the bucket 2015. The bucket 2025 is designated as the current bucket, from which the bucket processor 1720 is retrieving input event data to update one or more input tables 1730.

At stage 2002, the grouper 1705 places the input event data 2005 in the bucket 2015 because the input event data 2005 affects the same LDPS with which the bucket 2015 is associated. The rules engine (not shown) is still performing table mapping operations on the input tables 1730 which were previously updated by the bucket processor 1720 using the input event data (not shown). Thus, the input event data 2010 has not been taken out of the current bucket 2025 yet.

At stage 2003, the bucket selector 1715 designates the bucket 2015 as the new current bucket, even though the previous current bucket 2025 has not become empty, because the input event data 2005 has a priority level that is higher than the priority level of the input event data 2010 that is in the bucket

2025. The bucket processor 1720 then uses the input event data 2005, ahead of the input event data 2010, to update the input tables 1730.

In the scheduling scheme that is based on critical and non-critical input event data, the event classifier 1725 and the scheduler 1700 of some embodiments operate based on critical input event data and non-critical input event data. Critical input event data is input event data for a critical input event that should immediately update one or more managed switching elements for proper functioning of the network elements. For instance, a chassis (e.g., a host machine) disconnection or connection is a critical event. This is because a chassis may be hosting several managed switching elements. Thus the disconnection or connection of the chassis means deletion or addition of new managed switching elements for which other managed switching elements have to adjust to properly forward data packets. Another example of a critical input event is an event related to creation of the receiving end of a tunnel. The receiving end of a tunnel is critical because when the receiving end of a tunnel is not created, the packets going towards the receiving end will be dropped.

A non-critical input event data is input event data for a non-critical event that is not as important or critical to the proper functioning of the network elements. For instance, events related to testing a newly added node to see whether the node gets all the required (logical) flows before other nodes start sending packets to this node (else the node may drop packets) are non-critical events. Another example of a non-critical input data is an event related to creation of the sending end of a tunnel.

The event classifier 1725 in some embodiments classifies input event data based on whether the input event data is for a critical event or a non-critical event or neither of the two kinds of event. That is, the event classifier 1725 in some embodiments attaches a tag to the input event data to indicate that the input event data is a critical input event data or a non-critical input event data. In some embodiments, the event classifier 1725 attaches no such tag to input event data that is neither a critical input event data nor a non-critical input event data. Such input data may be attached with a tag for the priority-level and/or a tag for a LDPS so that the scheduler 1700 can handle this input event data with other scheduling schemes described above.

The scheduler 1700 in some embodiments immediately uses a critical input event data to modify one or more input tables 1730 when the scheduler 1700 receives the critical input event data. That is, the critical input event data gets ahead of any other input event data. On the other hand, the scheduler 1700 uses a non-critical input event data only when no other input event data held by the scheduler 1700 is critical input event data or input event data that is neither critical input event data nor non-critical input event data. A non-critical input event data is therefore the last input event data of a set of input event data used by the scheduler 1700.

Figure 21A:
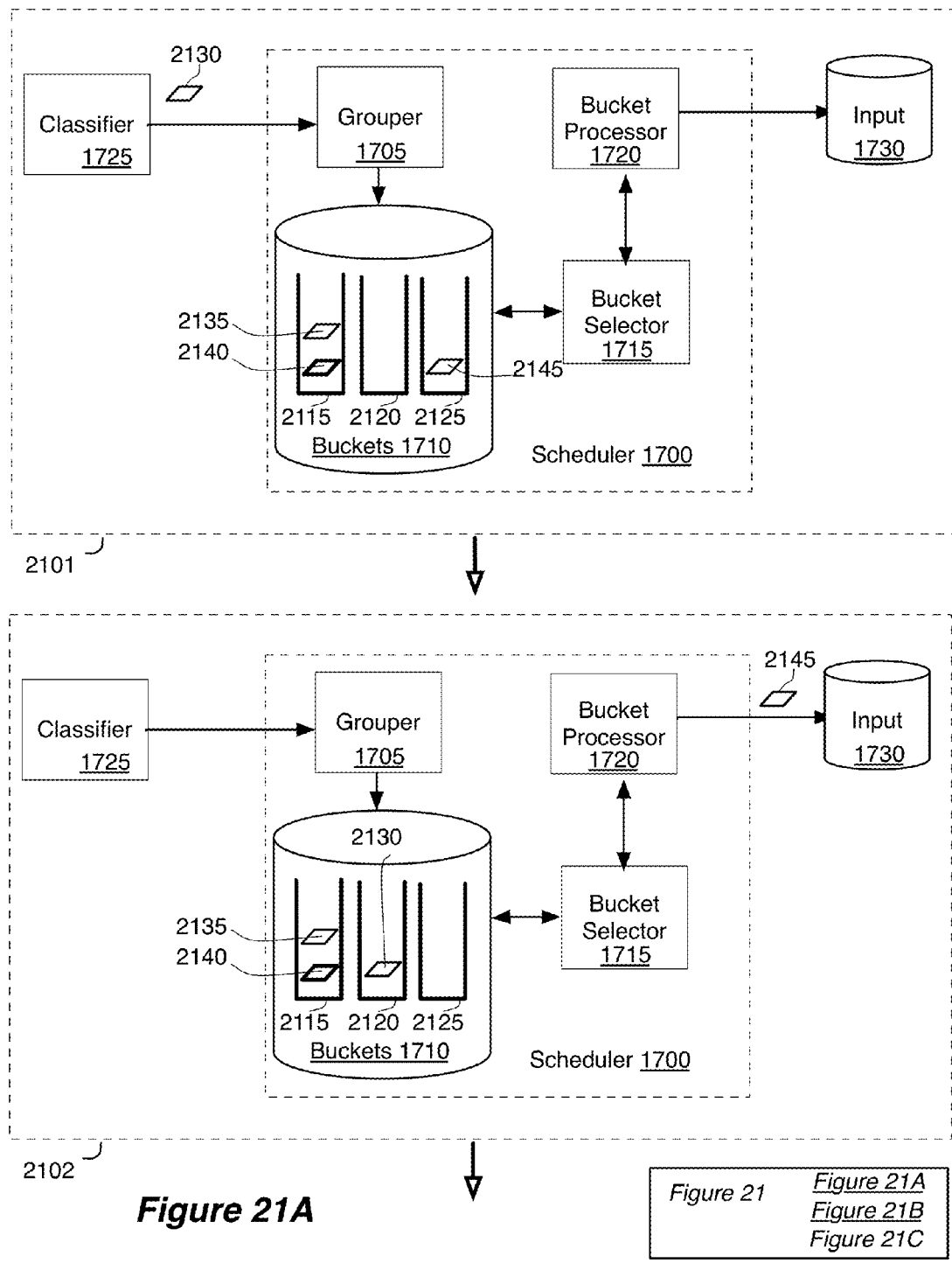
FIGS. 21A-21C illustrate that the scheduler of some embodiments employs several different scheduling schemes including the scheduling scheme based on start and end tags.
Figure 21B:
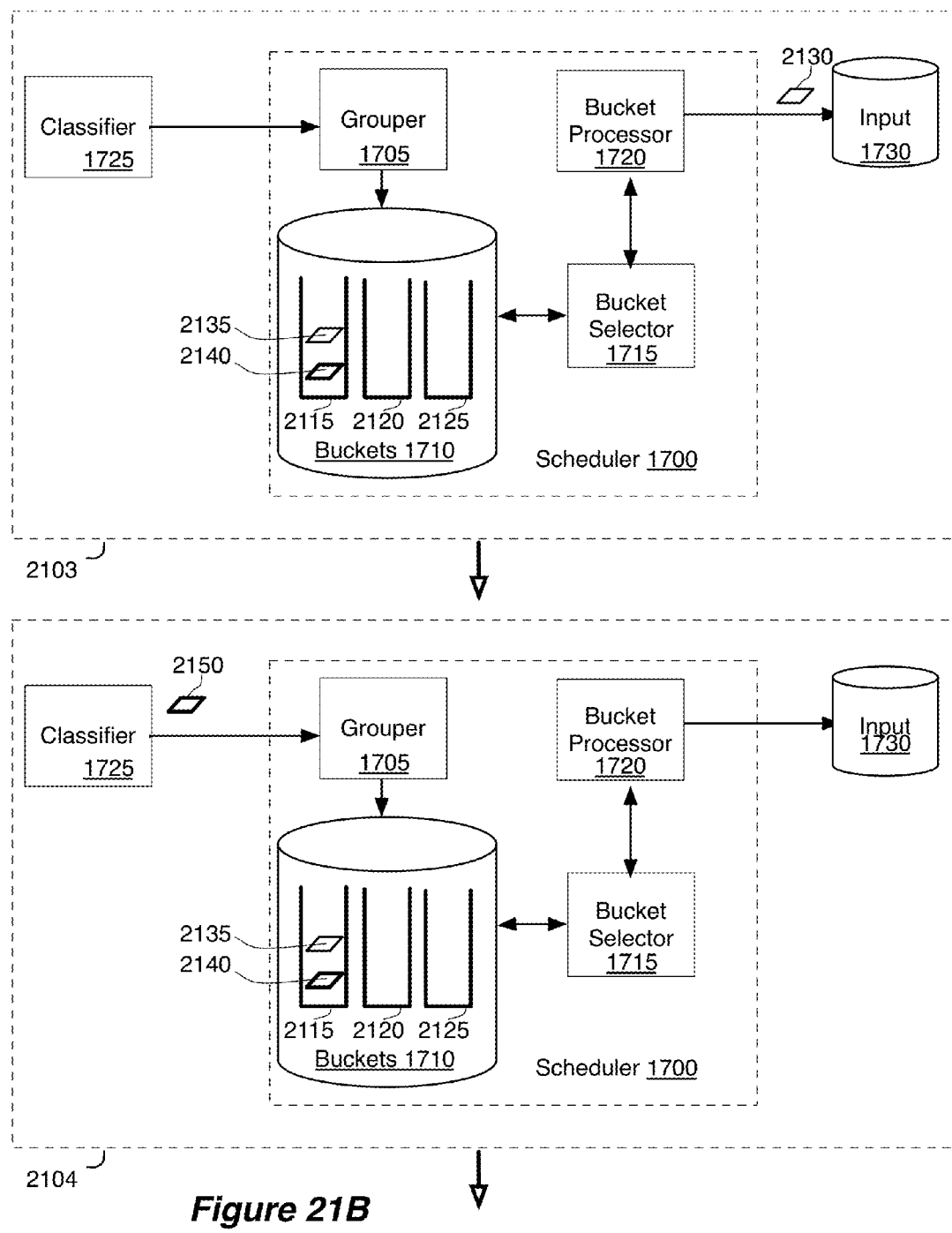
Figure 21C:
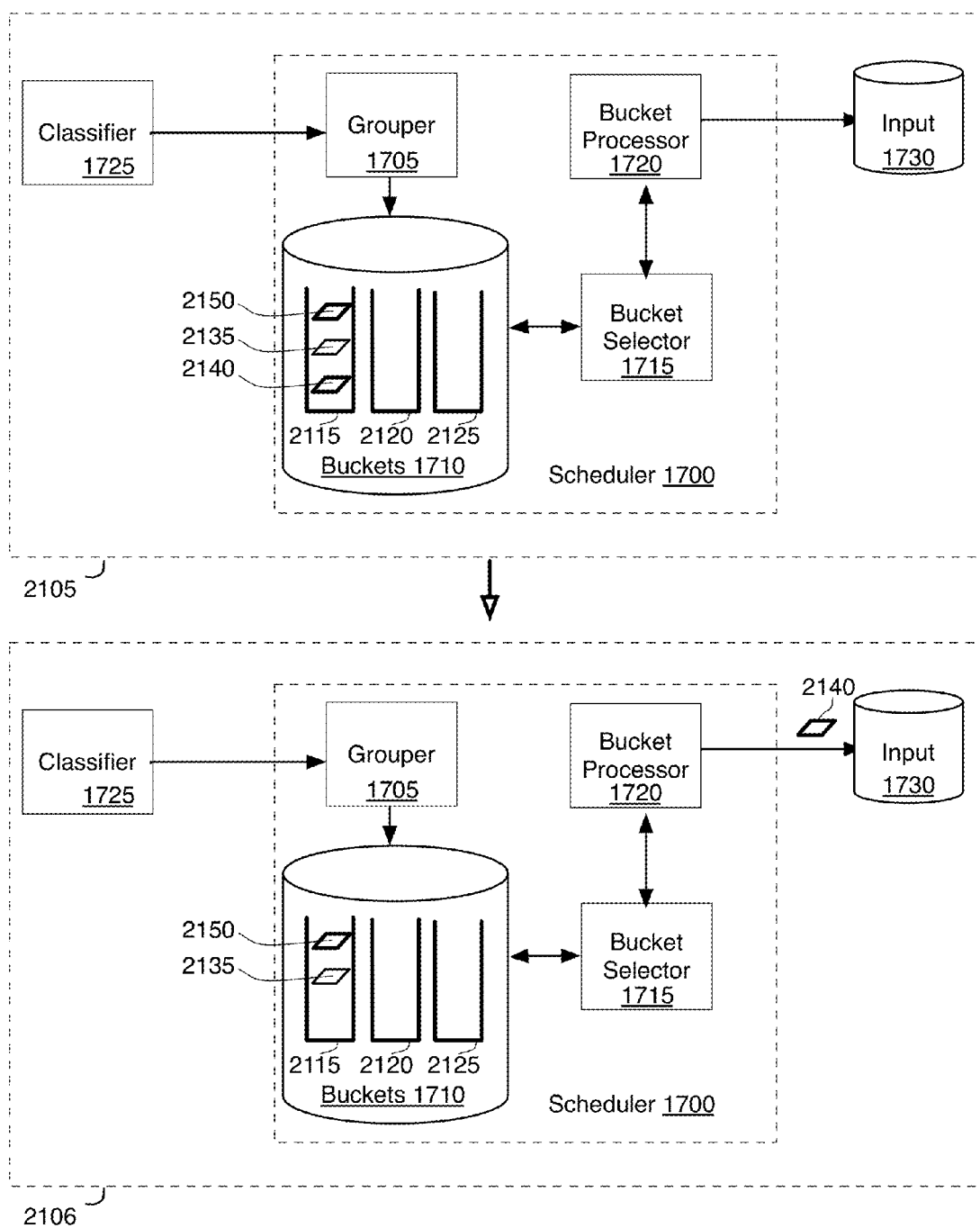

FIGS. 21A-21C illustrate that the scheduler 1700 of some embodiments employs several different scheduling schemes including the scheduling scheme based on start and end tags. FIGS. 21A-21C illustrate that the scheduler 1700 processes several input event data 2130-2150 for several different input events in six different stages 2101-2106. This figure also illustrates the classifier 1725 and the input tables 1730.

In the scheduling scheme based on start and end tags, input event data that the event classifier 1725 receives and classifies may have a start tag or an end tag attached to the input event data. In some embodiments, the start tag indicates that the input event data to which the start tag is attached is the first input event data of a group of input event data. The end tag indicates that the input event data to which the end tag is attached is the last input event data of the group of input event data. In some cases, a group of input event data is for different input events. In other cases, a group of input event data may be for a single input event.

In some embodiments, start tags and end tags are attached to input event data by the origin of the input event. The start tags and end tags are used to indicate that a group of input event data should be processed together and to indicate that a segment of a control data pipeline is completed so that the next segment of the control data pipeline can be performed in a distributed, multi-instance control system of some embodiments. For example, a controller application attaches the start tags and the end tags to the LFP data that the controller application sends to a virtualization application. As another example, a virtualization application of one controller instance attaches these tags when the virtualization application is sending UPCP data for a group of input events to another virtualization application of another controller instance so that the other virtualization application can recognize the end of UPCP data and convert the UPCP data to CPCP data. Furthermore, in some embodiments, an origin of a group of input event data does not send out the group unless the origin has generated the whole group of input event data.

In some embodiments that use start and end tags, the bucket selector 1715 does not designate a particular bucket that contains input event data with a start tag as the current bucket until the grouper 1705 places another input event data with an end tag in the particular bucket. In other words, the bucket processor 1720 does not process a group of input event data until the whole group of input event data is received. In some embodiments, the bucket selector 1715 does not designate the particular bucket even if the bucket has the highest priority level among other buckets that each contain input event data.

An example operation of the scheduler 1700 that uses start and end tags will now be described. At stage 2101, the buckets 1710 includes three buckets 2115, 2120, and 2125 that each is associated with a different LDPS. In the bucket 2125, the grouper 1705 previously placed the input event data 2145. The input event data 2145 has a priority level that the classifier 1725 assigned to the input event data 2145. The bucket 2115 has two input event data 2135 and 2140. The input event data 2135 and 2140 in the bucket 2115 have an assigned priority level that is lower than the priority level assigned to input event data 2145 in the bucket 2125. The input event data 2140 is illustrated as bold parallelogram to indicate that the input event data 2140 has a start tag. That is, the input event data 2140 is the first input event data of a group of input event data. Also in the stage 2101, the classifier 1725 has classified the input event data 2130 and sends the input event data 2130 to the scheduler 1700. The input event data 2130 has an assigned priority level that is lower than the priority level assigned to input event data 2135 and 2140.

At stage 2102, the bucket processor 1720 retrieves the input event data 2145 from the bucket 2125 and updates the input tables 1730 because the bucket 2125 is the current bucket. The grouper 1705 places the input event data 2130 in the bucket 2120 because the event data 2130 affects the LDPS with which the bucket 2120 is associated. The bucket selector 1715 needs to designate a new current bucket because the old current bucket 2125 is now empty. The bucket selector 1715 designates the bucket 2120 as the new current bucket even though the priority level of the input event 2130 in the bucket 2120 is lower than the priority level of the input event data 2135 and 2140 in the bucket 2115. This is because input event data that has an end tag for the group of input event data that includes the input event data 2135 and 2140 has not arrived at the bucket 2115 of the scheduler 1700.

At stage 2103, the bucket processor 1720 retrieves the input event data 2130 from the bucket 2120 and updates the input tables 1730 because the bucket 2120 is the current bucket. At stage 2104, the classifier 1725 has classified the input event data 2150 and sends the input event data 2150 to the scheduler 1700. The input event data 2150, illustrated as a bold parallelogram, has an end tag to indicate that the input event data 2150 is the last input event data of the group of input event data that include the input event data 2135 and 2140. The bucket selector 1715 does not designate the bucket 2115 as the current bucket even though the bucket 2115 is the only non-empty bucket of the buckets 1710 because the input event data 2135 and 2140 do not make up a complete group of input event data.

At stage 2105, the grouper 1705 places the input event data 2150 in the bucket 2115 because the input event data 2150 affects the LDPS with which the bucket 2115 is associated. The bucket selector 1715 designates the bucket 2115 as the new current bucket because the bucket 1715 now has a complete group of input event data that consist of the input event data 2135, 2140, and 2150. At stage 2106, the bucket processor 1720 retrieves the input event data 2140 because the input event data 2140 is the oldest input event data in the current bucket. The bucket processor 1720 uses the input event data 2140 to update the input tables 1730.

It is to be noted that the six different stages 2101-2106 in FIGS. 21A-21C, as well as any group of stages in other figures of this application, do not necessarily represent regular intervals of time. That is, for example, the length of time elapsed between a pair of consecutive stages is not necessarily the same as the length of time elapsed between another pair of consecutive stages.

Figure 22:
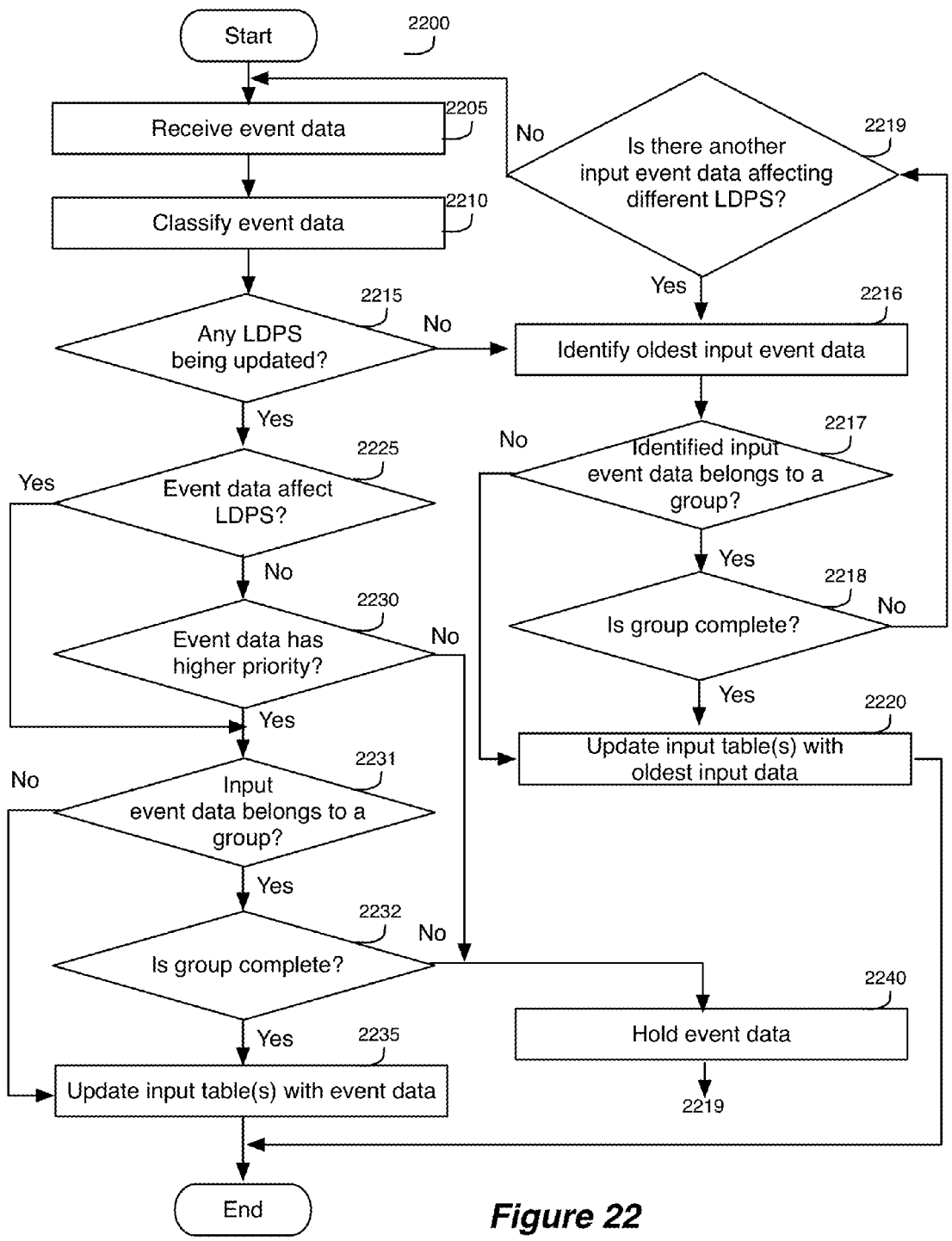
FIG. 22 conceptually illustrates a process that the control application of some embodiments performs to classify input event data and update input tables based on the input event data.

FIG. 22 conceptually illustrates a process 2200 that the control application of some embodiments performs to classify input event data and update input tables based on the input event data. Specifically, this figure illustrates that the process 2200 in some embodiments employs scheduling schemes based on LDP sets and priority levels assigned to event input data. The process 2200 in some embodiments is performed by an event classifier (e.g., the event classifier 1725) and a scheduler (e.g., the scheduler 1700). As shown in FIG. 22, the process 2200 initially receives (at 2205) data regarding an input event.

At 2210, the process 2200 classifies the received event data. In some embodiments, the process 2200 classifies the received event data based on a LDPS that the received event data affects. As mentioned above, input event data affects a LDPS when the input event data is about a change in the logical switch specified by the LDPS or about a change at one or more managed switching elements that implement the LDPS. Also, input event data affects a LDPS when the input event data is for defining or modifying the LDPS. In addition, the process 2200 in some embodiments assigns a priority level to the received event data.

Next, the process 2200 determines (at 2215) whether a LDPS is being updated. In some embodiments, the process 2200 inspects the rules engine to find out whether a LDPS is being updated by the rules engine. When the process 2200 determines (at 2215) that a LDPS is not being updated (i.e., when the process determines that the rules engine is not currently processing any input tables), the process 2200 identifies (at 2216) the oldest input event data. When there is no other input event data held, the process 2200 identifies the received input event data as the oldest input event data.

The process 2200 then determines (2217) whether the identified oldest input event data belongs to a group of input event data (i.e., whether the identified oldest input event data is in a batch of input event data that should be processed together to improve efficiency). The process 2200 in some embodiments determines that the identified oldest input event data belongs to a group of input event data when the identified oldest input event data has a start tag (or, a barrier). The process 2200 determines that the identified oldest input event data does not belong to a group of input event data when the identified oldest input event data does not have a start tag. When the process 2200 determines (2217) that the identified oldest input event data does not belong to a group of input event data, the process 2200 proceeds to 2220 to update the input tables with the identified oldest input event data.

When the process 2200 determines (2217) that the identified oldest input event data belongs to a group of event data, the process 2200 determines (2218) whether the group of input event data to which the identified oldest input event data belongs is a complete group. In some embodiments, the process 2200 determines (at 2218) that the group is complete when there is a particular input event data that affects the same LDPS that the identified oldest input event data affects and that particular input event data has an end tag.

When the process 2200 determines (at 2218) that the group of input event data to which the identified oldest input event data belongs is a complete group, the process 2200 updates (at 2220) the input tables with the identified oldest input event data. The process 2200 then ends. When the process 2200 determines (at 2218) that the group of input event data to which the identified oldest input event data belongs is not a complete group, the process 2200 proceeds to 2219 to determine whether there is another input event data that affects a LDPS different than the LDPS that the identified oldest input event data affects.

When the process determines (at 2219) that there is no such other input event data, the process 2200 loops back to 2205 to receive another input event data. When the process determines (at 2219) determines (at 2219) that there is such an input event data, the process 2200 loops back to 2216 to identify the oldest input event data among other input event data that do not affect the LDPS(s) that any of the previously identified oldest input event data affects.

When the process 2200 determines (at 2215) that a LDPS is currently being updated, the process 2200 determines (at 2225) whether the received input event data affects the LDPS that is being updated. In some embodiments, the input event data includes an identifier for a LDPS that the input event data affects. The process 2200 uses this identifier to determine whether the input event data affects the LDPS that is being updated.

When the process 2200 determines (at 2225) that the received input event data affects the LDPS that is being updated, the process 2200 proceeds to 2231, which will be described further below. When the process 2200 determines (at 2225) that the received input event data does not affect the LDPS that is being updated, the process 2200 in some embodiments determines (at 2230) whether the received input event data has a priority level that is higher than the priority level that was assigned to input event data that is being used to update the LDPS.

When the process 2200 determines (at 2230) that the priority level of the received input event data is higher, the processor proceeds to 2231, which will be described further below. Otherwise, the process 2200 holds (at 2240) the received input event data. That is, the process does not update the input tables based on the received input event data. As mentioned above, the process 2200 later uses the input event data that is held when the rules engine of the control application is done with updating the LDPS that is currently being updated.

At 2231, the process 2200 determines whether the received input event data belongs to a group of input event data. In some embodiments, the process 2200 determines that the received input event data belongs to a group of input event data when the received input event data has a start tag or an end tag. When the process 2200 determines (at 2231) that the received input event data does not belong to a group of input event data, the process 2200 proceeds to 2235, which will be described further below. Otherwise, the process 2200 proceeds to 2232 to determine whether the group to which the received input event data belongs is a complete group. The process 2200 in some embodiments determines that the group is complete when the received input event data has an end tag.

When the process 2200 determines (at 2232) that the group of input event data to which the received input event data belongs is a complete group, the process 2200 proceeds to 2235. When the process 2200 determines (at 2232) that the group of input event data to which the received input event data belongs is not a complete group, the process 2200 proceeds to 2240 to hold the received input event data.

After the process 2200 holds (at 2240) the received input event data, the process 2200 goes to 2219 to determine whether there is another input event data held that is held and affects a LDPS different than the LDPS being updated. When the process 2200 determines (at 2219) that there is no such input event data, the process 2200 loops back to 2205 to receive another input event data. When the process 2200 determines (at 2219) that three is such input event data, the process 2200 proceeds to 2216 to identify the oldest input event data among other input event data that do not affect the LDPS being updated.

At 2235, the process updates the input tables with the received input event data. When the received input event data has an end tag, the process 2200 in some embodiments uses the group of input event data to which the received input event data with an end tag belongs in order to update input tables.

By updating the input tables based on the input event data only when the input event data affects the LDPS that is being updated and by holding the input event data otherwise, the process 2200 effectively aggregates the input event data based on the LDPS. That is, the process 2200 aggregates all input event data for a LDPS that the process 2200 receives while the LDPS is being updated so that all the input event data for the LDPS are processed together by the rules engine of the control application.

Figure 23:
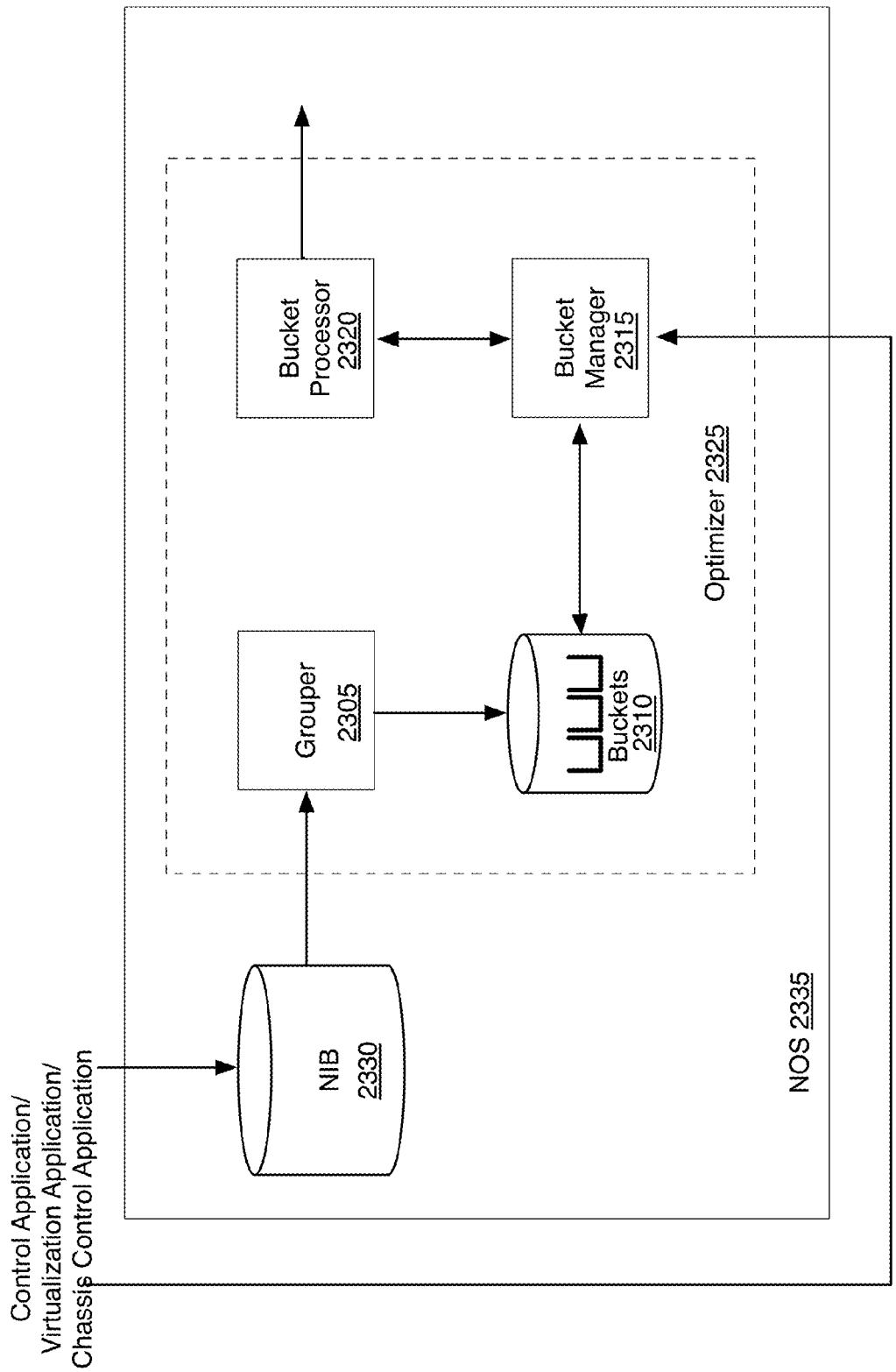
FIG. 23 illustrates a scheduler of a NOS in some embodiments.

FIG. 23 conceptually illustrates an optimizer 2325 of a NOS in some embodiments. Specifically, this figure illustrates that the optimizer 2325 of a NOS uses buckets to determine whether to send out data tuples to the managed switching elements or other controllers. FIG. 23 illustrates that a NOS 2335 includes a NIB 2330 and the optimizer 2325.

The NOS 2335 is similar to the NOS 1465, the NOS 1565, and the NOS 1667 in that the NOS 2335 propagates NIB data tuples generated by a control application (e.g., the control application 1400), a control application (e.g., the control application 1500), or a chassis control application (e.g., the chassis control application 1600) to the managed switching elements. The NIB 2330 of the NOS 2335 is also similar to the NIB 1360, the NIB 1460, the NIB 1560, and the NIB 1660. Moreover, in some embodiments the optimizer 2325 implements the optimizers 1368, 1490, 1590, and 1668 described above by reference to FIGS. 13-16.

The optimizer 2325 includes a grouper 2305, buckets 2310, a bucket manager 2315, and a bucket processor 2320. The buckets 2310 is conceptual groupings of data tuples that the optimizer 2325 receives or retrieves from the NIB 2330. In some embodiments, a bucket is associated with a LDPS. Whenever the optimizer 2325 receives a set of data tuples that are updated in the NIB 2330 as a result of updating a particular LDPS by the control application or the virtualization application, the grouper 2305 places the data tuples into a bucket that is associated with the particular LDPS. When there is no bucket to place the data tuples, the grouper 2305 creates a bucket and associates the bucket with the particular LDPS.

The bucket manager 2315 selects a bucket and directs the bucket processor 2320 to notify other modules (not shown) of the NOS 2335 to send out the data tuples in the selected bucket to the managed switching elements or to other controller instances. That is, the bucket manager 2315 determines which data tuples to send out and when and where to send out the data tuples. In some embodiments, the NOS 2335 directs the bucket manager 2315. In other embodiments, the control application, the virtual application, or the chassis control application can also direct the bucket manager 2315 by sending commands to the bucket manager 2315.

The bucket manager 2315 of different embodiments selects a bucket differently. In some embodiments, the bucket manager 2315 selects a bucket that includes data tuples that the optimizer 2325 received earliest. In other embodiments, the bucket manager 2315 selects a bucket according to the command received from the control application, the virtualization application, or the chassis control application.

The bucket manager 2315 also determines where to send the data tuples. For instance, when the NIB 2330 is to be replicated with another NIB of another controller instance, the bucket manager 2315 determines that the data tuples is to be sent to the other controller instance. When the data tuples are for implementing a LDPS over a set of managed switching elements, the bucket manager 2315 determines that the data tuples is to be sent to those managed switching elements. The bucket manager 2315 directs the bucket processor 2320 to communicate with other appropriate modules (not shown) of the NOS 2335 to send out the data tuples to the determined destinations.

Figure 24:
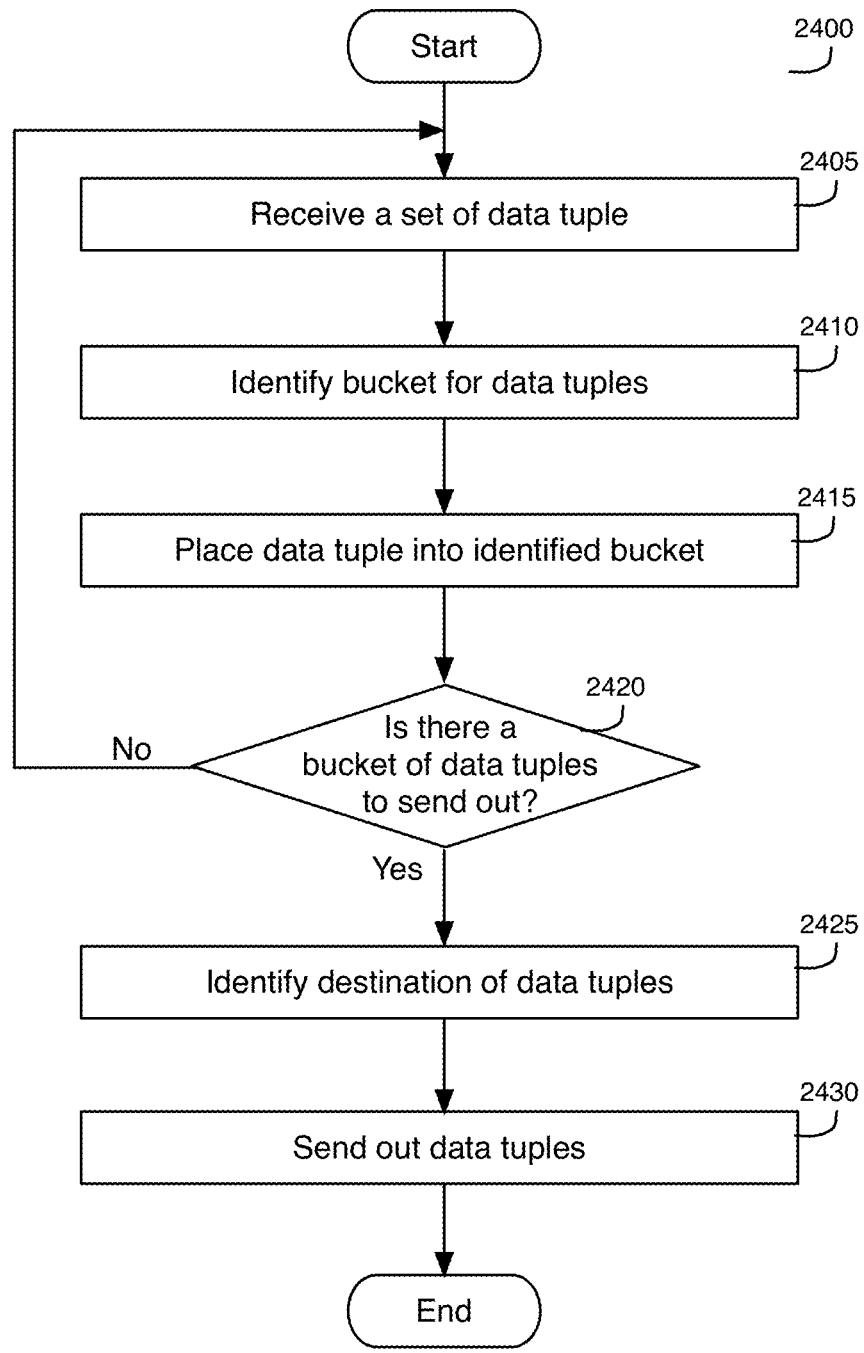
FIG. 24 illustrates a process that a NOS of some embodiments uses to propagate a set of data tuples to the managed switching elements or other controller instances.

FIG. 24 conceptually illustrates a process 2400 that a NOS of some embodiments uses to propagate a set of data tuples to the managed switching elements or other controller instances. The process 2400 is performed by an optimizer (e.g., the optimizer 2325 described above by reference to FIG. 23) of the NOS. As shown in FIG. 24, the process initially receives (at 2405) a set of data tuples from a NIB of the NOS. This set of data tuples is updated in the NIB as a result of updating a LDPS by a control application, a virtualization application, or a chassis control application that execute on top of the NOS.

Next, the process 2400 identifies (at 2410) a group for the set of data tuples. In some embodiments, each updated data tuple has a tag or a field that includes an identifier for a LDPS. The tag or field indicates that the data tuple is updated in the NIB as a result of updating the LDPS. The process 2400 uses this tag or a field to identify a bucket in which to place the received set of data tuples. The process 2400 then places (at 2415) the received data tuples in the identified bucket.

The process 2400 then determines (at 2420) whether there is a bucket that includes data tuples to send out. The process 2400 in some embodiments determines that there is a bucket of data tuples to send out when the process 2400 receives from the control application, the virtualization application, or the chassis control application a command that directs the process to send out a bucket of data tuples that are updated as a result of updating a particular LDPS. In other embodiments, the process 2400 determines that there is a bucket of data tuples to send out when the bucket identified at 2410 now includes more than a certain number of data tuples by adding the received set of data tuples. That is, the process 2400 in these embodiments determines that the identified bucket is the bucket of data tuples to send out.

When the process 2400 determines (at 2420) that there is not a bucket of data tuples to send out, the process loops back to 2405 to receive another set of data tuples. When the process 2400 determines (at 2420) that there is a bucket of data tuples to send out, the process 2400 identifies (at 2425) the destination of the data tuples. In some embodiments, the destination depends on the role the NOS. For instance, when the NOS is the master, the process 2400 identifies the set of managed switching elements for which the NOS is the master as the destination. When the NOS is not a master, the process 2400 identifies another controller instance as the destination.

The process 2400 then sends (at 2430) the data tuples to the destination. In some embodiments, the process 2400 notifies the other appropriate modules of the NOS so that these modules send the data tuples to the destination. The process 2400 then ends.

6. Scheduling in Integrated Applications

Figure 25:
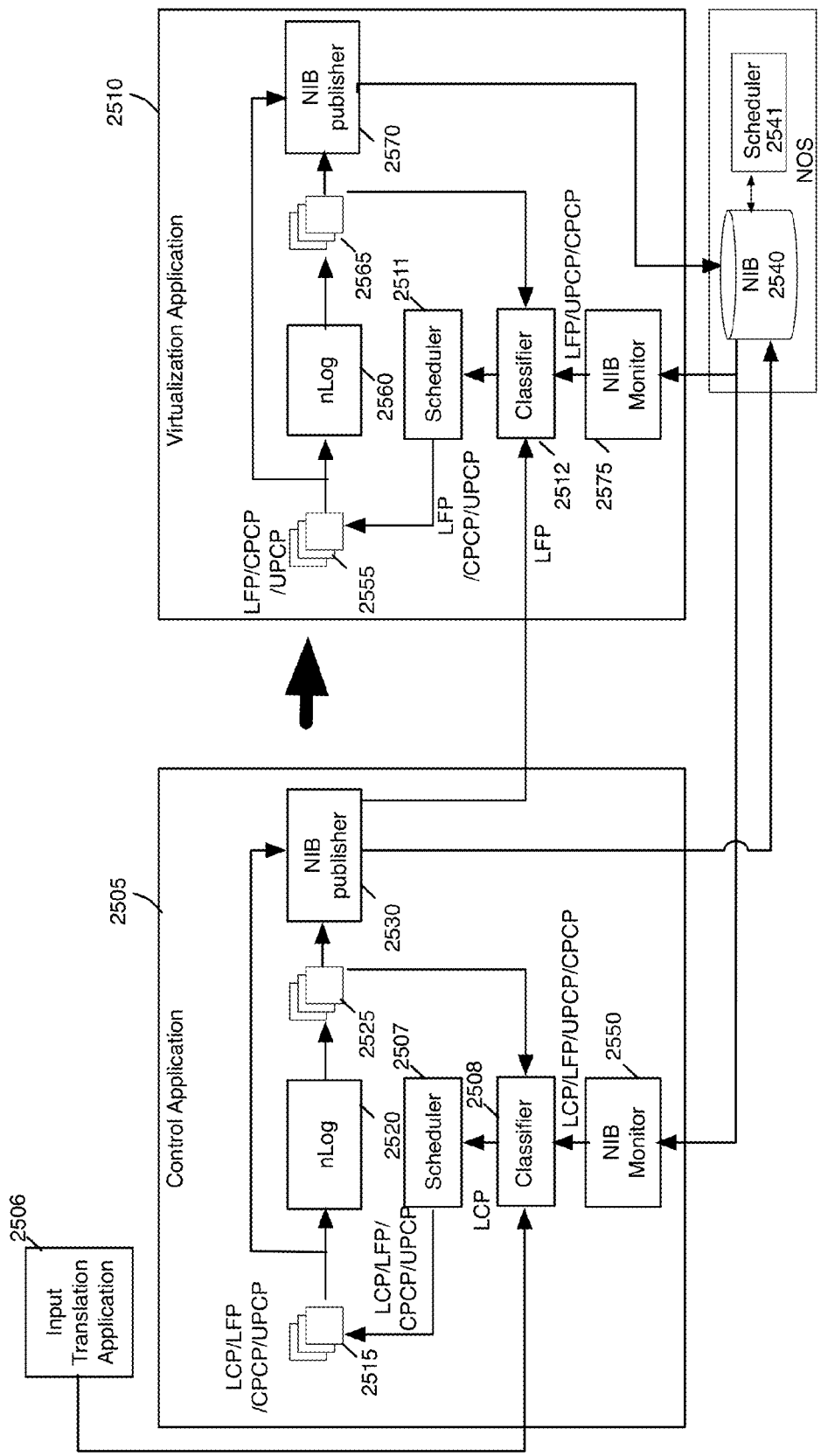
FIG. 25 illustrates the control and virtualization applications of some embodiments.

FIG. 25 illustrates a simplified view of the operations of the control and virtualization applications of some embodiments of the invention. Specifically, this figure illustrates the table mapping operations of the control application 2505 and the virtualization application 2510. As shown, the control application's input tables 2515 store LCP data, LFP data, UPCP data and CPCP data, as the collection of all these data along with data in the constant and function tables (not shown) is used by the control application's n Log engine 2520 in some embodiments to generate LFP data from the input LCP data.

This figure further shows the NIB publisher 2530 receiving some or all of the input table records and publishing these records to the NIB 2540. As further shown, the NIB monitor 2550 receives NIB change notifications (e.g., notifications of managed switching element changes detected by the NOS or notification of NIB changes pushed by the other controller instances) in some embodiments and sends LCP, LFP, UPCP, or CPCP data to the classifier 2508 in response to NIB modification notifications.

This figure also shows that an input translation application 2506 receives from the user the LCP data and sends the data to the classifier 2508. The classifier 2508 receives LCP, LFP, or CPCP data from the user via the input translation application 2506, the NIB monitor 2550, or output tables 2525 and classifies the received data. The classifier 2508 then sends the data to the scheduler 2507 which aggregates the data using one or more of scheduling schemes described above. The scheduler 2507 writes the aggregated data to the input tables 2515 of the control application so that the n Log engine 2520 performs the mapping operations based on the aggregated data.

FIG. 25 also illustrates the table mapping operations of the virtualization application 2510. As shown, the virtualization application's input tables 2555 store LFP data, UPCP data, and CPCP data, as the collection of all these data along with data in the constant and function tables (not shown) is used by the virtualization application's n Log engine 2560 in some embodiments to generate UPCP data and/or CPCP data from the input LFP data.

This figure further shows the NIB publisher 2570 receiving some or all of the input table records and publishing these records to the NIB 2540. From the NIB 2540, these records are propagated to the managed switching elements. When propagating these records to the managed switching elements, the optimizer 2541 groups the records based on LDP sets to propagate the records in each group together. As further shown, the NIB monitor 2575 receives NIB change notifications in some embodiments and sends LFP, UPCP, and CPCP data in response to such notifications.

This figure also shows that the classifier 2512 receives LFP, UPCP, or CPCP data from the NIB monitor 2575, or output tables 2565 and then classifies the received data. The classifier 2512 then sends the data to the scheduler 2511 which aggregates the data using on one or more of the scheduling schemes described above. The scheduler 2511 writes the aggregated data to the input tables 2555 of the virtualization application so that the n Log engine 2560 performs the mapping operations based on the aggregated data.

As mentioned above, some of the logical or physical data (including UPCP data) that a NIB monitor pushes to the classifier of the control or virtualization application relates to data that is generated by other controller instances and passed to the NIB monitor's particular NIB (e.g., through the secondary storage layer). Also as mentioned above, the control application 2505 and the virtualization application 2510 are two separate applications that operate on the same machine or different machines in some embodiments. Other embodiments, however, implement these two applications as two modules of one integrated application, with the control application module 2505 generating LDPS in the LFP and the virtualization application generating physical datapath sets in the physical control plane or in the UPCP.

Figure 26:
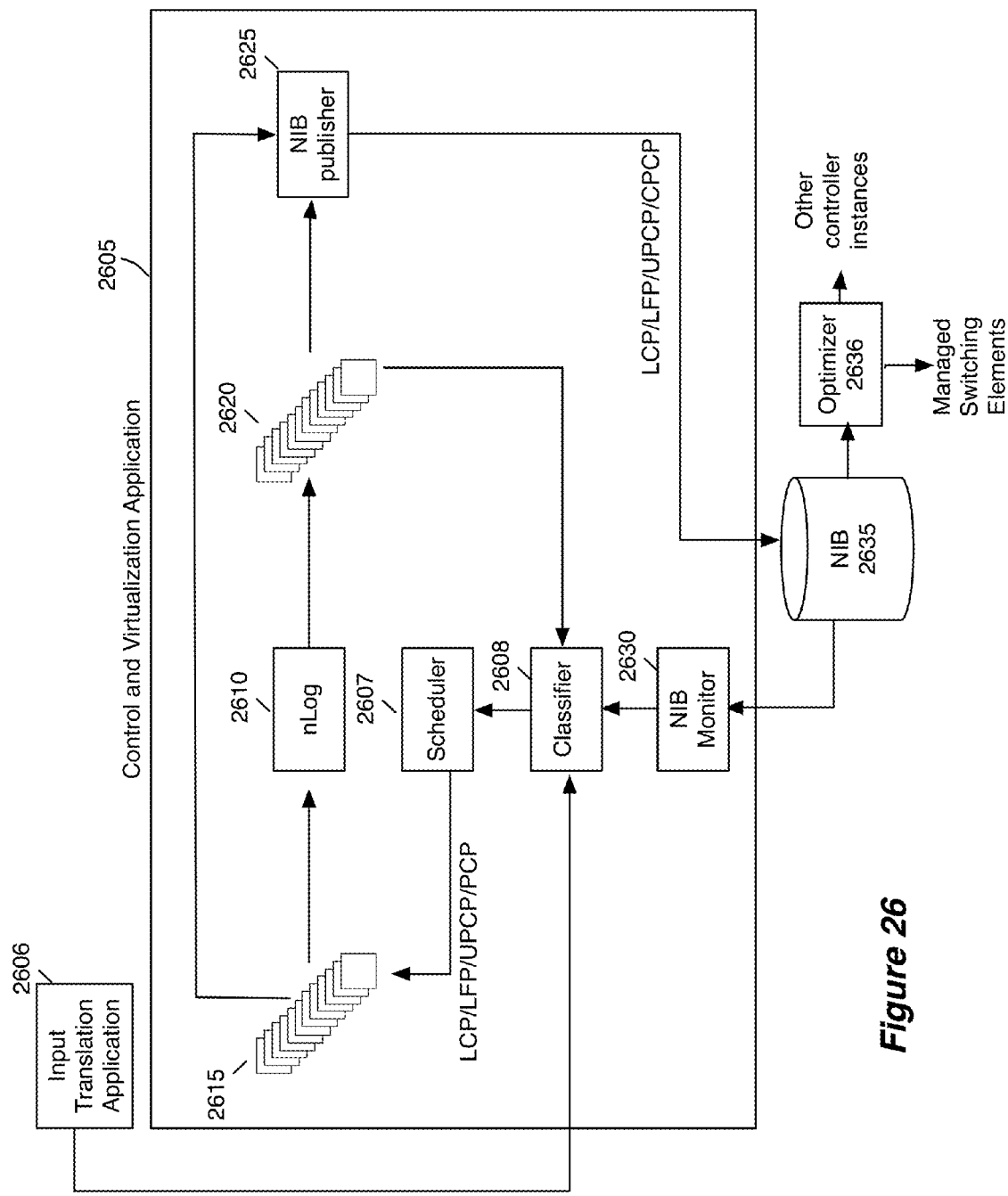
FIG. 26 illustrates an integrated control/virtualization application of some embodiments.

Still other embodiments integrate the control and virtualization operations of these two applications within one integrated application, without separating these operations into two separate modules. FIG. 26 illustrates an example of such an integrated application 2605. This application 2605 uses an n Log table mapping engine 2610 to map data from an input set of tables 2615 to an output set of tables 2620, which like the above described embodiments by reference to FIGS. 14, 15, and 25, may include one or more tables in the input set of tables. The input set of tables in this integrated application may include LCP data that need to be mapped to LFP data, or it may include LFP data that need to be mapped to CPCP or UPCP data.

In this integrated control and virtualization application 2605, a NIB publisher 2625 publishes input table records and output table records to the NIB 2635. From the NIB 2635, these records are propagated to the managed switching elements. When propagating these records to the managed switching elements, the optimizer 2636 groups the records based on LDP sets to propagate the records in each group together.

NIB monitor 2630 receives notification of changes from the NIB 2635 (e.g., managed switching element changes detected by the NOS or NIB changes pushed by the other controller instances), and for some notifications (e.g., those relating to the LDPS' for which the application is the master) pushes changes to the classifier 2608. The classifier 2608 classifies the changes like the classifier 2508 or 25011 classifies input events. The scheduler 2607 aggregates the changes based on the classification by using one or more of the scheduling schemes described above and pushes the changes to the input tables 2615.

7. Scheduling in NOS

Figure 27:
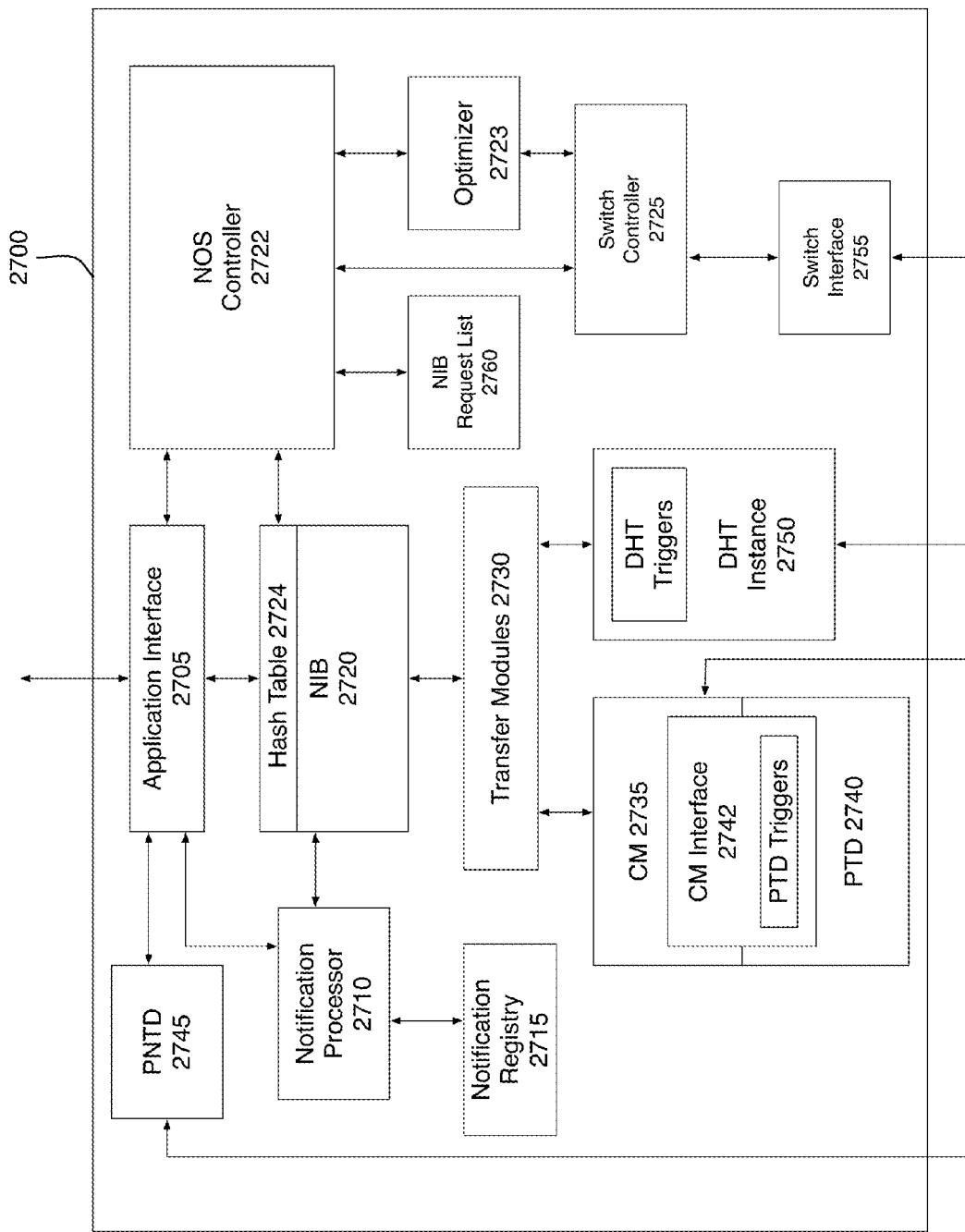
FIG. 27 conceptually illustrates a single NOS instance of some embodiments.

FIG. 27 conceptually illustrates a single NOS instance 2700 of some embodiments. This instance can be used as a single NOS instance in the distributed control system 1000 that employs multiple NOS instances in multiple controller instances. Alternatively, with slight modifications, this instance can be used as a single NOS instance in a centralized control system that utilizes only a single controller instance with a single NOS instance. The NOS instance 2700 supports a wide range of control scenarios. For instance, in some embodiments, this instance allows an application running on top of it (e.g., a control or virtualization application) to customize the NIB data model and have control over the placement and consistency of each element of the network infrastructure.

Also, in some embodiments, the NOS instance 2700 provides multiple methods for applications to gain access to network entities. For instance, in some embodiments, it maintains an index of all of its entities based on the entity identifier, allowing for direct querying of a specific entity. The NOS instance of some embodiments also supports registration for notifications on state changes or the addition/deletion of an entity. In some embodiments, the applications may further extend the querying capabilities by listening for notifications of entity arrival and maintaining their own indices. In some embodiments, the control for a typical application is fairly straightforward. It can register to be notified on some state change (e.g., the addition of new switches and ports), and once notified, it can manipulate the network state by modifying the NIB data tuple(s) (e.g., key-value pairs) of the affected entities.

As shown in FIG. 27, the NOS 2700 includes an application interface 2705, a notification processor 2710, a notification registry 2715, a NIB 2720, a hash table 2724, a NOS controller 2722, a switch controller 2725, a optimizer 2723, transfer modules 2730, a CM 2735, a PTD 2740, a CM interface 2742, a PNTD 2745, a DHT instance 2750, switch interface 2755, and NIB request list 2760.

The application interface 2705 is a conceptual illustration of the interface between the NOS and the applications (e.g., control and virtualization applications) that can run on top of the NOS. The interface 2705 includes the NOS APIs that the applications (e.g., control or virtualization application) running on top of the NOS use to communicate with the NOS. In some embodiments, these communications include registrations for receiving notifications of certain changes in the NIB 2720, queries to read certain NIB attributes, queries to write to certain NIB attributes, requests to create or destroy NIB entities, instructions for configuring the NOS instance (e.g., instructions regarding how to import or export state information), requests to import or export entities on demand, and requests to synchronize NIB entities with switching elements or other NOS instances.

The switch interface 2755 is a conceptual illustration of the interface between the NOS and the switching elements that run below the NOS instance 2700. In some embodiments, the NOS accesses the switching elements by using the OpenFlow or OVS APIs provided by the switching elements. Accordingly, in some embodiments, the switch interface 2755 includes the set of APIs provided by the OpenFlow and/or OVS protocols.

The NIB 2720 is the data storage structure that stores data regarding the switching elements that the NOS instance 2700 is controlling. In some embodiments, the NIB just stores data attributes regarding these switching elements, while in other embodiments, the NIB also stores data attributes for the LDP sets defined by the user. Also, in some embodiments, the NIB is a hierarchical object data structure (such as the ones described above) in which some or all of the NIB objects not only include data attributes (e.g., data tuples regarding the switching elements) but also include functions to perform certain functionalities of the NIB. For these embodiments, one or more of the NOS functionalities that are shown in modular form in FIG. 27 are conceptual representations of the functions performed by the NIB objects.

The hash table 2724 is a table that stores a hash value for each NIB object and a reference to each NIB object. Specifically, each time an object is created in the NIB, the object's identifier is hashed to generate a hash value, and this hash value is stored in the hash table along with a reference (e.g., a pointer) to the object. The hash table 2724 is used to quickly access an object in the NIB each time a data attribute or function of the object is requested (e.g., by an application or secondary storage). Upon receiving such requests, the NIB hashes the identifier of the requested object to generate a hash value, and then uses that hash value to quickly identify in the hash table a reference to the object in the NIB. In some cases, a request for a NIB object might not provide the identity of the NIB object but instead might be based on non-entity name keys (e.g., might be a request for all entities that have a particular port). For these cases, the NIB includes an iterator that iterates through all entities looking for the key specified in the request.

The notification processor 2710 interacts with the application interface 2705 to receive NIB notification registrations from applications running on top of the NOS and other modules of the NOS (e.g., such as an export module within the transfer modules 2730). Upon receiving these registrations, the notification processor 2710 stores notification requests in the notification registry 2715 that identifies each requesting party and the NIB data tuple(s) that the requesting party is tracking As mentioned above, the system of some embodiments embeds in each NIB object a function for handling notification registrations for changes in the value(s) of that NIB object. For these embodiments, the notification processor 2710 is a conceptual illustration of the amalgamation of all the NIB object notification functions. Other embodiments, however, do not provide notification functions in some or all of the NIB objects. The NOS of some of these embodiments therefore provides an actual separate module to serve as the notification processor for some or all of the NIB objects.

When some or all of the NIB objects have notification functions in some embodiments, the notification registry for such NIB objects are typically kept with the objects themselves. Accordingly, for some of these embodiments, the notification registry 2715 is a conceptual illustration of the amalgamation of the different sets of registered requestors maintained by the NIB objects. Alternatively, when some or all of the NIB objects do not have notification functions and notification services are needed for these objects, some embodiments use a separate notification registry 2715 for the notification processor 2710 to use to keep track of the notification requests for such objects.

The notification process serves as only one manner for accessing the data in the NIB. Other mechanisms are needed in some embodiments for accessing the NIB. For instance, the secondary storage structures (e.g., the PTD 2740 and the DHT instance 2750) also need to be able to import data from and export data to the NIB. For these operations, the NOS 2700 uses the transfer modules 2730 to exchange data between the NIB and the secondary storage structure. In some embodiments, the transfer modules 2730 includes a scheduler, which is similar to the scheduler 2325 described above by reference to FIG. 23. That is, this scheduler aggregates data based on LDP sets so that the NIB can send data that is related to a single LDPS at a time to the secondary storage structure. This scheduler is also used by the CM 2735 when the CM 2735 coordinates data exchange with other NOS instances.

In some embodiments, the transfer modules include a NIB import module and a NIB export module. These two modules in some embodiments are configured through the NOS controller 2722, which processes configuration instructions that it receives through the interfaces 2705 from the applications above the NOS. The NOS controller 2722 also performs several other operations. As with the notification processor, some or all of the operations performed by the NOS controller are performed by one or more functions of NIB objects, in some of the embodiments that implement one or more of the NOS 2700 operations through the NIB object functions. Accordingly, for these embodiments, the NOS controller 2722 is a conceptual amalgamation of several NOS operations, some of which are performed by NIB object functions.

Other than configuration requests, the NOS controller 2722 of some embodiments handles some of the other types of requests directed at the NOS instance 2700. Examples of such other requests include queries to read certain NIB attributes, queries to write to certain NIB attributes, requests to create or destroy NIB entities, requests to import or export entities on demand, and requests to synchronize NIB entities with switching elements or other NOS instances.

In some embodiments, the NOS controller stores requests to change the NIB on the NIB request list 2760. Like the notification registry, the NIB request list in some embodiments is a conceptual representation of a set of distributed requests that are stored in a distributed manner with the objects in the NIB. Alternatively, for embodiments in which some or all of the NIB objects do not maintain their modification requests locally, the request list is a separate list maintained by the NOS 2700. The system of some of these embodiments that maintains the request list as a separate list, stores this list in the NIB in order to allow for its replication across the different controller instances through the PTD storage layer and/or the DHT storage layer. This replication allows the distributed controller instances to process in a uniform manner a request that is received from an application operating on one of the controller instances.

Synchronization requests are used to maintain consistency in NIB data in some embodiments that employ multiple NIB instances in a distributed control system. For instance, the NIB of some embodiments provides a mechanism to request and release exclusive access to the NIB data structure of the local instance. As such, an application running on top of the NOS instance(s) is only assured that no other thread is updating the NIB within the same controller instance. The application therefore needs to implement mechanisms external to the NIB to coordinate an effort with other controller instances to control access to the NIB. In some embodiments, this coordination is static and requires control logic involvement during failure conditions.

Also, in some embodiments, all NIB operations are asynchronous, meaning that updating a network entity only guarantees that the update will eventually be pushed to the corresponding switching element and/or other NOS instances. While this has the potential to simplify the application logic and make multiple modifications more efficient, often it is useful to know when an update has successfully completed. For instance, to minimize disruption to network traffic, the application logic of some embodiments requires the updating of forwarding state on multiple switches to happen in a particular order (to minimize, for example, packet drops). For this purpose, the API of some embodiments provides the synchronization request primitive that calls back one or more applications running on top of the NOS once the state has been pushed for an entity. After receiving the callback, the control application of some embodiments will then inspect the content of the NIB and determine whether its state is still as originally intended. Alternatively, in some embodiments, the control application can simply rely on NIB notifications to react to failures in modifications as they would react to any other network state changes.

The NOS controller 2722 is also responsible for pushing the changes in its corresponding NIB to switching elements for which the NOS 2700 is the master. To facilitate writing such data to the switching elements, the NOS controller 2722 uses the switch controller 2725. It also uses the switch controller 2725 to read values from a switching element. To access a switching element, the switch controller 2725 uses the switch interface 2755, which as mentioned above uses OpenFlow or OVS, or other known set of APIs in some embodiments.

When writing the changes in the NIB to the switching elements, the NOS controller 2722 also uses the optimizer 2723. The optimizer 2723 in some embodiments aggregates the changes in the NIB based on the LDPS to which the changes are related. Changes in the NIB are related to a LDPS when these changes in the NIB are resulted from updating or creating a LDPS. The optimizer 2723 then directs the switch controller 2725 to write to the switching elements only the aggregated changes. In this manner, all changes in the NIB related to a single LDPS are written to the switching elements together. The optimizer 2723 in other embodiments does not aggregate the changes in the NIB. The optimizer 2723 in these embodiments writes to the switching elements the changes in the NIB whenever the changes are made in the NIB.

Like the PTD and DHT storage structures 1045 and 1050 of the control system 1000 of FIG. 10, the PTD and DHT storage structures 2740 and 2750 of FIG. 27 interface with the NIB and not the application layer. In other words, some embodiments only limit PTD and DHT layers to communicate between the NIB layer and these two storage layers, and to communicate between the PTD/DHT storages of one instance and PTD/DHT storages of other instances. Other embodiments, however, allow the application layer (e.g., the control application) within one instance to access the PTD and DHT storages directly or through the transfer modules 2730. These embodiments might provide PTD and DHT access handles (e.g., APIs to DHT, PTD or CM interface) as part of the application interface 2705, or might provide handles to the transfer modules that interact with the PTD layer (e.g., the CM interface 2742) and DHT layers, so that the applications can directly interact with the PTD and DHT storage layers.

Also, like structures 1045 and 1050, the PTD 2740 and DHT instance 2750 have corresponding lists of triggers that are respectively maintained in the CM interface 2742 and the DHT instance 2750. Also, like the PNTD 1055 of the control system 1000, the PNTD 2745 of FIG. 27 does not interface with the NIB 2720. Instead, it interfaces with the application layer through the application interface 2705. Through this interface, the applications running on top of the NOS can store data in and retrieve data from the PNTD. Also, applications of other controller instances can access the PNTD 2745, as shown in FIG. 27.

IV. Rules Engine

In some embodiments, the control application 1400, the virtualization application 1500, and the chassis control application 1600 use a variation of the datalog database language, called n Log, to create the table mapping engine that maps input tables containing logical datapath data and switching element attributes to the output tables. Like datalog, n Log provides a few declaratory rules and operators that allow a developer to specify different operations that are to be performed upon the occurrence of different events. In some embodiments, n Log provides a smaller subset of the operators that are provided by datalog in order to increase the operational speed of n Log. For instance, in some embodiments, n Log only allows the AND operator to be used in any of the declaratory rules.

The declaratory rules and operations that are specified through n Log are then compiled into a much larger set of rules by an n Log compiler. In some embodiments, this compiler translates each rule that is meant to respond to an event into several sets of database join operations. Collectively the larger set of rules forms the table mapping, rules engine that is referred to below as the n Log engine.

Figure 28:
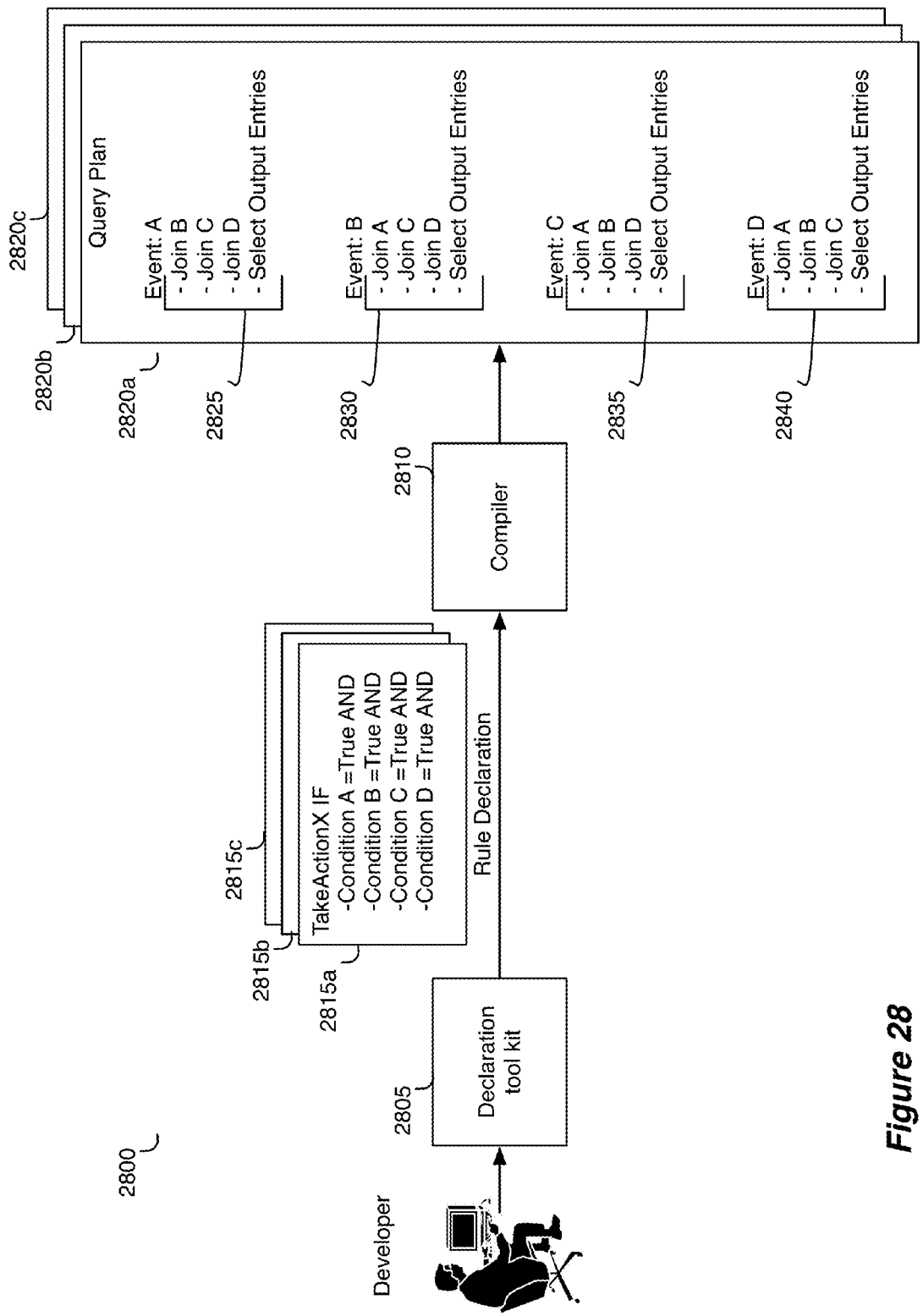
FIG. 28 illustrates a development process that some embodiments employ to develop a rules engine.

FIG. 28 illustrates a development process 2800 that some embodiments employ to develop the rules engine 1525 of the virtualization application 1500. As shown in this figure, this process uses a declaration toolkit 2805 and a compiler 2810. The toolkit 2805 allows a developer (e.g., a developer of a control application 1505 that operates on top of the virtualization application 1500) to specify different sets of rules to perform different operations upon the occurrence of different sets of conditions.

One example 2815 of such a rule is illustrated in FIG. 28. This example is a multi-conditional rule that specifies that an Action X has to be taken if four conditions A, B, C, and D are true. The expression of each condition as true in this example is not meant to convey that all embodiments express each condition for each rule as True or False. For some embodiments, this expression is meant to convey the concept of the existence of a condition, which may or may not be true. For example, in some such embodiments, the condition "A=True" might be expressed as "Is variable Z=A?" In other words, A in this example is the value of a parameter Z, and the condition is true when Z has a value A.

Irrespective of how the conditions are expressed, a multi-conditional rule in some embodiments specifies the taking of an action when certain conditions in the network are met. Examples of such actions include creation or deletion of new packet flow entries, creation or deletion of new network constructs, modification to use of existing network constructs, etc. In the virtualization application 1500, these actions are often implemented by the rules engine 1525 by creating, deleting, or modifying records in the output tables, which are then propagated to the NIB by the NIB publisher 1555.

As shown in FIG. 28, the multi-conditional rule 2815 uses only the AND operator to express the rule. In other words, each of the conditions A, B, C and D has to be true before the Action X is to be taken. In some embodiments, the declaration toolkit 2805 only allows the developers to utilize the AND operator because excluding the other operators (such as ORs, XORs, etc.) that are allowed by datalog allows n Log to operate faster than datalog.

The compiler 2810 converts each rule specified by the declaration toolkit 2805 into a query plan 2820 of the rules engine. FIG. 28 illustrates the creation of three query plans 2820a-2820c for three rules 2815a-2815c. Each query plan includes one or more sets of join operations. Each set of join operations specifies one or more join operations that are to be performed upon the occurrence of a particular event in a particular RE input table, where the particular event might correspond to the addition, deletion or modification of an entry in the particular RE input table.

In some embodiments, the compiler 2810 converts each multi-conditional rule into several sets of join operations, with each set of join operations being specified for execution upon the detection of the occurrence of one of the conditions. Under this approach, the event for which the set of join operations is specified is one of the conditions of the multi-conditional rule. Given that the multi-conditional rule has multiple conditions, the compiler in these embodiments specifies multiple sets of join operations to address the occurrence of each of the conditions.

FIG. 28 illustrates this conversion of a multi-conditional rule into several sets of join operations. Specifically, it illustrates the conversion of the four-condition rule 2815 into the query plan 2820a, which has four sets of join operations. In this example, one join-operation set 2825 is to be performed when condition A occurs, one join-operation set 2830 is to be performed when condition B occurs, one join-operation set 2835 is to be performed when condition C occurs, and one join-operation set 2840 is to be performed when condition D occurs.

These four sets of operations collectively represent the query plan 2820a that the rules engine 1525 performs upon the occurrence of a RE input table event relating to any of the parameters A, B, C, or D. When the input table event relates to one of these parameters (e.g., parameter B) but one of the other parameters (e.g., parameters A, C, and D) is not true, then the set of join operations fails and no output table is modified. But, when the input table event relates to one of these parameters (e.g., parameter B) and all of the other parameters (e.g., parameters A, C, and D) are true, then the set of join operations does not fail and an output table is modified to perform the action X. In some embodiments, these join operations are internal join operations. In the example illustrated in FIG. 28, each set of join operations terminates with a select command that selects entries in the record(s) resulting from the set of join operations to output to one or more output tables.

To implement the n Log engine in a distributed manner, some embodiments partition management of LDP sets by assigning the management of each LDPS to one controller instance. This partition management of the LDPS is also referred to as serialization of management of the LDPS. The rules engine 1525 of some embodiments implements this partitioned management of the LDPS by having a join to the LDPS entry be the first join in each set of join operations that is not triggered by an event in a LDPS input table.

Figure 29:
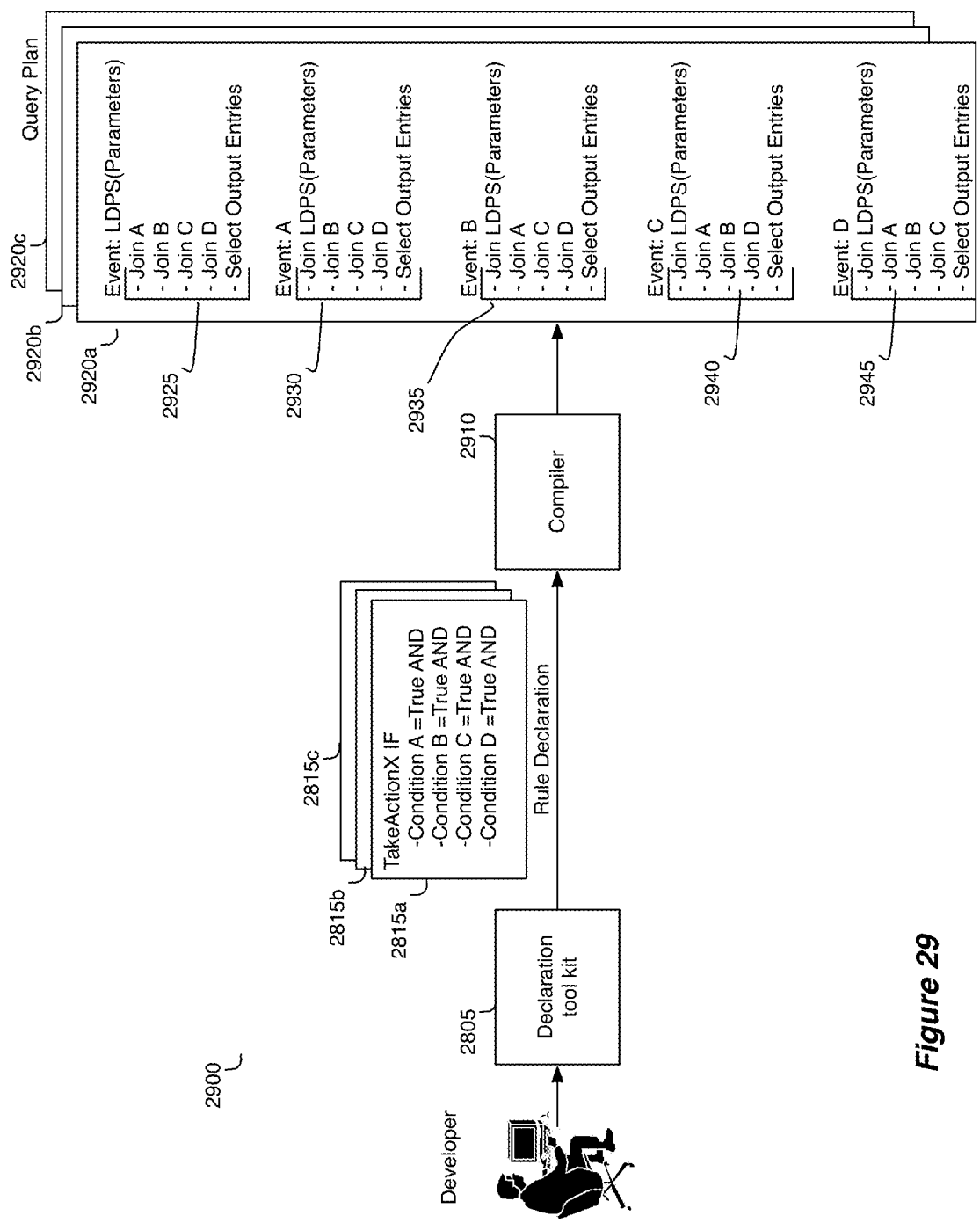
FIG. 29 illustrates that the rules engine of some embodiments implements partitioned management of logical data path sets.

FIG. 29 illustrates one such approach. Specifically, for the same four-condition rule 2815a illustrated in FIG. 28, it generates a different query plan 2920a. This query plan is part of three query plans 2920a-2920c that this figure shows the compiler 2910 generating for the three rules 2815a-2815c specified through the declaration toolkit 2805. Like the query plan 2820a that has four sets of join operations 2825, 2830, 2835 and 2840 for the four-condition rule 2815a, the query plan 2920a also has four sets of join operations 2930, 2935, 2940 and 2945 for this rule 2815a.

The four sets of join operations 2930, 2935, 2940 and 2945 are operational sets that are each to be performed upon the occurrence of one of the conditions A, B, C, and D. The first join operation in each of these four sets 2930, 2935, 2940 and 2945 is a join with the LDPS table managed by the virtualization application instance. Accordingly, even when the input table event relates to one of these four parameters (e.g., parameter B) and all of the other parameters (e.g., parameters A, C, and D) are true, the set of join operations may fail if the event has occurred for a LDPS that is not managed by this virtualization application instance. The set of join operations does not fail and an output table is modified to perform the desire action only when (1) the input table event relates to one of these four parameters (e.g., parameter B), all of the other parameters (e.g., parameters A, C, and D) are true, and (3) the event relates to a LDPS that is managed by this virtualization application instance.

Figure 30:
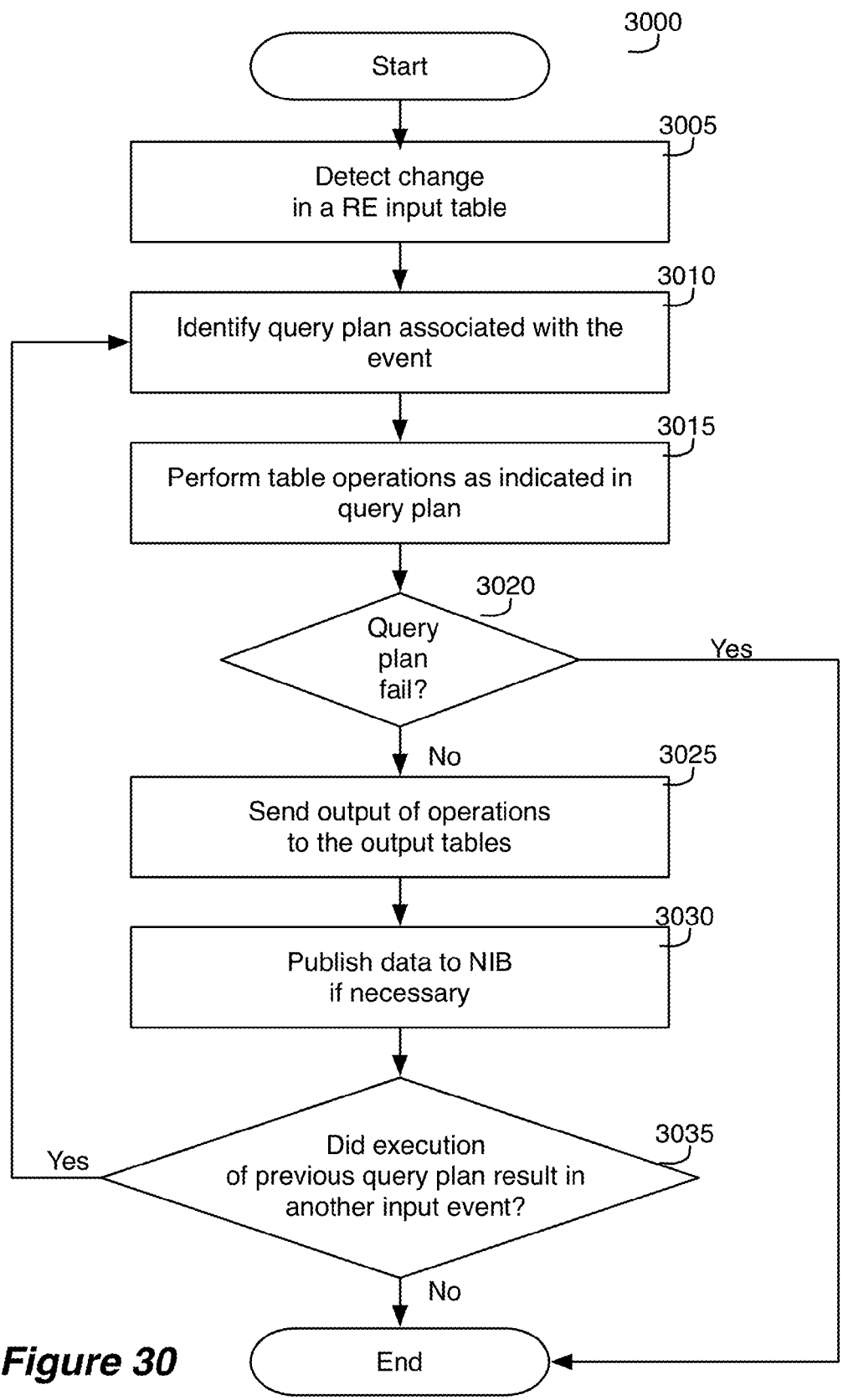
FIG. 30 illustrates a conceptual process that the virtualization application of some embodiments performs each time a record in a RE input table changes.

FIG. 30 conceptually illustrates a process 3000 that the virtualization application 1500 performs in some embodiments each time a record in a RE input table changes. This change may be a change made through the control application 1505. Alternatively, it may be a change that is made by the NIB monitor 1550 after it receives from the NIB a notification regarding a change in the NIB. The change to the RE input table record can entail the addition, deletion or modification of the record.

As shown in FIG. 30, the process 3000 initially detects (at 3005) a change in a RE input table 1510. In some embodiments, the event processor 1522 is the module that detects this change. Next, at 3010, the process 3000 identifies the query plan associated with the detected RE input table event. As mentioned above, each query plan in some embodiments specifies a set of join operations that are to be performed upon the occurrence of an input table event. In some embodiments, the event processor 1522 is also the module that performs this operation (i.e., is the module that identifies the query plan).

At 3015, the process 3000 executes the query plan for the detected input table event. In some embodiments, the event processor 1522 directs the table processor 1530 to execute the query plan. To execute a query plan that is specified in terms of a set of join operations, the table processor 1530 in some embodiments performs the set of join operations specified by the query plan to produce one or more records that represent one or more sets of data values from one or more input and miscellaneous tables 1510 and 1515.

Figure 31:
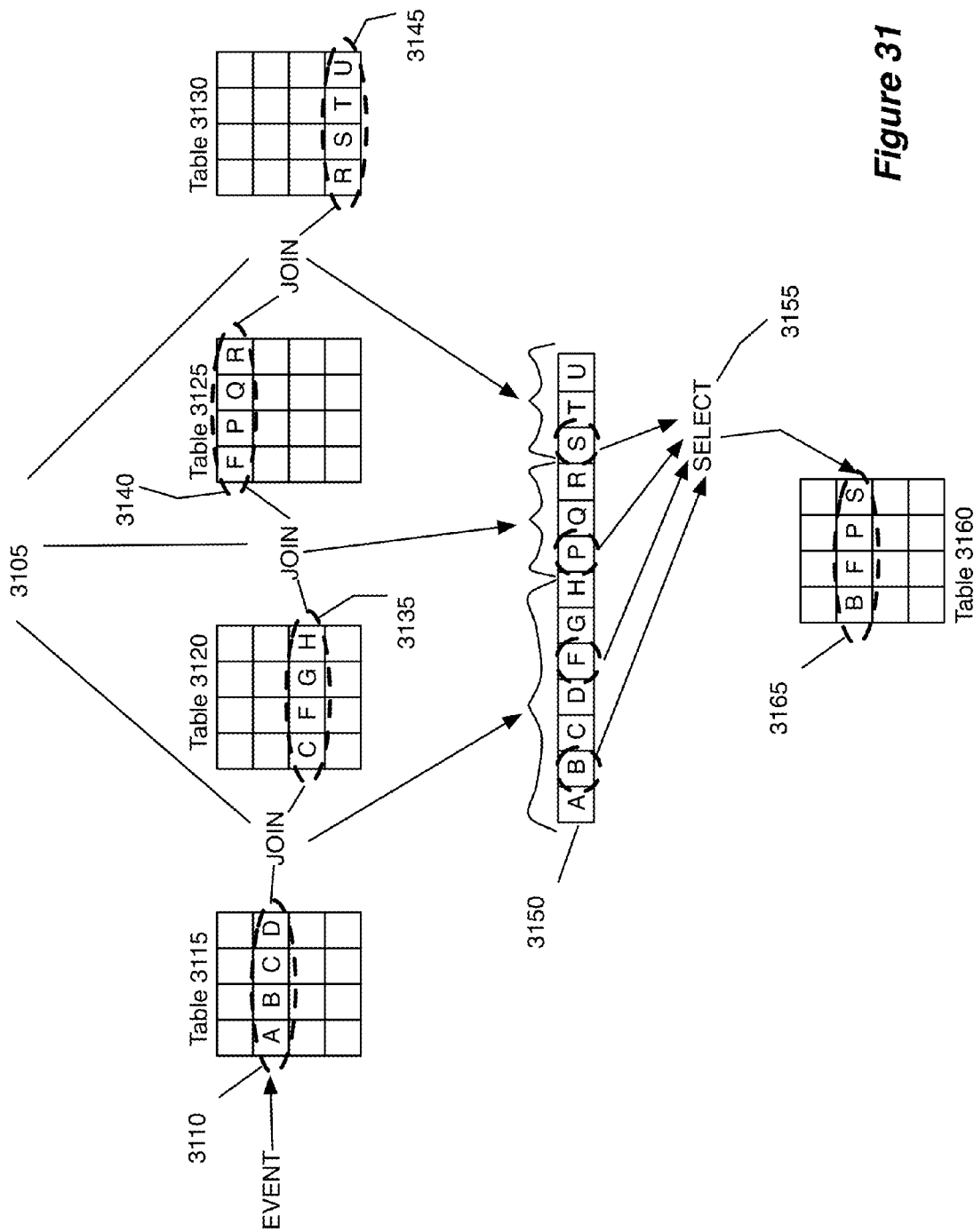
FIG. 31 illustrates an example of a set of join operations.

FIG. 31 illustrates an example of a set of join operations 3105. This set of join operations is performed when an event is detected with respect to record 3110 of an input table 3115. The join operations in this set specify that the modified record 3110 in table 3115 should be joined with the matching record(s) in table 3120. This joined record should then be joined with the matching record(s) in table 3125, and this resulting joined record should finally be joined with the matching record(s) in table 3130.

Two records in two tables "match" when values of a common key (e.g., a primary key and a foreign key) that the two tables share are the same, in some embodiments. In the example in FIG. 31, the records 3110 and 3135 in tables 3115 and 3120 match because the values C in these records match. Similarly, the records 3135 and 3140 in tables 3120 and 3125 match because the values F in these records match. Finally, the records 3140 and 3145 in tables 3125 and 3130 match because the values R in these records match. The joining of the records 3110, 3135, 3140, and 3145 results in the combined record 3150. In the example shown in FIG. 31, the result of a join operation between two tables (e.g., tables 3115 and 3120) is a single record (e.g., ABCDFGH). However, in some cases, the result of a join operation between two tables may be multiple records.

Even though in the example illustrated in FIG. 31 a record is produced as the result of the set of join operations, the set of join operations in some cases might result in a null record. For instance, as further described below, a null record results when the set of join operations terminates on the first join because the detected event relates to a LDPS not managed by a particular instance of the virtualization application. Accordingly, at 3020, the process determines whether the query plan has failed (e.g., whether the set of join operations resulted in a null record). If so, the process ends. In some embodiments, the operation 3020 is implicitly performed by the table processor when it terminates its operations upon the failure of one of the join operations.

When the process 3000 determines (at 3020) that the query plan has not failed, it stores (at 3025) the output resulting from the execution of the query plan in one or more of the output tables. In some embodiments, the table processor 1530 performs this operation by (1) performing a select operation to select a subset of the data values from the record(s) produced by the join operations, and (2) writing the selected subset of data values in one or more RE output tables 1545. FIG. 31 illustrates an example of this selection operation. Specifically, it illustrates the selection of values B, F, P and S from the combined record 3150 and the writing of these values into a record 3165 of an output table 3160.

As mentioned above, the RE output tables can be categorized in some embodiments as (1) a RE input table only, (2) a VA output table only, or (3) both a RE input table and a VA output table. When the execution of the query plan results in the modification a VA output table, the process 3000 publishes (at 3030) the changes to this output table to the NIB. In some embodiments, the NIB publisher 1555 detects changes to the VA output tables of the RE output tables 1545, and in response, it propagates the modified data tuple in the modified VA output table into the NIB 1560 through the APIs provided by the NOS 1565. After a new data tuple is propagated to the NIB by the NIB monitor, the NOS 1565 propagates, if needed, a NIB data tuple that was modified because of the propagated VA output table data tuple to one or more of the managed switching elements. In doing this, the NOS completes the deployment of the LDPS (e.g., one or more logical switching configurations) to one or more managed switching elements as specified by the NIB records.

At 3035, the process determines whether the execution of the query plan resulted in the modification of the RE input table. This operation is implicitly performed in some embodiments when the event processor 1522 determines that the output table that was modified previously at 3025 modified a RE input table. As mentioned above, a RE output table 1545 can also be a RE input table 1510 that generates an event that causes the rules engine to perform another query plan after it is modified by the rules engine. Such an event is referred to as an internal input event, and it is to be contrasted with an external input event, which is an event that is caused by a RE input table modification made by the control application 1505 or the NIB monitor 1550. When the process determines (at 3030) that an internal input event was created, it returns to 3010 to perform operations 3010-3035 for this new internal input event. The process terminates when it determines (at 3035) that the execution of the query plan at 3035 did not result in an internal input event.

One of ordinary skill in the art will recognize that process 3000 is a conceptual representation of the operations used to map a change in one or more input tables to one or more output tables. The specific operations of process 3000 may not be performed in the exact order shown and described. The specific operations may not be performed in one continuous series of operations, and different specific operations may be performed in different embodiments. For instance, the process 3000 in some embodiments batches up a set of changes in RE input tables 1510 and identifies (at 3010) a query plan associated with the set of detected RE input table events. The process in these embodiments executes (at 3020) the query plan for the whole set of the RE input table events rather than for a single RE input table event. Batching up the RE input table events in some embodiments results in better performance of the table mapping operations. For example, batching the RE input table events improves performance because it reduces the number of instance that the process 3000 will produce additional RE input table events that would cause it to start another iteration of itself.

While FIGS. 28-32 may be described in terms of the control application 1400 and the virtualization application 1500, these figures have been described in terms of the virtualization application 1500 for simplicity of description.

As mentioned above, some embodiments implement the n Log engine as a distributed table mapping engine that is executed by different control applications and virtualization applications of different controller instances. To implement the n Log engine in a distributed manner, some embodiments partition the management of the LDP sets by specifying for each particular LDPS only one controller instance as the instance responsible for specifying the NIB records associated with that particular LDPS. Partitioning the management of the LDPS' also assigns in some embodiments the table mapping operations for each LDPS to the n Log engine of the controller instance responsible for the LDPS.

As described above by reference to FIG. 29, some embodiments partition the n Log table mapping operations across the different controller instances by designating the first join operation that is performed by each n Log instance to be based on the LDPS parameter. This designation ensures that each n Log instance's join operations fail and terminate immediately when the instance has started a set of join operations that relate to a LDPS that is not managed by the n Log instance.

Figure 32:
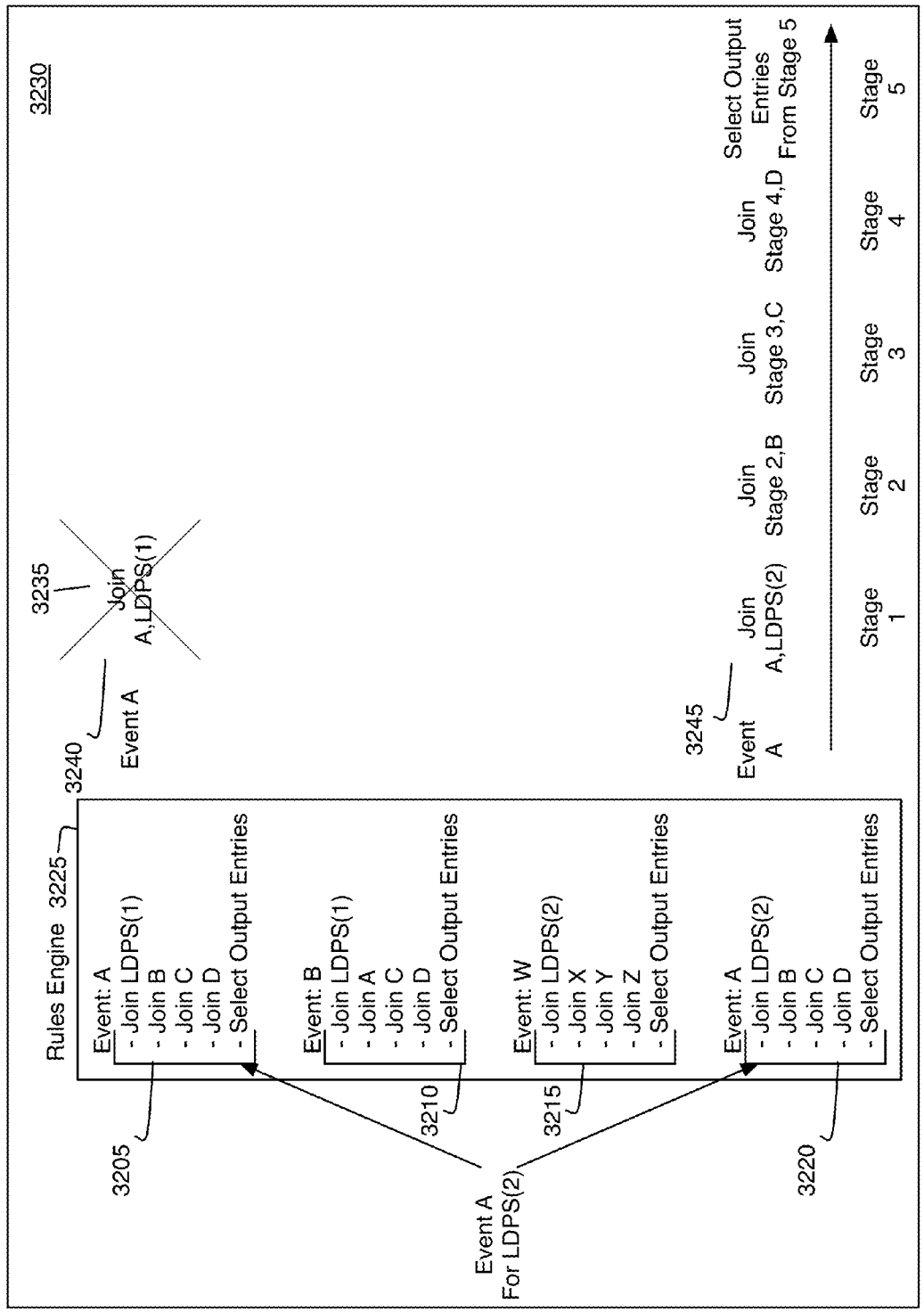
FIG. 32 illustrates an example of a set of join operations failing when they relate to a LDPS that does not relate to an input table event that has occurred.

FIG. 32 illustrates an example of a set of join operations failing when they relate to a LDPS that does not relate to an input table event that has occurred. Specifically, this figure illustrates four query plans 3205, 3210, 3215 and 3220 of a rules engine 3225 of a particular virtualization application instance 3230. Two of these query plans 3210 and 3215 specify two sets of join operations that should be performed upon the occurrence of input table events B and W respectively, while two of the query plans 3205 and 3220 specify two sets of join operations that should be performed upon the occurrence of input table event A.

In the example illustrated in FIG. 32, the two query plans 3210 and 3215 are not executed because an input table event A has occurred for a LDPS 2 and these two plans are not associated with such an event. Instead, the two query plans 3205 and 3220 are executed because they are associated with the input table event A that has occurred. As shown in this figure, the occurrence of this event results in two sets of join operations being performed to execute the two query plans 3205 and 3220. The first set of join operations 3240 for the query plan 3205 fails because the query plan 3205 is specified for a LDPS 1, which is a LDPS not managed by the virtualization application instance 3230. This set of join operations fails on the first join operation 3235 because it is a join with the virtualization application instance 3230's LDPS table, which does not contain a record for the LDPS 1. In some embodiments, even though the first join operation 3235 has failed, the remaining join operations (not shown) of the query plan 3240 will still be performed and fail. In other embodiments, the remaining join operations of the query plan 3240 will not be performed as shown.

The second set of join operations 3245 does not fail, however, because it is for the LDPS 2, which is a LDPS managed by the virtualization application instance 3230 and therefore has a record in the LDPS table of this application instance. This set of join operations has four stages that each performs one join operation. Also, as shown in FIG. 32, the set of join operations terminates with a selection operation that selects a portion of the combined record produced through the join operations.

Figure 33A:
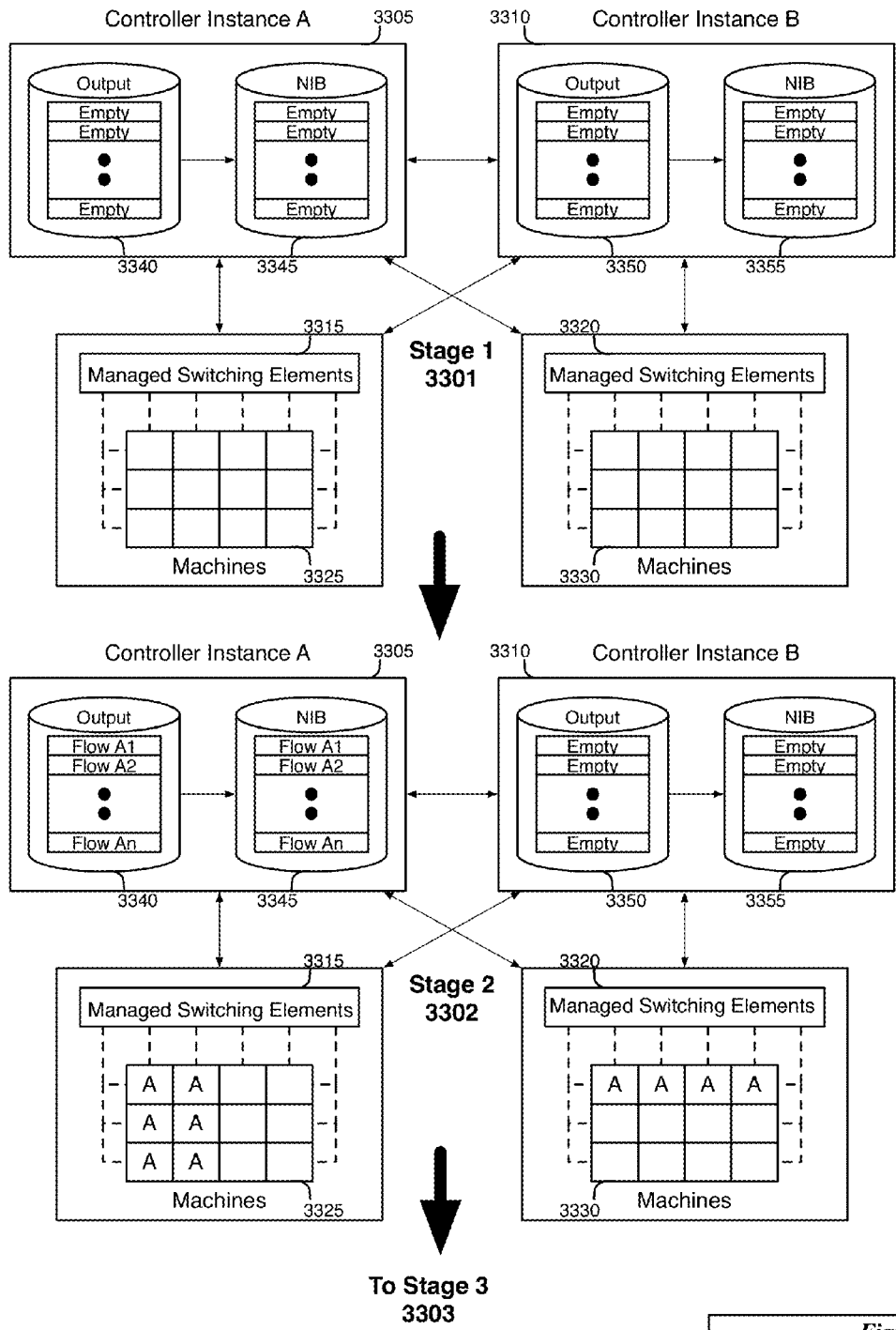
FIGS. 33A-33B illustrate an example of reducing workloads on n Log instances.
Figure 33B:
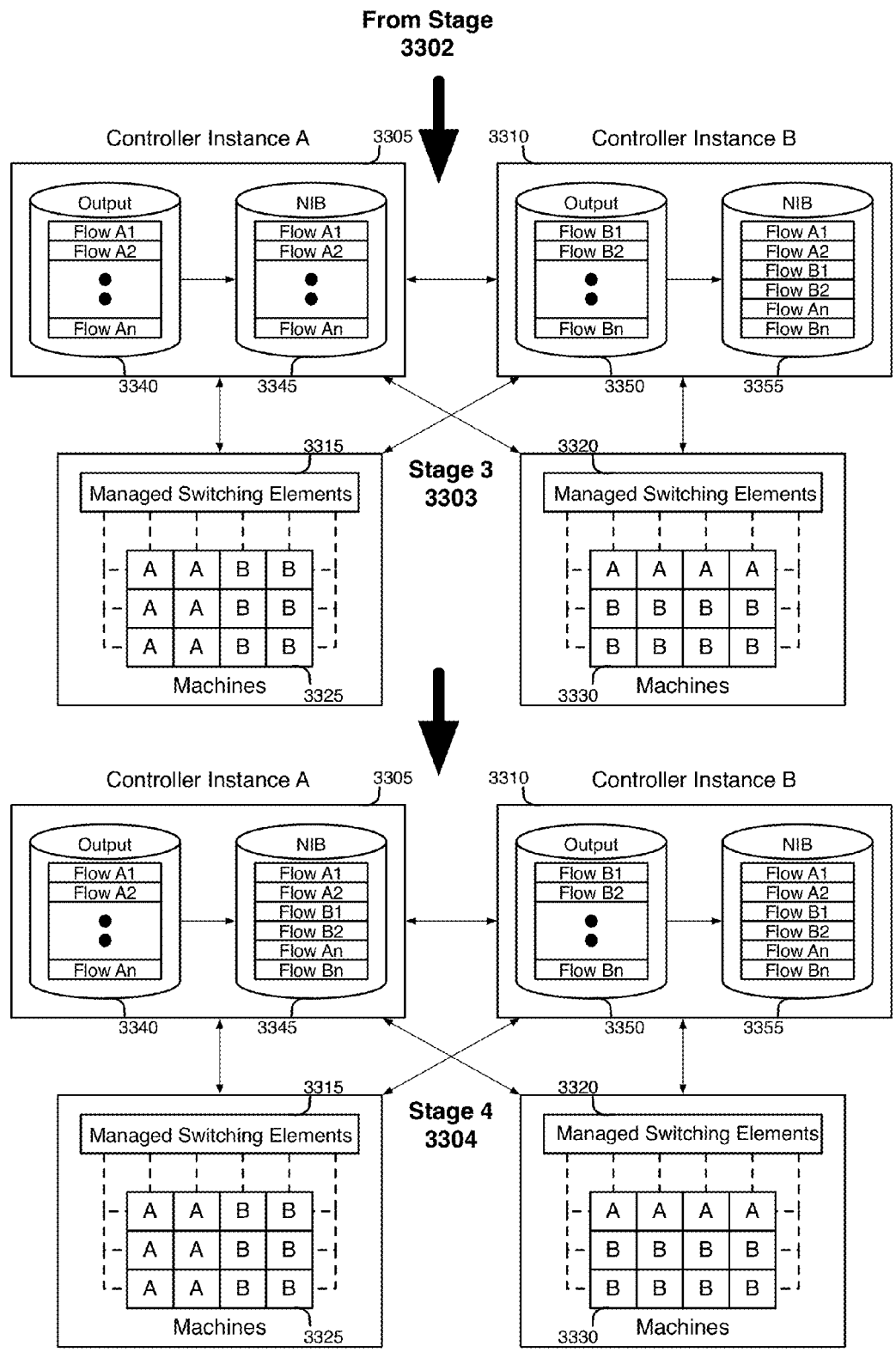

The distribution of the n Log table mapping operations across several n Log instances reduces the load on each n Log instance and thereby increases the speed by which each n Log instance can complete its mapping operations. FIGS. 33A-33B illustrate an example that describes this reduction in workload. Specifically, it illustrates an example where two controller instances 3305 and 3310 are responsible for the virtualization application functionality of two different LDPS' A and B for different tenants A and B of a multi-tenant computing environment. The two controller instances manage two sets of managed switching elements 3315 and 3320. Each of the two sets of managed switching elements manages a set of machines 3325 or 3330, which may be host machines running on dedicated machines, or may be virtual machines running on shared machines.

In four stages, this figure illustrates the results of the table mapping operations that are performed by the virtualization applications of these two different controller instances. The first stage 3301 shows that no machines have been deployed in the managed system for either tenant A or tenant B. The second stage 3302 shows the computing environment with several machines that have been deployed for tenant A in the two sets of machines 3325 and 3330. It also shows the VA output table 3340 of the virtualization application of the controller instance 3305 with flow entries for the LDPS A that were specified by this instance's virtualization application. The second stage further shows the NIB 3345 of the controller instance 3305 containing the flow entries for the LDPS A. At this stage, the NIB 3345 also contains LDPS data relating to LDPS A in some embodiments, but this data is not shown in FIG. 33A.

The third stage 3303 in FIG. 33B shows that the flow entries for the LDPS A have migrated to the NIB 3355 of the controller instance 3310. This migration occurs because of the NIB replication across the controller instances. Also, this replication causes LDPS data relating to LDPS A to be copied to the NIB 3355. The third stage 3303 further shows the computing environment with several machines that have been deployed for tenant B in the two sets of machines 3325 and 3330. It also shows the VA output table 3350 of the virtualization application of the controller instance 3310 with flow entries for the LDPS B that were specified by this instance's virtualization application. The third stage further shows the NIB 3355 of the controller instance 3310 containing the flow entries for the LDPS B. At this stage, the NIB 3355 also contains LDPS data relating to LDPS B in some embodiments, but this data is not shown in FIG. 33B.

The fourth stage 3304 shows that the flow entries for the LDPS B have migrated to the NIB 3345 of the controller instance 3305. This migration occurs because of the NIB replication across the controller instances. This replication also causes LDPS data relating to LDPS B to be copied to the NIB 3345. As shown at the stage 3304, the NIBs 3345 and 3355 have LDPS data relating to both LDPS A and LDPS B. However, the VA output tables of one controller instance do not store flow entries for the LDPS of another controller instance. That is, in this example, the VA output tables 3340 of controller instance A do not store the flow entries for the LDPS B and the VA output tables 3350 of controller instance B do not store the flow entries for the LDPS A. This depiction is meant to illustrate that some embodiments partition the storage of the logical state data across several controller instances. This allows these embodiments to keep the size of tables (e.g., the input or output tables) small in order to increase the speed by which each nLog instance can complete its mapping operations as described above.

While the input and output tables of each controller instance in some embodiments only store or practically only store logical state data for only the LDPS' for which the controller instance is responsible, the NIB for each controller instance in some of these embodiments contains all or practically all of the logical state data (e.g., except some logical port statistics that are stored in the DHTs of controller instances that are not replicated across) for all LDPS of all controller instances. However, other embodiments will partition the logical state data for the LDPS's across the NIBs of different controller instances.

V. Electronic System

Figure 34:
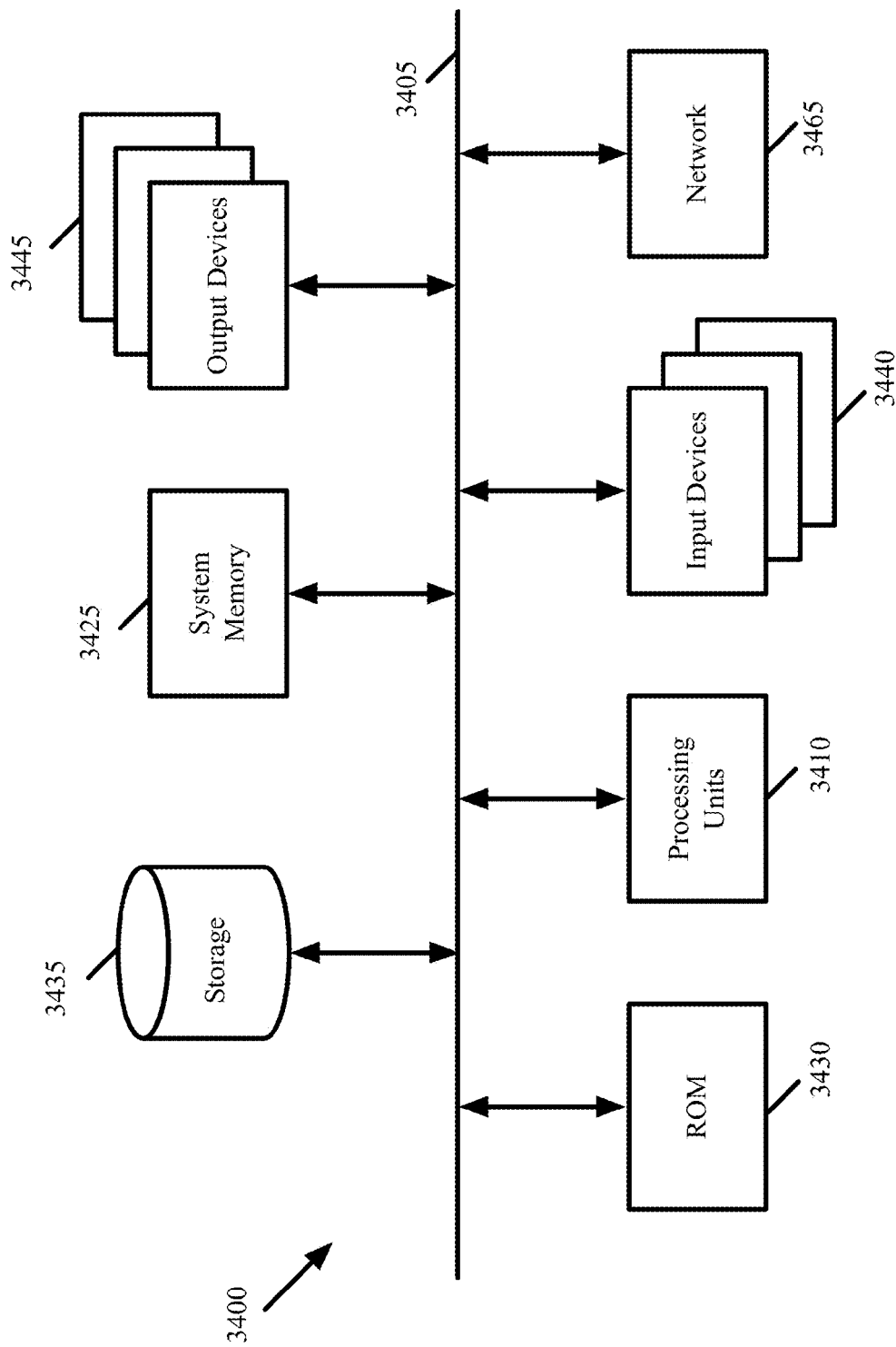
FIG. 34 conceptually illustrates an electronic system with which some embodiments of the invention are implemented.

FIG. 34 conceptually illustrates an electronic system 3400 with which some embodiments of the invention are implemented. The electronic system 3400 can be used to execute any of the control, virtualization, or operating system applications described above. The electronic system 3400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 3400 includes a bus 3405, processing unit(s) 3410, a system memory 3425, a read-only memory 3430, a permanent storage device 3435, input devices 3440, and output devices 3445.

The bus 3405 collectively represents all system, peripheral, and chipset buses that communicatively connect the numerous internal devices of the electronic system 3400. For instance, the bus 3405 communicatively connects the processing unit(s) 3410 with the read-only memory 3430, the system memory 3425, and the permanent storage device 3435.

From these various memory units, the processing unit(s) 3410 retrieve instructions to execute and data to process in order to execute the processes of the invention. The processing unit(s) may be a single processor or a multi-core processor in different embodiments.

The read-only-memory (ROM) 3430 stores static data and instructions that are needed by the processing unit(s) 3410 and other modules of the electronic system. The permanent storage device 3435, on the other hand, is a read-and-write memory device. This device is a non-volatile memory unit that stores instructions and data even when the electronic system 3400 is off. Some embodiments of the invention use a mass-storage device (such as a magnetic or optical disk and its corresponding disk drive) as the permanent storage device 3435.

Other embodiments use a removable storage device (such as a floppy disk, flash drive, etc.) as the permanent storage device. Like the permanent storage device 3435, the system memory 3425 is a read-and-write memory device. However, unlike storage device 3435, the system memory is a volatile read-and-write memory, such a random access memory. The system memory stores some of the instructions and data that the processor needs at runtime. In some embodiments, the invention's processes are stored in the system memory 3425, the permanent storage device 3435, and/or the read-only memory 3430. From these various memory units, the processing unit(s) 3410 retrieve instructions to execute and data to process in order to execute the processes of some embodiments.

The bus 3405 also connects to the input and output devices 3440 and 3445. The input devices enable the user to communicate information and select commands to the electronic system. The input devices 3440 include alphanumeric keyboards and pointing devices (also called "cursor control devices"). The output devices 3445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 34, bus 3405 also couples electronic system 3400 to a network 3465 through a network adapter (not shown). In this manner, the computer can be a part of a network of computers (such as a local area network ("LAN"), a wide area network ("WAN"), or an Intranet, or a network of networks, such as the Internet. Any or all components of electronic system 3400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 22, 24, and 30) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, several embodiments were described above in which a user provides LDP sets in terms of LCP data. In other embodiments, however, a user may provide LDP sets in terms of LFP data. In addition, several embodiments were described above in which a controller instance provides physical control plane data to a switching element in order to manage the switching element. In other embodiments, however, the controller instance may provide the switching element with physical forwarding plane data. In such embodiments, the relational database data structure would store physical forwarding plane data and the virtualization application would generate such data.

Furthermore, in several examples above, a user specifies one or more logical switches. In some embodiments, the user can provide physical switching element configurations along with such logic switching element configurations. Also, even though controller instances are described that in some embodiments are individually formed by several application layers that execute on one computing device, one of ordinary skill will realize that such instances are formed by dedicated computing devices or other machines in some embodiments that perform one or more layers of their operations.

Also, several examples described above show that a LDPS is associated with one user. One of the ordinary skill in the art will recognize that then a user may be associated with one or more sets of LDP sets in some embodiments. That is, the relationship between a LDPS and a user is not always a one-to-one relationship as a user may be associated with multiple LDP sets. Thus, one of ordinary skill in the art would understand that the invention is not to be limited by the foregoing illustrative details.

What is claimed is:

1. A controller computer for managing a network comprising a plurality of managed forwarding elements that implement different logical networks, the controller computer comprising:
   an interface for receiving input logical control plane data in terms of input events, said input logical control plane data comprising updates to logical control planes of logical networks, wherein each logical network is implemented by a set of managed forwarding elements;
   an input scheduler for (i) categorizing the input events into different groups related to different logical networks and (ii) defining a schedule for supplying each group of the input events related to a different logical network to a converter so that the converter processes each group of input events related to a different logical network together;
   the converter for converting the input logical control plane data for each logical network to output logical forwarding plane data for the logical network; and
   a network information base (NIB) data structure for (i) storing, for each logical network, the output logical forwarding plane data for subsequent translation into physical control plane data for the set of managed forwarding elements that implements the logical network, and (ii) transmitting the physical control plane data to one or more other controllers that manage the set of managed forwarding elements.

2. The controller computer of claim 1, wherein the input events comprise a particular input event that represents a change in a state of at least one managed forwarding element in the sets of managed forwarding elements.

3. The controller computer of claim 1, wherein the NIB data structure further stores data representing a state of the sets of managed forwarding elements, wherein the input events comprise a change in the data representing the state of the sets of managed forwarding elements in the NIB data structure.

4. The controller computer of claim 1, wherein the interface receives the input logical control plane data from at least one user.

5. The controller computer of claim 1, wherein a particular set of managed forwarding elements implements a particular logical network by forwarding data packets between a set of end machines that are logically connected through logical forwarding elements of the logical network, wherein the particular set of managed forwarding elements forwards the data packets between the end machines according to forwarding rules defined by the output logical forwarding plane data.

6. The controller computer of claim 5, wherein each managed forwarding element in the particular set of managed switching forwarding elements operates on a different host machine that also hosts one or more end machines in the set of end machines.

7. The controller computer of claim 1 further comprising a classifier for assigning a priority level to each input event, wherein the input scheduler supplies an input event with a higher priority level to the converter ahead of a group of input events with lower priority level.

8. The controller computer of claim 1, wherein the physical control plane data is sent to the other controllers through a plurality of communication channels, the controller computer further comprising an output scheduler for (i) retrieving the physical control plane data from the NIB data structure, (ii) queuing the physical control plane data in a plurality of queues each of which corresponds to one of the other controllers, and (iii) sending the output physical control plane data to the other controllers from the corresponding queues.

9. The controller computer of claim 8, wherein the output scheduler sends physical control plane data from a particular queue when the particular queue has more than a threshold amount of physical control plane data.

10. The controller computer of claim 8, wherein the output scheduler sends physical control plane data from a particular queue periodically.

11. The controller computer of claim 1, wherein the logical forwarding plane data comprises a plurality of logical flow entries that specify forwarding rules for forwarding of data between logical addresses of logical forwarding elements that are implemented by the set of managed forwarding elements.

12. The controller computer of claim 1, wherein the translated physical control plane data is universal physical control plane data that defines a set of forwarding rules that is common for every managed forwarding element in the set of managed forwarding elements.

13. The controller computer of claim 12, wherein the other controllers performs further translations of the universal physical control plane data to a set of customized physical control plane data that is customized for each managed forwarding element in the set of managed forwarding elements.

14. The controller computer of claim 13, wherein each controller of the other controllers executes on a same host machine on which a corresponding managed forwarding element operates.

15. The controller computer of claim 13, wherein each controller of the other controllers is a controller computer that is separate from a host machine on which a corresponding managed forwarding element operates.

16. The controller computer of claim 3, wherein each managed forwarding element in the set of managed forwarding elements is represented by one or more data objects in the NIB data structure.

17. A method for managing a network comprising a plurality of managed forwarding elements that implement different logical datapath sets, the method comprising:
    receiving input logical control plane data in terms of input events, said input logical control plane data comprising updates to logical control planes of logical datapath sets, wherein each logical datapath set is implemented by a set of managed forwarding elements;
    categorizing the input events into different groups related to different logical datapath sets;
    defining a schedule for supplying each group of the input events related to a different logical datapath set to a converter so that the converter processes each group of input events related to a different logical datapath set together;
    converting, by the converter, the input logical control plane data for each logical datapath set to output logical forwarding plane data for the logical datapath set;
    storing the output logical forwarding plane data in a network information base (NIB) data structure, said output logical forwarding plane data for subsequent translation into physical control plane data for the set of managed forwarding elements that implements the logical datapath set; and
    transmitting the physical control plane data from the NIB data structure to one or more controllers that manage the set of managed forwarding elements.

18. The method of claim 17, wherein the input events comprise a particular input event that represents a change in a state of at least one managed forwarding element in the set of managed forwarding elements.

19. The method of claim 17 further comprising storing, in the NIB data structure, data representing a state of the set of managed forwarding elements, wherein the input events comprise a change in the data representing the state of the set of managed forwarding elements in the NIB data structure.

20. The method of claim 17, wherein the input logical control plane data are supplied by at least one user.

21. The method of claim 17, wherein a particular set of managed forwarding elements implements a particular logical datapath set by forwarding data packets between a set of end machines that are logically connected through logical forwarding elements of the particular logical datapath set, wherein the particular set of managed forwarding elements forwards the data packets between the end machines according to forwarding rules defined by the logical forwarding plane data.

22. The method of claim 21, wherein each managed forwarding element in the particular set of managed forwarding elements operates on a different host machine that also hosts one or more end machines in the set of end machines.

23. The method of claim 17 further comprising assigning a priority level to each input event, wherein an input event with a higher priority level is supplied to the converter ahead of a group of input events with lower priority level.

24. The method of claim 17, wherein the physical control plane data is sent to the other controllers through a plurality of communication channels, wherein transmitting the physical control plane data from the NIB comprises:
    retrieving the physical control plane data from the NIB data structure;
    queuing the physical control plane data in a plurality of queues each of which corresponds to one of the controllers; and
    sending the physical control plane data to the controllers from the corresponding queues.

25. The method of claim 24, wherein the physical control plane data is sent from a particular queue when the particular queue has more than a threshold amount of physical control plane data.

26. The method of claim 24, wherein the physical control plane data is sent from a particular queue periodically.

27. The method of claim 17, wherein the logical forwarding plane data comprises a plurality of logical flow entries that specify forwarding rules for forwarding of data between logical addresses of the logical forwarding elements that are implemented by the set of managed forwarding elements.

28. The method of claim 17, wherein the translated physical control plane data is universal physical control plane data that defines a set of forwarding rules that is common for every managed forwarding element in the set of managed forwarding elements.

29. The method of claim 28, wherein the other controllers performs further translations of the universal physical control plane data to a set of customized physical control plane data for the set of managed forwarding elements.

30. The method of claim 29, wherein each controller of the other controllers executes on a same host machine on which a corresponding managed forwarding element operates.

31. The method of claim 29, wherein each controller of the other controllers is a controller computer that is separate from a host machine on which a corresponding managed forwarding element operates.

32. The method of claim 19, wherein each managed forwarding element in the sets of managed forwarding elements is represented by one or more data objects in the NIB data structure.

33. The controller computer of claim 3 further comprising a NIB monitor for:
    identifying the change in the data representing the state of managed forwarding elements in the NIB data structure; and
    sending the input events to the interface.

34. The controller computer of claim 3, wherein each managed forwarding element in the sets of managed forwarding elements operates on a host machine and implements a set of logical forwarding elements that couple to a set of end machines of a particular logical network that reside on the same host machine.

35. The controller computer of claim 34, wherein the change in the data representing the state of managed forwarding elements in the NIB data structure is caused by a migration of an end machine of the set of end machines from one host machine to another host machine.

* * * * *